(12) United States Patent
Mimlitch, III et al.

(10) Patent No.: US 9,238,178 B2
(45) Date of Patent: *Jan. 19, 2016

(54) CLIMBING VIBRATION-DRIVEN ROBOT

(71) Applicant: Innovation First, Inc., Greenville, TX (US)

(72) Inventors: Robert H. Mimlitch, III, Rowlett, TX (US); David Anthony Norman, Greenville, TX (US); Jeffrey Russell Waegelin, Rockwell, TX (US); Gregory E. Needel, Rockwell, TX (US); Guiliang Li, DongGuan (CN)

(73) Assignee: Innovation First, Inc., Greenville, TX (US)

( * ) Notice: Subject to any disclaimer, the term of this patent is extended or adjusted under 35 U.S.C. 154(b) by 239 days.

This patent is subject to a terminal disclaimer.

(21) Appl. No.: 14/038,285

(22) Filed: Sep. 26, 2013

(65) Prior Publication Data

US 2014/0024288 A1   Jan. 23, 2014

Related U.S. Application Data

(62) Division of application No. 13/433,758, filed on Mar. 29, 2012, now Pat. No. 8,591,281.

(51) Int. Cl.
*A63H 11/02* (2006.01)
*A63H 29/22* (2006.01)
*B62D 57/02* (2006.01)

(52) U.S. Cl.
CPC ............. *A63H 29/22* (2013.01); *B62D 57/02* (2013.01)

(58) Field of Classification Search
USPC .............................. 446/3, 444–447, 458, 484
See application file for complete search history.

(56) References Cited

U.S. PATENT DOCUMENTS 1,793,121 A   7/1928   Muller
1,763,788 A   6/1930   Jobe, Sr.
(Continued)

FOREIGN PATENT DOCUMENTS

CN   1054896   8/1991
CN   2820261   9/2006
(Continued)

OTHER PUBLICATIONS

Office Action, Japanese Office Action on Co-Pending Application 2012-061713, Dec. 24, 2013.
(Continued)

*Primary Examiner* — Melba Bumgarner
*Assistant Examiner* — Joseph B Baldori
(74) *Attorney, Agent, or Firm* — Adam K. Sacharoff; Much Shelist

(57) ABSTRACT

An apparatus includes a housing, a rotational motor situated within the housing, a vibrating mechanism, and a plurality of appendages each having an appendage base proximal to the housing and an appendage tip distal from the housing. One or more of the appendages are adapted to cause the apparatus to move across a surface in a forward direction generally defined by a longitudinal offset between the appendage base and the appendage tip, and the appendages include two or more appendages disposed such that the appendage tips of the two or more appendages are adapted to contact opposing surfaces to produce a net force in a direction generally defined by a longitudinal offset between the appendage base and the appendage tip of the two or more appendages as the vibrating mechanism causes the apparatus to vibrate. The net force can allow the apparatus to climb when the opposing surfaces are inclined.

28 Claims, 27 Drawing Sheets

(56) References Cited

U.S. PATENT DOCUMENTS

| | | |
|---|---|---|
| 2,167,985 A | 8/1939 | Levay |
| 2,618,888 A | 11/1952 | Hoff |
| 2,827,735 A | 3/1958 | Grimm |
| 2,862,333 A | 12/1958 | Franco |
| 2,919,921 A | 1/1960 | Berger |
| 3,196,580 A | 7/1965 | Rakestraw |
| 3,331,463 A | 7/1967 | Kramer |
| 3,343,793 A | 9/1967 | Waser |
| 3,530,617 A | 9/1970 | Halvorson et al. |
| 3,712,541 A | 1/1973 | Merino et al. |
| 3,841,636 A | 10/1974 | Meyer |
| 3,842,532 A | 10/1974 | Nielsen |
| 3,959,920 A | 6/1976 | Ieda |
| 4,163,558 A | 8/1979 | Breslow et al. |
| 4,183,173 A | 1/1980 | Ogawa |
| 4,219,957 A | 9/1980 | Kakuta |
| 4,291,490 A | 9/1981 | Ikeda |
| 4,496,100 A | 1/1985 | Schwager et al. |
| 4,544,094 A | 10/1985 | Scholey |
| 4,550,910 A | 11/1985 | Goldfarb et al. |
| 4,591,346 A | 5/1986 | Ikeda |
| 4,605,230 A | 8/1986 | Halford et al. |
| D289,070 S | 3/1987 | Forbes et al. |
| D289,747 S | 5/1987 | Sethares et al. |
| 4,674,949 A | 6/1987 | Kroczynski |
| D291,711 S | 9/1987 | Dixon |
| 4,708,690 A | 11/1987 | Kulesza et al. |
| 4,824,415 A | 4/1989 | Herbstler et al. |
| 4,941,857 A | 7/1990 | Jujimaki |
| 5,088,949 A | 2/1992 | Atkinson et al. |
| 5,221,226 A | 6/1993 | Park |
| 5,679,047 A | 10/1997 | Engel |
| D405,850 S | 2/1999 | Witkin |
| 5,947,788 A | 9/1999 | Derrah |
| 5,993,286 A | 11/1999 | Tacquard et al. |
| D421,932 S | 3/2000 | Hawkins et al. |
| D427,256 S | 6/2000 | Teigiser |
| 6,155,905 A | 12/2000 | Truax |
| 6,199,439 B1 | 3/2001 | Lin |
| 6,238,264 B1 | 5/2001 | Kazami et al. |
| D456,467 S | 4/2002 | Corbett |
| D458,320 S | 6/2002 | Domingues |
| 6,435,929 B1 | 8/2002 | Halford |
| 6,450,104 B1 | 9/2002 | Grant et al. |
| 6,599,048 B2 | 7/2003 | Kuo |
| 6,652,352 B1 | 11/2003 | MacArthur et al. |
| 6,681,150 B1 | 1/2004 | Haga et al. |
| 6,826,449 B1 | 11/2004 | Abu-Taha |
| 6,866,557 B2 | 3/2005 | Randall |
| 6,899,589 B1 | 5/2005 | Lund et al. |
| 6,964,309 B2 | 11/2005 | Quinn et al. |
| 6,964,572 B2 | 11/2005 | Cesa |
| D517,131 S | 3/2006 | Carruth |
| 7,025,656 B2 | 4/2006 | Bailey |
| 7,040,951 B2 | 5/2006 | Hornsby et al. |
| 7,204,455 B2 | 4/2007 | Sinclair |
| D555,213 S | 11/2007 | Bowen et al. |
| 7,339,340 B2 | 3/2008 | Summer et al. |
| 7,803,031 B1 | 9/2010 | Winckler et al. |
| 7,927,170 B2 | 4/2011 | Bickerton et al. |
| 8,591,281 B2 * | 11/2013 | Mimlitch et al. ............ 446/3 |
| 2001/0024925 A1 | 9/2001 | Domingues |
| 2001/0054518 A1 | 12/2001 | Buehler et al. |
| 2004/0198159 A1 | 10/2004 | Xu et al. |
| 2005/0112992 A1 | 5/2005 | Malcolm |
| 2006/0076735 A1 | 4/2006 | Proch et al. |
| 2007/0087654 A1 | 4/2007 | Chernick et al. |
| 2008/0061644 A1 | 3/2008 | Treat |
| 2009/0311941 A1 | 12/2009 | Bickerton et al. |

FOREIGN PATENT DOCUMENTS

| | | |
|---|---|---|
| DE | 916935 | 8/1954 |
| DE | 1120958 | 10/1957 |
| DE | 1120958 | 12/1961 |
| EP | 0008676 | 3/1980 |
| FR | 1564711 | 3/1969 |
| FR | 1564711 | 4/1969 |
| FR | 2348723 | 11/1977 |
| FR | 2358174 | 2/1978 |
| GB | 488042 | 6/1938 |
| GB | 1180384 | 2/1970 |
| GB | 1291592 | 10/1972 |
| GB | 1381326 | 1/1975 |
| GB | 1180384 | 2/1980 |
| GB | 1595007 | 8/1981 |
| GB | 2427529 | 12/2006 |
| JP | 1146570 | 6/1989 |
| JP | H1-146570 | 6/1989 |
| JP | 03061157 A | 3/1991 |
| JP | 04030883 | 2/1992 |
| JP | 04042896 | 10/1992 |
| JP | 6343767 | 12/1994 |
| KR | 20070101487 | 10/2007 |
| WO | 03/015891 | 12/2003 |
| WO | WO03105981 | 12/2003 |
| WO | 2006-136792 | 12/2006 |
| WO | 2006136792 | 12/2006 |
| WO | 2011/038280 | 3/2011 |
| WO | 2011/038281 | 3/2011 |
| WO | 2011038273 A1 | 3/2011 |

OTHER PUBLICATIONS

Office Action dated Jul. 16, 2012 in Australian Application No. 2012201317, 3 pages.

EPO Office Communicated dated Jul. 23, 2012 in EP Application No. 12163857.1, 5 pages.

EPO Office Communicated dated Jul. 23, 2012 in EP Application No. 12166840.4, 3 pages.

Notification of Transmittal of the ISR and the Written Opinion of the ISA, or Declaration (1 page); ISR (4 pages); and Written Opinion of the ISA (5 pages), mailed Jun. 7, 2012 for application PCT/US2012/027914.

Search Report dated Jul. 4, 2012 in EP Application No. 12163857.1, 3 pages.

Office Action dated Aug. 3, 2012 in Chinese Application No. 201080001431.X, 18 pages.

Greenberg Taurig Letter dated Aug. 10, 2012 (2 pages).

*Innovation First, Inc., and Innovation First Labs, Inc. v. Toy Investment, Inc. d/b/a Toysmith, and McManemim Companies*, Civil Action No. 3:12-CV-02091-M, Answer to Complaint, Filed Aug. 20, 2012 (7 pages).

*Innovation First, Inc., and Innovation First Labs, Inc. v. Toy Investment, Inc. d/b/a Toysmith, and McManemim Companies*, Civil Action No. 3:12-CV-02091-M, Plaintiffs' Complaint for Patent Infringement, Filed Jun. 29, 2012 (45 pages).

Davis Wright Tremaine LLP Letter dated Aug. 1, 2012 (3 pages).

http://www.klutz.com/Invasion-of-the-Bristlebots, [online] Invasion of the Bristlebots, 8 pages, retrieved Oct. 20, 2010.

http://www.streettech.com/modules, [online] Hot-To: Build BEAM Vibrobots, Street Tech, Hardware beyond the hype, 7 pages, retrieved Oct. 20, 2010.

http://www.evilmadscientist.com/article.php/bristlebot, [online] Bristlebot: A tiny directional vibrobot—Evil Mad Scientist Laboratories, 21 pages, retrieved Oct. 20, 2010.

http://themombuzz.mom/2009/12/11/stocking-stuffer-nascar-zipbot-race-set, [online] Stocking Stuffer: NASCAR Zipbot Race Set: The Mom Buzz, 10 pages, retrieved Oct. 20, 2010.

http://blog.makezine.com/archive/2008/04/rc_bristlebot.html, [online] RC Bristlebot, Aug. 30, 2010.

Publisher Klutz Lives Up to Its Name: "Bristlebots," Scholastic, and Evil Mad Scientist Lab http://boingboing.net/2009/02/20/publisher-klutz-live.html, Xeni Jardin at 9:06 am, Feb. 20, 2009.

Vibrobot, "Make a Twitchy, Bug-Like Robot with a Toy Motor and a Mint Tin" http://makezine,com/10/123_vibrobot/, 2007.

Vibrobot, Hot to—Make a Bristlebot a Tiny Directional Vibrobot Made From a Toothbrush! http://blog.makezine.com/archive/2007/12/how_to_make_a_bristlebot.html, 2007.

(56) References Cited

OTHER PUBLICATIONS

BotJunkie, DIY Vibrobots, http://www.botjunkie.com/2007/12/20/diy-vibrobots/, 2007.
Notification of Transmittal of the ISR and the Written Opinion of the ISA, or Declaration (1 page); ISR (2 pages); and Written Opinion of the ISA (29 pages), mailed Nov. 22, 2010 for application 050238.
Office Action dated Oct. 28, 2010 in Australian Application No. 2010224405.
http://www.evilmadscientist.com/article.php/bristlebot, OSKAY, Dec. 19, 2007.
http://www.youtube.com/watch?v=h6jowo3OxAQ, Innovation First, Sep. 18, 2009.
Notification of Transmittal of the ISR and the Written Opinion of the ISA, or Declaration (1 page); ISR (4 pages); and Written Opinion of the ISA (6 pages), mailed Feb. 14, 2011 for application PCT/US2010/050261.
Notification of Transmittal of the ISR and the Written Opinion of the ISA, or Declaration (1 page); ISR (4 pages); and Written Opinion of the ISA (6 pages), mailed Feb. 15, 2011 for application PCT/US2010/050265.
Notification of Transmittal of the ISR and the Written Opinion of the ISA, or Declaration (1 page); ISR (4 pages); and Written Opinion of the ISA (6 pages), mailed Feb. 3, 2011 for application PCT/US2010/050258.
Notification of Transmittal of the ISR and the Written Opinion of the ISA, or Declaration (1 page); ISR (4 pages); and Written Opinion of the ISA (7 pages), mailed Feb. 3, 2011 for application PCT/US2010/050281.
Notification of Transmittal of the ISR and the Written Opinion of the ISA, or Declaration (1 page); ISR (4 pages); and Written Opinion of the ISA (6 pages), mailed Feb. 3, 2011 for application PCT/US2010/050266.
Notification of Transmittal of the ISR and the Written Opinion of the ISA, or Declaration (1 page); ISR (4 pages); and Written Opinion of the ISA (5 pages), mailed Jan. 26, 2011 for application PCT/US2010/050256.
EPO Search Report dated Jan. 27, 2011 in related EP Application No. 10179680.3, 3 pages.
EPO Communication dated Feb. 10, 2011 in related EP Application No. 10179680.3, 5 pages.
EPO Search Report dated Feb. 3, 2011 in related EP Application No. 10179686.0, 3 pages.
EPO Search Report dated Feb. 3, 2011 in related EP Application No. 10179694.4, 3 pages.
EPO Search Report dated Feb. 3, 2011 in related EP Application No. 10179701.7, 3 pages.
EPO Search Report dated Feb. 3, 2011 in related EP Application No. 10179706.6, 3 pages.
EPO Search Report dated Feb. 15, 2011 in related EP Application No. 10179707.4, 3 pages.
EPO Communication dated Mar. 31, 2011 in related EP Application No. 10179686.0, 5 pages.
EPO Communication dated Mar. 31, 2011 in related EP Application No. 10179694.4, 5 pages.
EPO Communication dated Mar. 31, 2011 in related EP Application No. 10179701.7, 5 pages.
EPO Communication dated Mar. 31, 2011 in related EP Application No. 10179706.6, 4 pages.
Notification of Transmittal of the ISR and the Written Opinion of the ISA, or Declaration (1 page); ISR (7 pages); and Written Opinion of the ISA (10 pages), mailed Mar. 25, 2011 for application PCT/US2010/050257.
German Search Report dated Sep. 20, 2011 in related German Application No. 102010046513.5, 5 pages.
German Search Report dated Sep. 20, 2011 in related German Application No. 102010046511.9, 5 pages.
German Search Report dated Sep. 20, 2011 in related German Application No. 102010046509.7, 5 pages.
German Search Report dated Sep. 20, 2011 in related German Application No. 102010046440.6, 5 pages.
German Search Report dated Sep. 20, 2011 in related German Application No. 102010046510.0, 5 pages.
German Search Report dated Sep. 20, 2011 in related German Application No. 102010046441.4, 5 pages.
Translation of JP6343767.
Shantou GoldRosita Intelligent Electronic Toys Industrial Co., Lit., Scoot Micro-Robotic Vehicles, pictures of product, product available over the Internet; manufactured in Guangdong, China.

\* cited by examiner

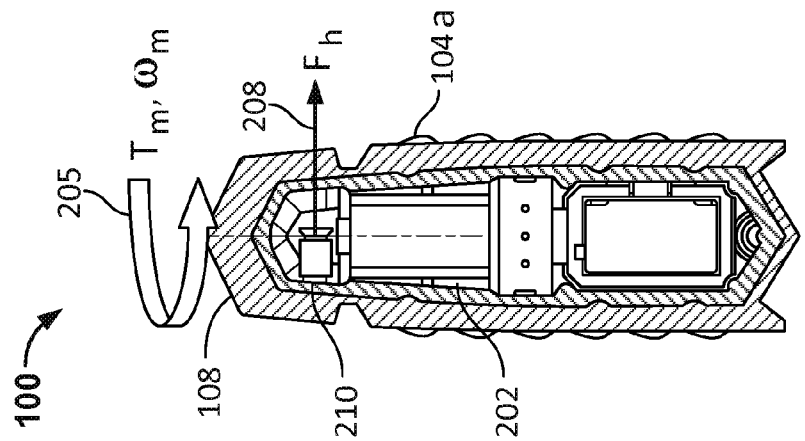
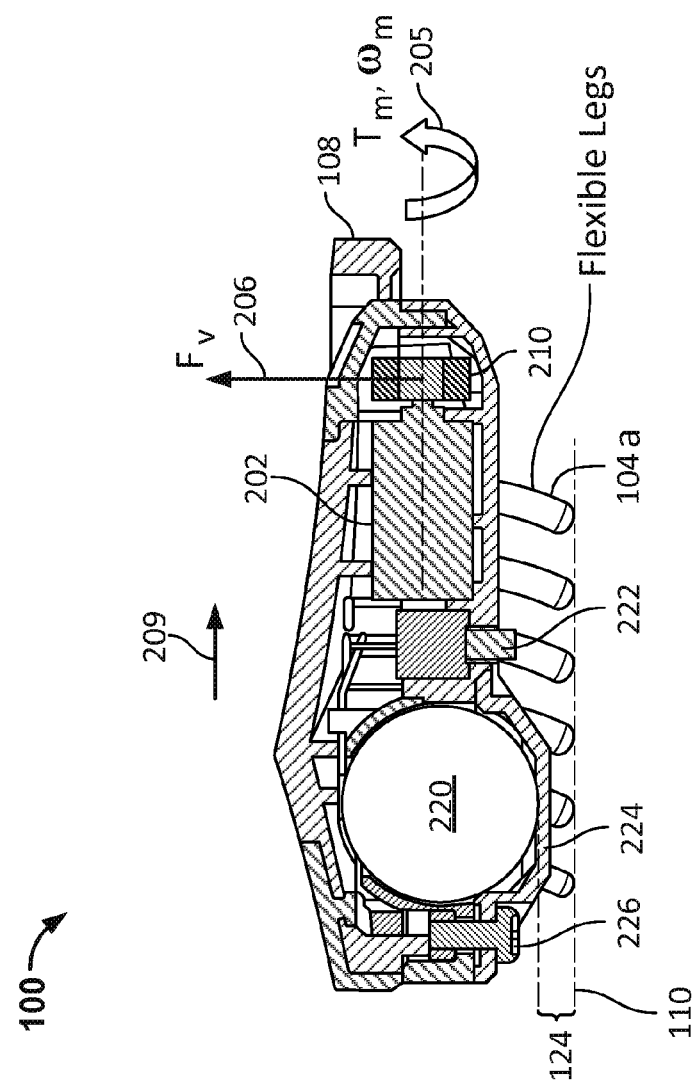

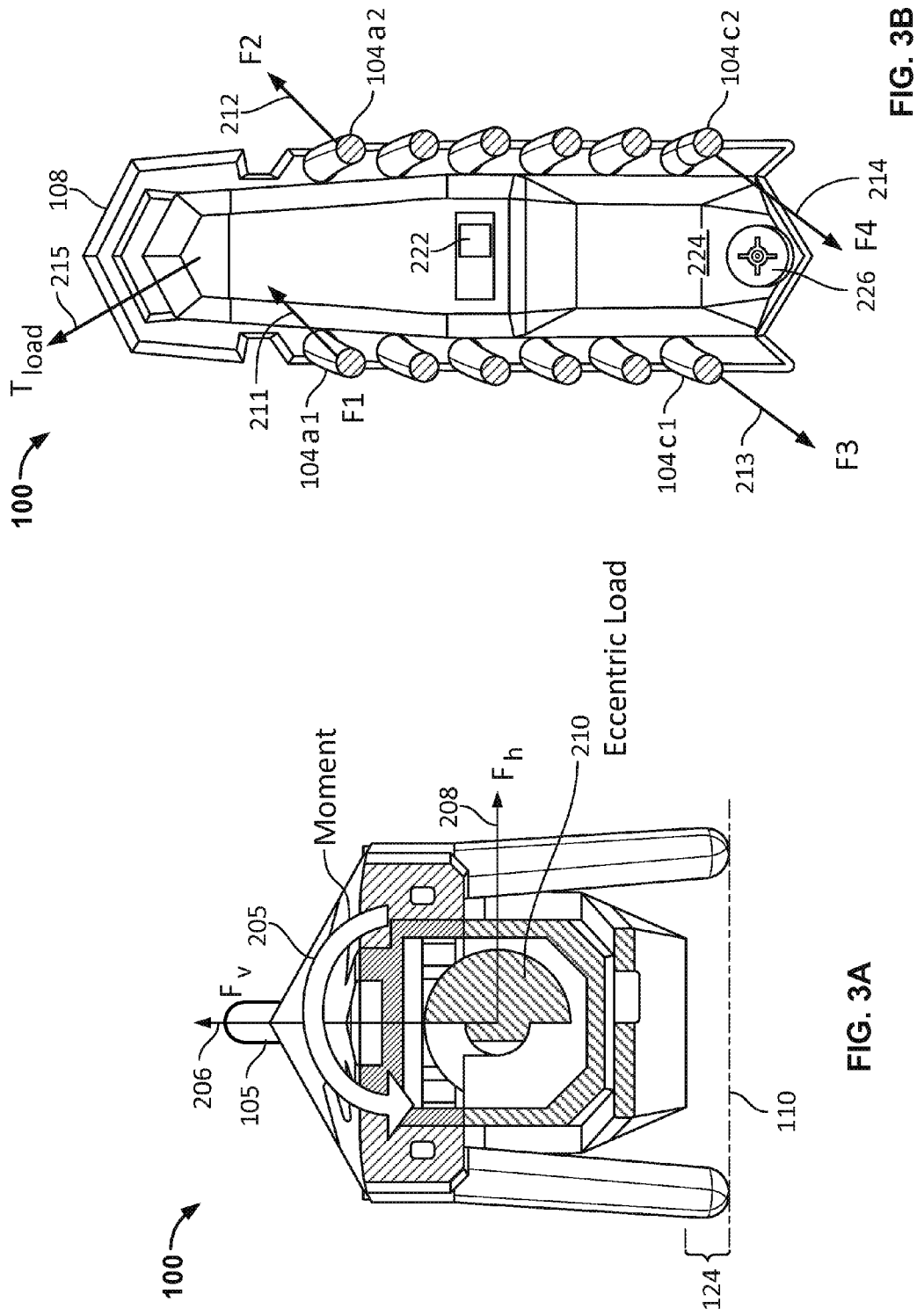

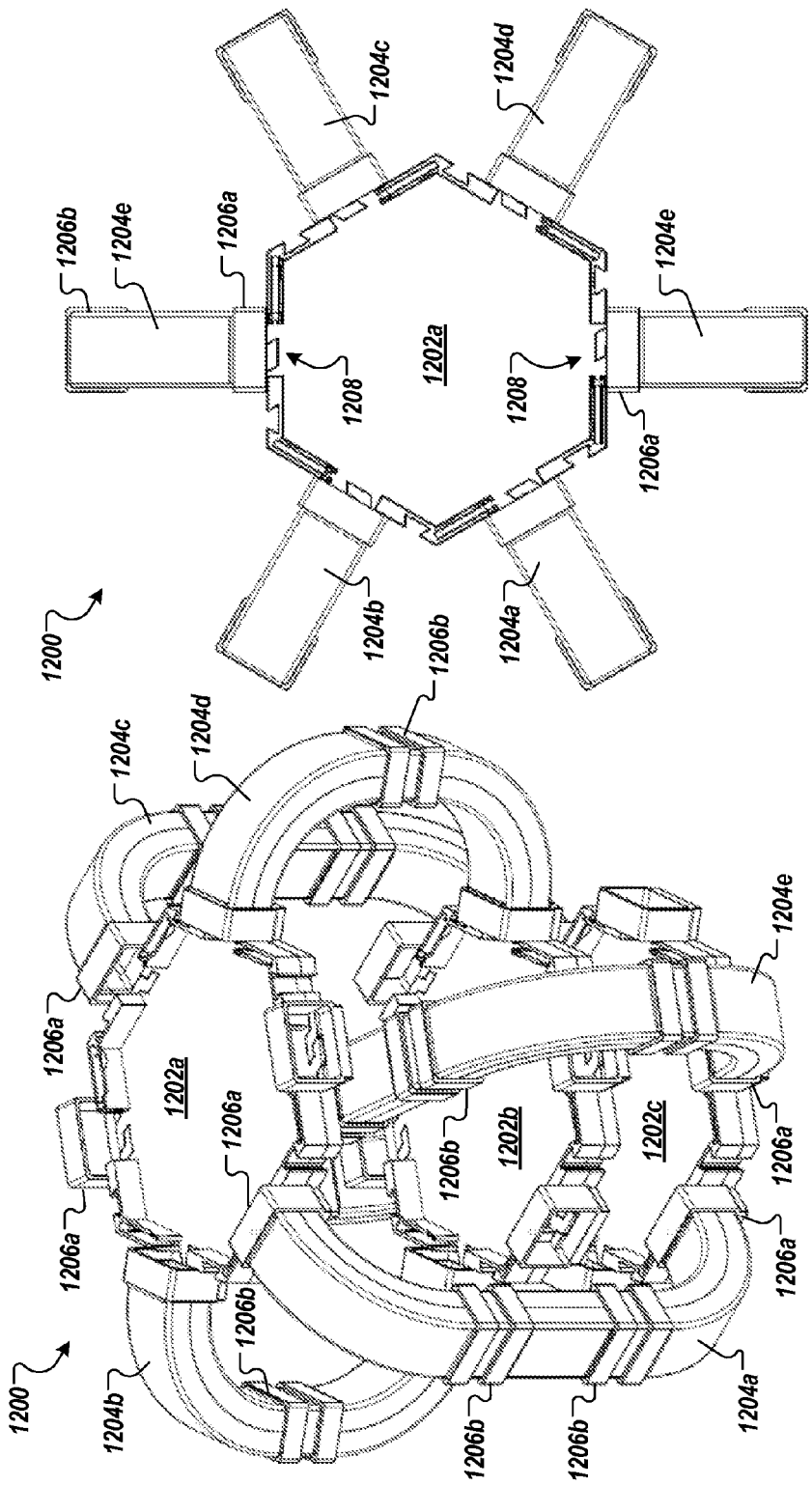

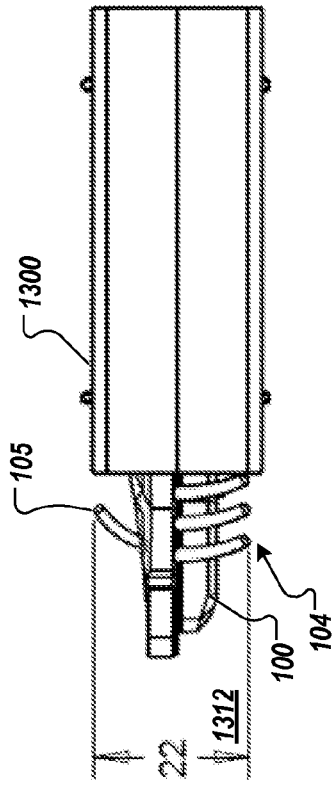
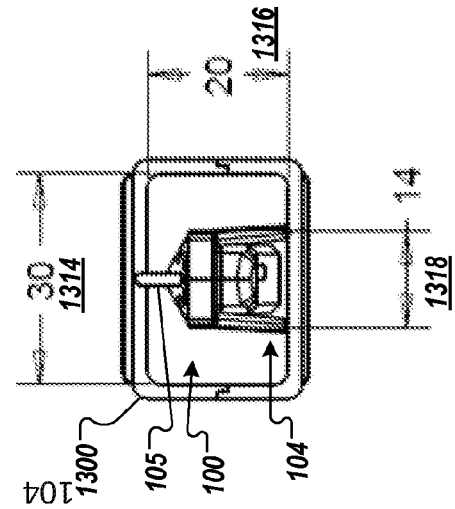
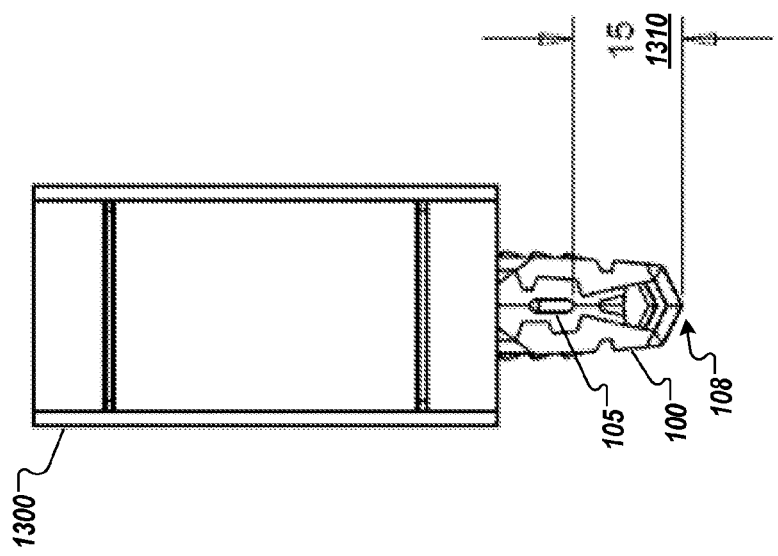
FIG. 13F
FIG. 13G
FIG. 13E

CLIMBING VIBRATION-DRIVEN ROBOT

CROSS REFERENCE TO RELATED APPLICATIONS

This application is a divisional application of U.S. patent application Ser. No. 13/433,758, which claims the benefit under 35 U.S.C. §119 of Chinese Patent Application No. 201110461296.3, entitled "Climbing Vibration-Driven Robot," filed Dec. 30, 2011, which is incorporated herein by reference in its entirety.

BACKGROUND

This specification relates to devices that move based on oscillatory motion and/or vibration.

One example of vibration driven movement is a vibrating electric football game. A vibrating horizontal metal surface induced inanimate plastic figures to move randomly or slightly directionally. More recent examples of vibration driven motion use internal power sources and a vibrating mechanism located on a vehicle.

One method of creating movement-inducing vibrations is to use rotational motors that spin a shaft attached to a counterweight. The rotation of the counterweight induces an oscillatory motion. Power sources include wind up springs that are manually powered or DC electric motors. The most recent trend is to use pager motors designed to vibrate a pager or cell phone in silent mode. Vibrobots and Bristlebots are two modern examples of vehicles that use vibration to induce movement. For example, small, robotic devices, such as Vibrobots and Bristlebots, can use motors with counterweights to create vibrations. The robots' legs are generally metal wires or stiff plastic bristles. The vibration causes the entire robot to vibrate up and down as well as rotate. These robotic devices tend to drift and rotate because no significant directional control is achieved.

Vibrobots tend to use long metal wire legs. The shape and size of these vehicles vary widely and typically range from short 2" devices to tall 10" devices. Rubber feet are often added to the legs to avoid damaging tabletops and to alter the friction coefficient. Vibrobots typically have 3 or 4 legs, although designs with 10-20 exist. The vibration of the body and legs creates a motion pattern that is mostly random in direction and in rotation. Collision with walls does not result in a new direction and the result is that the wall only limits motion in that direction. The appearance of lifelike motion is very low due to the highly random motion.

Bristlebots are sometimes described in the literature as tiny directional Vibrobots. Bristlebots use hundreds of short nylon bristles for legs. The most common source of the bristles, and the vehicle body, is to use the entire head of a toothbrush. A pager motor and battery complete the typical design. Motion can be random and directionless depending on the motor and body orientation and bristle direction. Designs that use bristles angled to the rear with an attached rotating motor can achieve a general forward direction with varying amounts of turning and sideways drifting. Collisions with objects such as walls cause the vehicle to stop, then turn left or right and continue on in a general forward direction. The appearance of lifelike motion is minimal due to a gliding movement and a zombie-like reaction to hitting a wall.

SUMMARY

In general, one innovative aspect of the subject matter described in this specification can be embodied in an apparatus that includes a body, a vibrating mechanism coupled to the body, and a plurality of appendages each having an appendage base proximal to the body and an appendage tip distal to the body. At least a portion of the plurality of appendages are adapted to cause the apparatus to move across a surface in a forward direction generally defined by a longitudinal offset between the appendage base and the appendage tip as the vibrating mechanism causes the apparatus to vibrate. In addition, the plurality of appendages include two or more appendages disposed such that the appendage tips of the two or more appendages are adapted to contact opposing surfaces to produce a net force in a direction generally defined by a longitudinal offset between the appendage base and the appendage tip of the two or more appendages as the vibrating mechanism causes the apparatus to vibrate.

These and other embodiments can each optionally include one or more of the following features. The opposing surfaces include at least two surfaces. The opposing surfaces include opposing surfaces that are substantially parallel to one another. The at least two surfaces are disposed on an at least substantially enclosed conduit. The net force in a direction generally defined by an offset between the appendage base and the appendage tip of the two or more appendages exceeds an opposing gravitational force on the apparatus. The net force enables the apparatus to climb between substantially vertical opposing surfaces. Each of the two or more appendages, as a result of contact with a corresponding surface, produce a net force that includes a positive component force in a direction substantially perpendicular to the corresponding surface and a positive component force in a direction generally defined by a longitudinal offset between the appendage base and the appendage tip. The positive component force in the direction substantially perpendicular to the corresponding surface for one of the two or more appendages is substantially opposed to the positive component force in the direction substantially perpendicular to the corresponding surface for at least one other appendage of the two or more appendages. The plurality of appendages include a plurality of legs generally disposed in a first direction and the two or more appendages include a first appendage generally disposed in a second direction substantially opposite the first direction. The two or more appendages further include at least two legs of the plurality of legs, and the at least two legs and the first appendage are adapted to enable the apparatus to climb between substantially vertical surfaces that are spaced such that the appendage tips of the at least two legs and the appendage tip the first appendage apply alternating forces on the opposing surfaces. The legs are arranged in two rows, with the appendage base of the legs in each row coupled to the body substantially along a lateral edge of the body. The body includes a housing, a rotational motor is situated within the housing, the legs are integrally coupled to a portion of the housing at a leg base, and at least a portion of the housing is situated between the two rows of legs. At least one of the two or more appendages is removably attached to the body. The plurality of appendages include a plurality of legs generally disposed in a first direction and the two or more appendages include: a first appendage generally disposed in a second direction substantially perpendicular to the first direction; and a second appendage generally disposed in a third direction substantially perpendicular to the first direction and substantially opposite the second direction. The vibrating mechanism includes a rotational motor that rotates an eccentric load. The plurality of appendages include a plurality of legs generally disposed in a first direction, the rotational motor has an axis of rotation that passes within about 20% of the center of gravity of the apparatus as a percentage of the height of the apparatus, and the housing is configured to facilitate rolling of the apparatus about a longitudinal center of gravity of the apparatus, based on a rotation of the eccentric load, with the apparatus on a substantially flat surface when the legs are not oriented such that a leg tip of at least one leg on each lateral side of the body contacts a substantially level surface. The plurality of legs are arranged in two rows and the rows are substantially parallel to the axis of rotation of the rotational motor, and at least some of the leg tips that contact the substantially flat surface tend to substantially prevent rolling of the apparatus based on a spacing of the two rows of legs when the legs are oriented such that a leg tip of at least one leg on each lateral side of the body contacts the substantially flat surface. At least one of the two or more appendages are forward of a longitudinal center of gravity of the apparatus. Each of the plurality of appendages are constructed from a flexible material, injection molded, and integrally coupled to the body at the appendage base. Forces from rotation of the eccentric load interact with a resilient characteristic of at least one driving appendage to cause the at least one driving appendage to leave a support surface as the apparatus translates in the forward direction. A coefficient of friction of a portion of at least a subset of the legs that contact a support surface is sufficient to substantially eliminate drifting in a lateral direction. The eccentric load is configured to be located toward a front end of the apparatus relative to driving appendages, and the front end of the apparatus is defined by an end in a direction that the apparatus primarily tends to move as the rotational motor rotates the eccentric load. The plurality of appendages are integrally molded with at least a portion of the body. At least a subset of the plurality of appendages, including the two or more appendages, are curved, and a ratio of a radius of curvature of the curved appendages to appendage length of the appendages is in a range of 2.5 to 20.

In general, one innovative aspect of the subject matter described in this specification can be embodied in methods that include the actions of inducing vibration of a vibration-driven device, and causing the device to climb a substantially inclined, and at least partially enclosed, conduit using two or more appendages that deflect to allow movement of the device in the forward direction and that provide resistance to movement in a backward direction that is opposite the forward direction. The vibration-driven device includes a body and a plurality of molded legs each having a leg base and a leg tip at a distal end relative to the leg base. The legs are coupled to the body at the leg base and include at least one elastomeric driving leg, and vibration causes the device to move in a forward direction generally defined by an offset between the leg base and the leg tip of the at least one driving leg as the device vibrates. The two or more appendages further provide substantially opposing forces on the device, with each opposing force being in a direction substantially orthogonal to the forward direction.

These and other embodiments can each optionally include one or more of the following features. The device is supported on a surface, and the device is induced or otherwise caused to move across the surface in the forward direction generally defined by an offset between the leg base and the leg tip of the at least one driving leg as the device vibrates. Vibration of the device causes the at least one driving leg to deflect in a direction opposite the forward direction without substantial slipping of the at least one driving leg on the surface when net forces on the at least one driving leg are downward, and resiliency of the at least one elastomeric driving leg causes the at least one driving leg to deflect in the forward direction when net forces on the at least one driving leg are upward. Inducing vibration includes rotating an eccentric load. The two or more appendages are attached to the body of the device. At least one of the two or more appendages comprises one of the plurality of legs and at least one of the two or more appendages is attached to a top side of the body. The two or more appendages are attached to the conduit and contact the body of the device. The two or more appendages include at least three appendages. The two or more appendages are adapted to allow the device to climb a vertical conduit. The two or more appendages are attached to the device body, and the conduit, the device body, and the two or more appendages are configured such that each of the two or more appendages are repeatedly in contact with an internal surface of the conduit for sufficient periods to produce generally forward motion. Vibration of the device causes at least one of the two or more appendages to deflect in a direction opposite the forward direction without substantial slipping of the at least one appendage on a corresponding internal surface of the conduit when net forces on the at least one appendage are toward the corresponding internal surface, and resiliency of the at least one appendage causes the at least one appendage to deflect in the forward direction when net forces on the at least one appendage are away from the corresponding internal surface.

In general, one innovative aspect of the subject matter described in this specification can be embodied in an apparatus including a body, a vibrating mechanism coupled to the body, and a plurality of appendages each having an appendage base proximal to the body and an appendage tip distal to the body. At least a subset of the plurality of appendages extend from the body, are disposed such that each of the appendages in the subset contact one of a plurality of substantially parallel surfaces, and are adapted to cause the apparatus to climb up a substantially inclined surface as vibration induced by the vibrating mechanism causes the appendages in the subset to at least alternately contact one of the plurality of substantially parallel surfaces.

These and other embodiments can each optionally include one or more of the following features. Vibration induced by the vibrating mechanism causes at least one of the appendages in the subset to maintain at least substantially constant contact with one of the plurality of substantially parallel surfaces and at least one of the appendages in the subset to alternately contact and leave an opposing surface of the plurality of substantially parallel surfaces. At least one of the appendages in the subset maintains at least substantially constant contact with one of the plurality of substantially parallel surfaces and at least one of the appendages in the subset maintains substantially constant contact with an opposing surface of the plurality of substantially parallel surfaces. Contact by each of at least two of the appendages in the subset with a corresponding one of the plurality of surfaces provides substantially opposing forces that facilitate climbing of the substantially inclined surface by the apparatus. The subset of the plurality of appendages are adapted to produce a force in a forward direction generally defined by a longitudinal offset between an appendage base proximal to the body and an appendage tip distal from the body as the vibrating mechanism causes the appendages to substantially maintain constant contact with the two alternately contact one of the plurality of parallel surfaces. Each of the appendages in the subset are curved in a direction substantially opposite the forward direction and constructed from an elastomeric material.

In general, one innovative aspect of the subject matter described in this specification can be embodied in a system including an inclined conduit having two substantially parallel opposing surfaces, an autonomous device including a body, a vibrating mechanism coupled to the body, and a plurality of appendages each having an appendage base proximal to the body and an appendage tip distal to the body. At least a portion of the plurality of appendages are adapted to cause the apparatus to move across a surface in a forward direction generally defined by a longitudinal offset between the appendage base and the appendage tip as the vibrating mechanism causes the apparatus to vibrate. The plurality of appendages include two or more appendages disposed such that the appendage tips of the two or more appendages are adapted to contact the two substantially parallel opposing surfaces to produce a net force in a direction generally defined by a longitudinal offset between the appendage base and the appendage tip of the two or more appendages as the vibrating mechanism causes the apparatus to vibrate. The net force causes the autonomous device to climb the inclined conduit.

These and other embodiments can each optionally include one or more of the following features. The conduit comprises a tube. The conduit has a width sufficient to allow two of the autonomous devices to pass one another. The conduct includes at least one of a straight component, a curved component, an intersection component, or a connector. A plurality of conduit components are adapted to connect together to create a habitat.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A, 2B, 3A, and 3B are diagrams that illustrate example forces that are involved with movement of the vibration powered device of FIG. 1.

FIG. 12A shows an example tube habitat in which multiple devices can operate and interact.

FIG. 12B shows a top view of the tube habitat.

FIGS. 13E through 13G show example dimensions of the straight tube assembly.

Like reference numbers and designations in the various drawings indicate like elements.

DETAILED DESCRIPTION

Figure 1:
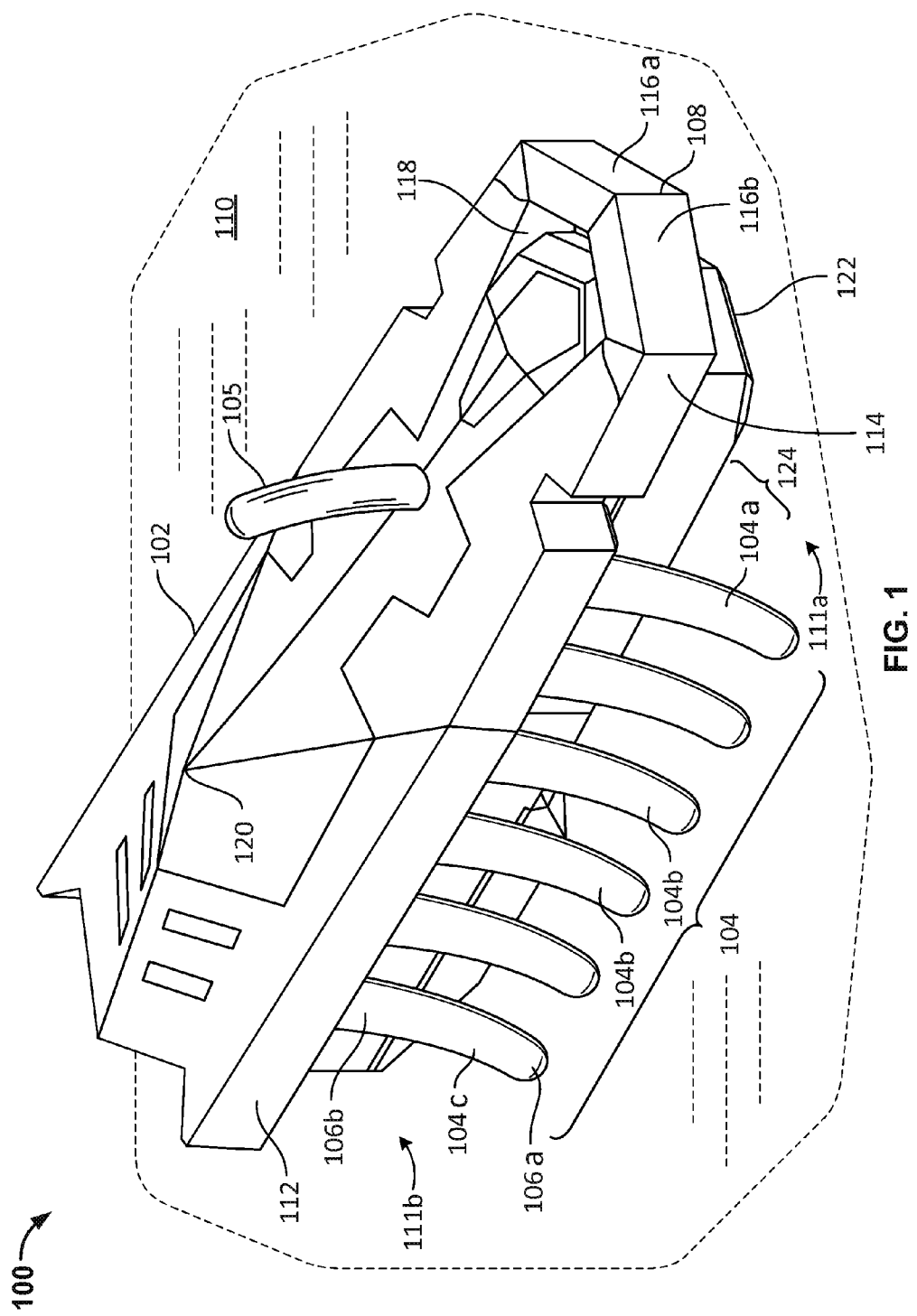
FIG. 1 is a diagram that illustrates an example vibration powered device.

Small robotic devices, or vibration-powered vehicles, can be designed to move across a surface, e.g., a floor, table, other relatively flat or smooth surface, or a concave or convex (e.g., in any direction) curved surface. The robotic device is adapted to move autonomously and, in some implementations, turn in seemingly random directions. In general, the robotic devices include a body (or housing), multiple appendages (e.g., legs and other appendages), and a vibrating mechanism (e.g., a motor or spring-loaded mechanical winding mechanism rotating an eccentric load, a motor or other mechanism adapted to induce oscillation of a counterweight, or other arrangement of components adapted to rapidly alter the center of mass of the device). As a result, the miniature robotic devices, when in motion, can resemble organic life, such as bugs or insects.

Movement of the robotic device can be induced by the motion of a rotational motor inside of, or attached to, the device, in combination with a rotating weight with a center of mass that is offset relative to the rotational axis of the motor. The rotational movement of the weight causes the motor and the robotic device to which it is attached to vibrate. In some implementations, the rotation is approximately in the range of 6000-9000 revolutions per minute (rpm's), although higher or lower rpm values can be used. As an example, the device can use the type of vibration mechanism that exists in many pagers and cell phones that, when in vibrate mode, cause the pager or cell phone to vibrate. The vibration induced by the vibration mechanism can cause the device to move across the surface (e.g., the floor), e.g., using legs that are configured to alternately flex (in a particular direction) and return to the original position as the vibration causes the device to move up and down.

Various features can be incorporated into the robotic devices. For example, various implementations of the devices can include variations of certain features, e.g., the shape of the legs and/or other appendages, the number of legs and/or other appendages, the frictional characteristics of the leg and/or other appendage tips, the relative stiffness or flexibility of the legs and/or other appendages, the resiliency of the legs and/or other appendages, the relative location of the rotating counterweight with respect to the legs and/or other appendages/legs, etc. For example, the variations of certain features can facilitate efficient transfer of vibrations to forward motion, including forward motion that can enable the device to climb at any angle and any orientation including right-side-up, upside-down, and sideways orientation. The speed and direction of the robotic device's movement can depend on many factors, including the rotational speed of the motor, the size of the offset weight attached to the motor, the power supply, the characteristics (e.g., size, orientation, shape, material, resiliency, frictional characteristics, etc.) of the appendages attached to the housing of the device, the properties of the surface on which the device operates, the overall weight of the device, and so on. While in general, appendages include legs upon which the device rests on a substantially flat surface and by which forward motion on the surface is achieved, the appendages can also include non-leg appendages (e.g., on the top or sides of the device) that provide other movement capabilities for the device, such as the ability of the device to climb, as will be described below.

In some implementations, the devices include features that are designed to compensate for a tendency of the device to turn as a result of the rotation of the counterweight and/or to alter the tendency for, and direction of, turning between different robotic devices. The components of the device can be positioned to maintain a relatively low center of gravity (or center of mass) to discourage tipping (e.g., based on the lateral distance between the leg tips) and to align the components with the rotational axis of the rotating motor to encourage rolling (e.g., when the device is not upright). Likewise, the device can be designed to encourage self-righting based on features that tend to encourage rolling when the device is on its back or side in combination with the relative flatness of the device when it is upright (e.g., when the device is "standing" on its leg tips). Features of the device can also be used to increase the appearance of random motion and to make the device appear to respond Intelligently to obstacles. Different leg configurations and placements can also induce different types of motion and/or different responses to vibration, obstacles, or other forces. Moreover, adjustable leg lengths can be used to provide some degree of steering capability. In some implementations, the robotic devices can simulate real-life objects, such as crawling bugs, rodents, or other animals and insects.

FIG. 1 is a diagram that illustrates an example vibration powered device 100 that is shaped like a bug. The device 100 includes a body (e.g., a housing 102, resembling the body of the bug) and appendages (e.g., legs 104). Inside (or attached to) the housing 102 are the components that control and provide movement for the device 100, including a rotational motor, power supply (e.g., a battery), and an on/off switch. Each of the appendages (e.g., legs 104) includes an appendage tip (e.g., a leg tip 106a) and an appendage base (e.g., a leg base 106b). Appendage bases are proximal to the body, and appendage tips are distal from the body. The properties of the appendages (e.g., the legs 104), including the position of each appendage base (e.g., the leg base 106b) relative to the appendage tip (e.g., the leg tip 106a), can contribute to the direction and speed in which the device 100 tends to move. For example, each appendage base is located farther forward than the tip, and this configuration allows the device 100 to move generally in the forward direction. The device 100 is depicted in an upright position (i.e., standing on the legs 104) on a supporting surface 110 (e.g., a substantially planar floor, table top, etc. that counteracts gravitational forces).

As shown in FIG. 1, the housing 102 includes at least a front 111a, a back 111b, lateral sides, a top, and a bottom. The device 100 tends to move toward the front 111a of the device 100 based on the configuration of the appendages. The plurality of appendages includes a plurality of legs 104 that are generally disposed in a first direction (e.g., extending substantially downward from the bottom of the housing 102). The plurality of appendages also include one or more other non-leg appendages generally disposed in at least a second direction (e.g., extending substantially upward from the top of the housing 102, outward from the side of the housing 102, or some combination thereof). In some implementations, the first and second directions are substantially opposite each other, while, in other implementations, the non-leg appendages can substantially oppose one another or, in combination, provide a force that is in substantial opposition to the plurality of legs 104 when the non-leg appendages are in contact with a surface.

For example, the non-leg appendages also include one or more climber-appendages (e.g., a top climber-appendage 105) that are disposed in directions opposite the legs 104. For example, unlike the legs 104 that point generally downward from the housing 102 (e.g., toward the surface 110), the top climber-appendage 105 points generally upward. As shown in FIG. 1, the top climber-appendage 105 may be shorter than the length of the legs 104, but long enough to project higher than the highest point on the housing 102. Further, the top climber-appendage 105 can project a little farther from the center of gravity of the housing 102 than, a little less than, or about the same as the distance that the legs 104 project below the center of gravity of the housing 102. As shown, the top climber-appendage 105 can have roughly the same curvature and slope as the legs 104, and the top climber-appendage 105 can be placed such that the appendage tip of the top climber-appendage 105 is near the leg tips of front legs 104a, e.g., in the longitudinal travel direction of the device. Other implementations are possible. For example, the top climber-appendage 105 can be further forward or back of the housing 102. In another example, the top climber-appendage 105 can have a different shape (e.g., including the curvature of the appendage) and size. In some implementations, multiple top climber-appendages 105 can exist, such as in rows and/or columns relative to the forward direction of the device 100.

Overview of Legs

Legs 104 can include front legs 104a, middle legs 104b, and rear legs 104c. For example, the device 100 can include a pair of front legs 104a that may be designed to perform differently from middle legs 104b and rear legs 104c. For example, the front legs 104a may be configured to provide a driving force for the device 100 by contacting an underlying surface 110 and causing the device to hop forward as the device vibrates. Middle legs 104b can help provide support to counteract material fatigue (e.g., after the device 100 rests on the legs 104 for long periods of time) that may eventually cause the front legs 104a to deform and/or lose resiliency. In some implementations, device 100 can exclude middle legs 104b and include only front legs 104a and rear legs 104c. In some implementations, front legs 104a and one or more rear legs 104c can be designed to be in contact with a surface, while middle legs 104b can be slightly off the surface so that the middle legs 104b do not introduce significant additional drag forces and/or hopping forces that may make it more difficult to achieve desired movements (e.g., tendency to move in a relatively straight line and/or a desired amount of randomness of motion).

In some implementations, the device 100 can be configured such that only two front legs 104a and one rear leg 104c are in contact with a substantially flat surface 110, even if the device includes more than one rear leg 104c and several middle legs 104b. In other implementations, the device 100 can be configured such that only one front leg 104a and two rear legs 104c are in contact with a flat surface 110. Throughout this specification, descriptions of being in contact with the surface can include a relative degree of contact. For example, when one or more of the front legs 104a and one or more of the back legs 104c are described as being in contact with a substantially flat surface 110 and the middle legs 104b are described as not being in contact with the surface 110, it is also possible that the front and back legs 104a and 104c can simply be sufficiently longer than the middle legs 104b (and sufficiently stiff) that the front and back legs 104a and 104c provide more support for the weight of the device 100 than do the middle legs 104b, even though the middle legs 104b are technically actually in contact with the surface 110. In some implementations, even legs that have a lesser contribution to support of the device may nonetheless be in contact when the device 100 is in an upright position, especially when vibration of the device causes an up and down movement that compresses and bends the driving legs and allows additional legs to contact the surface 110. Greater predictability and control of movement (e.g., in a straight direction) can be obtained by constructing the device so that a sufficiently small number of legs (e.g., fewer than twenty or fewer than thirty) contact the support surface 110 and/or contribute to the support of the device in the upright position when the device is either at rest or as the rotating eccentric load induces movement. In this respect, it is possible for some legs to provide support even without contacting the support surface 110 (e.g., one or more short legs can provide stability by contacting an adjacent longer leg to increase overall stiffness of the adjacent longer leg). Typically, however, each leg is sufficiently stiff that four or fewer legs are capable of supporting the weight of the device without substantial deformation (e.g., less than 5% as a percentage of the height of the leg base 106b from the support surface 110 when the device 100 is in an upright position).

Different leg lengths can be used to introduce different movement characteristics, as further discussed below. The various legs can also include different properties, e.g., different stiffnesses or coefficients of friction, as further described below. Generally, the legs can be arranged in substantially parallel rows along each lateral side of the device 100 (e.g., FIG. 1 depicts one row of legs on the right lateral side of the device 100; a corresponding row of legs (not shown in FIG. 1) can be situated along the left lateral side of the device 100).

In general, the number of legs 104 that provide meaningful or any support for the device can be relatively limited. For example, the use of less than twenty legs that contact the support surface 110 and/or that provide support for the device 100 when the device 100 is in an upright position (i.e., an orientation in which the one or more driving legs 104a are in contact with a support surface) can provide more predictability in the directional movement tendencies of the device 100 (e.g., a tendency to move in a relatively straight and forward direction), or can enhance a tendency to move relatively fast by increasing the potential deflection of a smaller number of legs, or can minimize the number of legs that may need to be altered to achieve the desired directional control, or can improve the manufacturability of fewer legs with sufficient spacing to allow room for tooling. In addition to providing support by contacting the support surface 110, legs 104 can provide support by, for example, providing increased stability for legs that contact the surface 110. In some implementations, each of the legs that provides independent support for the device 100 is capable of supporting a substantial portion of the weight of the device 100. For example, the legs 104 can be sufficiently stiff that four or fewer legs are capable of statically (e.g., when the device is at rest) supporting the device without substantial deformation of the legs 104 (e.g., without causing the legs to deform such that the body of the device 100 moves more than 5% as a percentage of the height of the leg base 106b from the support surface).

Figure 4:
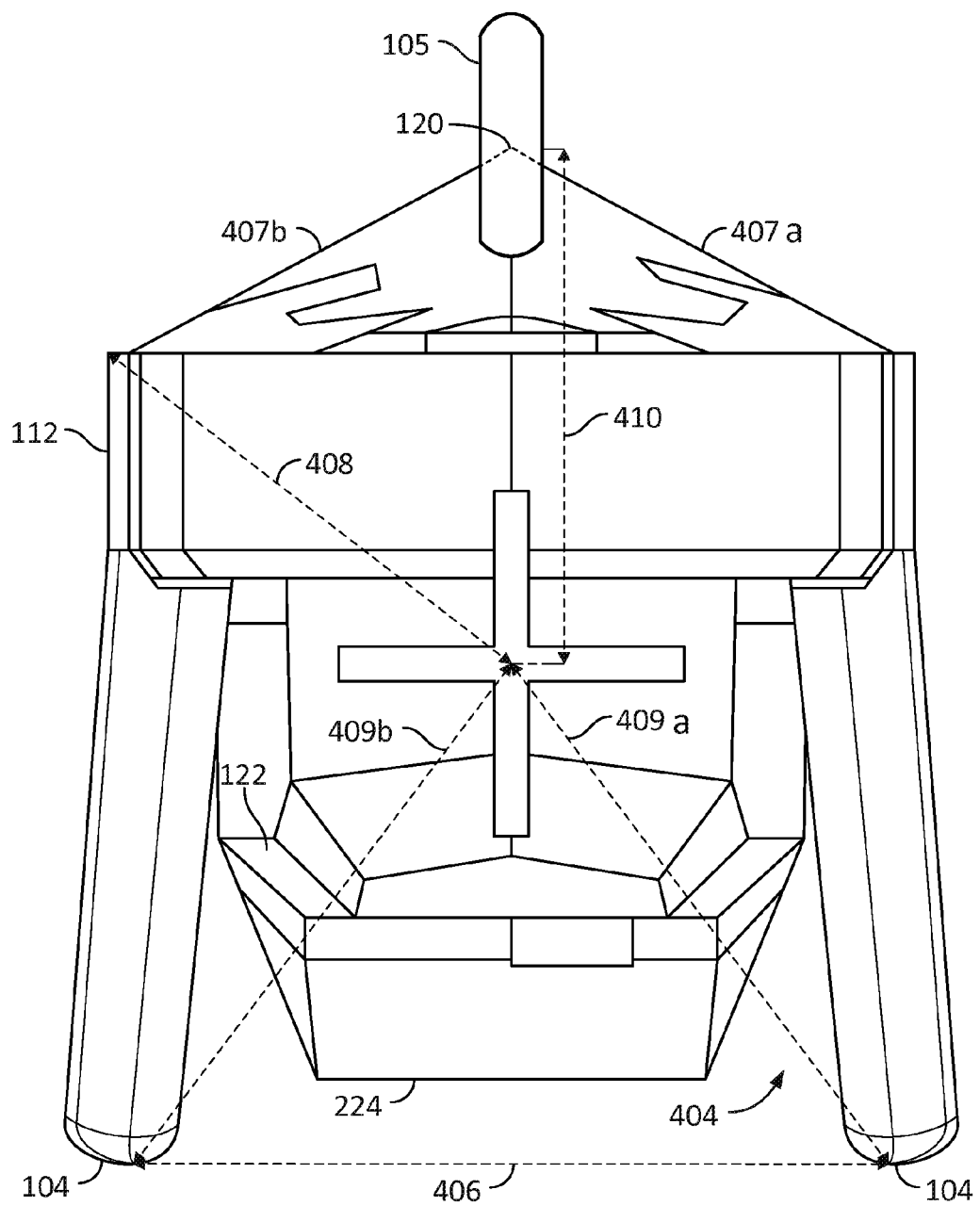
FIG. 4 shows an example front view indicating a center of gravity for the device.

As described here at a high level, many factors or features can contribute to the movement and control of the device 100. For example, the device's center of gravity (CG), and whether it is more forward or towards the rear of the device, can influence the tendency of the device 100 to turn. Moreover, a lower CG can help to prevent the device 100 from tipping over. The location and distribution of the legs 104 relative to the CG can also prevent tipping. For example, if pairs or rows of legs 104 on each side of the device 100 are too close together and the device 100 has a relatively high CG (e.g., relative to the lateral distance between the rows or pairs of legs), then the device 100 may have a tendency to tip over on its side. Thus, in some implementations, the device includes rows or pairs of legs 104 that provide a wider lateral stance (e.g., pairs of front legs 104a, middle legs 104b, and rear legs 104c are spaced apart by a distance that defines an approximate width of the lateral stance) than a distance between the CG and a flat supporting surface on which the device 100 rests in an upright position. For example, the distance between the CG and the supporting surface can be in the range of 50-80% of the value of the lateral stance (e.g., if the lateral stance is 0.5 inches, the CG may be in the range of 0.25-0.4 inches from the surface 110). Moreover, the vertical location of the CG of the device 100 can be within a range of 40-60% of the distance between a plane that passes through the leg tips 106a and the highest protruding surface on the top side of the housing 102. In some implementations, a distance 409a and 409b (as shown in FIG. 4) between each row of the tips of legs 104 and a longitudinal axis of the device 100 that runs through the CG can be roughly the same or less than the distance 406 (as shown in FIG. 4) between the tips 106a of two rows of legs 104 to help facilitate stability when the device is resting on both rows of legs.

The device 100 can also include features that generally compensate for the device's tendency to turn. Driving legs (e.g., front legs 104a) can be configured such that one or more legs on one lateral side of the device 100 can provide a greater driving force than one or more corresponding legs on the other lateral side of the device 100 (e.g., through relative leg lengths, relative stiffness or resiliency, relative fore/aft location in the longitudinal direction, or relative lateral distance from the CG). Similarly, dragging legs (e.g., back legs 104c) can be configured such that one or more legs on one lateral side of the device 100 can provide a greater drag force than one or more corresponding legs on the other lateral side of the device 100 (e.g., through relative leg lengths, relative stiffness or resiliency, relative fore/aft location in the longitudinal direction, or relative lateral distance from the CG). In some implementations, the leg lengths can be tuned either during manufacturing or subsequently to modify (e.g., increase or reduce) a tendency of the device to turn.

Movement of the device can also be influenced by the leg geometry of the legs 104. For example, a longitudinal offset between the leg tip (i.e., the end of the leg that touches the surface 110) and the leg base (i.e., the end of the leg that attaches to the device housing) of any driving legs induces movement in a forward direction as the device vibrates.

Including some curvature, at least in the driving legs, further facilitates forward motion as the legs tend to bend, moving the device forward, when vibrations force the device downward and then spring back to a straighter configuration as the vibrations force the device upward (e.g., resulting in hopping completely or partially off the surface, such that the leg tips move forward above or slide forward across the surface 110).

The ability of the legs to induce forward motion results in part from the ability of the device to vibrate vertically on the resilient legs. As shown in FIG. 1, the device 100 includes an underside 122. The power supply and motor for the device 100 can be contained in a chamber that is formed between the underside 122 and the upper body of the device, for example. The length of the legs 104 creates a space 124 (at least in the vicinity of the driving legs) between the underside 122 and the surface 110 on which the device 100 operates. The size of the space 124 depends on how far the legs 104 extend below the device relative to the underside 122. The space 124 provides room for the device 100 (at least in the vicinity of the driving legs) to move downward as the periodic downward force resulting from the rotation of the eccentric load causes the legs to bend. This downward movement can facilitate forward motion induced by the bending of the legs 104.

The device can also include the ability to self-right itself, for example, if the device 100 tips over or is placed on its side or back. For example, constructing the device 100 such that the rotational axis of the motor and the eccentric load are approximately aligned with the longitudinal CG of the device 100 tends to enhance the tendency of the device 100 to roll (i.e., in a direction opposite the rotation of the motor and the eccentric load). Moreover, construction of the device housing to prevent the device from resting on its top or side (e.g., using one or more protrusions on the top and/or sides of the device housing) and to increase the tendency of the device to bounce when on its top or side can enhance the tendency to roll. Furthermore, constructing the legs of a sufficiently flexible material and providing clearance on the housing undercarriage that the leg tips to bend inward can help facilitate rolling of the device from its side to an upright position.

FIG. 1 shows a body shoulder 112 and a head side surface 114, which can be constructed from rubber, elastomer, or other resilient material, contributing to the device's ability to self-right after tipping. The bounce from the shoulder 112 and the head side surface 114 can be significantly more than the lateral bounce achieved from the legs, which can be made of rubber or some other elastomeric material, but which can be less resilient than the shoulder 112 and the head side surface 114 (e.g., due to the relative lateral stiffness of the shoulder 112 and the head side surface 114 compared to the legs 104). Rubber legs 104, which can bend inward toward the body 102 as the device 100 rolls, increase the self-righting tendency, especially when combined with the angular/rolling forces induced by rotation of the eccentric load. The bounce from the shoulder 112 and the head side surface 114 can also allow the device 100 to become sufficiently airborne that the angular forces induced by rotation of the eccentric load can cause the device to roll, thereby facilitating self-righting.

The device can also be configured to include a degree of randomness of motion, which can make the device 100 appear to behave like an insect or other animate object. For example, vibration induced by rotation of the eccentric load can further induce hopping as a result of the curvature and "tilt" of the legs. The hopping can further induce a vertical acceleration (e.g., away from the surface 110) and a forward acceleration (e.g., generally toward the direction of forward movement of the device 100). During each hop, the rotation of the eccentric load can further cause the device to turn toward one side or the other depending on the location and direction of movement of the eccentric load. The degree of random motion can be increased if relatively stiffer legs are used to increase the amplitude of hopping. The degree of random motion can be influenced by the degree to which the rotation of the eccentric load tends to be either in phase or out of phase with the hopping of the device (e.g., out of phase rotation relative to hopping may increase the randomness of motion). The degree of random motion can also be influenced by the degree to which the back legs 104c tend to drag. For example, dragging of back legs 104c on both lateral sides of the device 100 may tend to keep the device 100 traveling in a more straight line, while back legs 104c that tend to not drag (e.g., if the legs bounce completely off the ground) or dragging of back legs 104c more on one side of the device 100 than the other can tend to increase turning.

Another feature is "Intelligence" of the device 100, which can allow the device to interact in an apparently intelligent manner with obstacles, including, for example, bouncing off any obstacles (e.g., walls, etc.) that the device 100 encounters during movement. For example, the shape of the nose 108 and the materials from which the nose 108 is constructed can enhance a tendency of the device to bounce off of obstacles and to turn away from the obstacle. Each of these features can contribute to how the device 100 moves, and will be described below in more detail.

FIG. 1 illustrates a nose 108 that can contribute to the ability of the device 100 to deflect off of obstacles. Nose left side 116a and nose right side 116b can form the nose 108. The nose sides 116a and 116b can form a shallow point or another shape that helps to cause the device 100 to deflect off obstacles (e.g., walls) encountered as the device 100 moves in a generally forward direction. The device 100 can includes a space within the head 118 that increases bounce by making the head more elastically deformable (i.e., reducing the stiffness). For example, when the device 100 crashes nose-first into an obstacle, the space within the head 118 allows the head of the device 100 to compress, which provides greater control over the bounce of the device 100 away from the obstacle than if the head 118 is constructed as a more solid block of material. The space within the head 118 can also better absorb impact if the device falls from some height (e.g., a table). The body shoulder 112 and head side surface 114, especially when constructed from rubber or other resilient material, can also contribute to the device's tendency to deflect or bounce off of obstacles encountered at a relatively high angle of incidence.

Wireless/Remote Control Embodiments

In some implementations, the device 100 includes a receiver that can, for example, receive commands from a remote control unit. Commands can be used, for example, to control the device's speed and direction, and whether the device is in motion or in a motionless state, to name a few examples. In some implementations, controls in the remote control unit can engage and disengage the circuit that connects the power unit (e.g., battery) to the device's motor, allowing the operator of the remote control to start and stop the device 100 at any time. Other controls (e.g., a joy stick, sliding bar, etc.) in the remote control unit can cause the motor in the device 100 to spin faster or slower, affecting the speed of the device 100. The controls can send the receiver on the device 100 different signals, depending on the commands that correspond to the movement of the controls. Controls can also turn on and off a second motor attached to a second eccentric load in the device 100 to alter lateral forces for the device 100, thereby changing a tendency of the device to turn and thus providing steering control. Controls in a remote control unit can also cause mechanisms in the device 100 to lengthen or shorten one or more of the legs and/or deflecting one or more of the legs forward, backward, or laterally to provide steering control.

Leg Motion and Hop

FIGS. 2A through 3B are diagrams that illustrate example forces that induce movement of the device 100 of FIG. 1. Some forces are provided by a rotational motor 202, which enable the device 100 to move autonomously across the surface 110. For example, the motor 202 can rotate an eccentric load 210 that generates moment and force vectors 205-215 as shown in FIGS. 2A-3B. Motion of the device 100 can also depend in part on the position of the legs 104 with respect to the counterweight 210 attached to the rotational motor 202. For example, placing the counterweight 210 in front of the front legs 104a will increase the tendency of the front legs 104a to provide the primary forward driving force (i.e., by focusing more of the up and down forces on the front legs). For example, the distance between the counterweight 210 and the tips of the driving legs can be within a range of 20-100% of an average length of the driving legs. Moving the counterweight 210 back relative to the front legs 104a can cause other legs to contribute more to the driving forces.

FIG. 2A shows a side view of the example device 100 shown in FIG. 1 and further depicts a rotational moment 205 (represented by the rotational velocity $\omega_m$ and motor torque $T_m$) and a vertical force 206 represented by F. FIG. 2B shows a top view of the example device 100 shown in FIG. 1 and further shows a horizontal force 208 represented by $F_h$. Generally, a negative $F_v$ is caused by upward movement of the eccentric load as it rotates, while a positive $F_v$ can be caused by the downward movement of the eccentric load and/or the resiliency of the legs (e.g., as they spring back from a deflected position).

The forces $F_v$ and $F_h$ cause the device 100 to move in a direction that is consistent with the configuration in which the leg base 106b is positioned in front of the leg tip 106a. The direction and speed in which the device 100 moves can depend, at least in part, on the direction and magnitude of $F_v$ and $F_h$. When the vertical force 206, $F_v$, is negative, the device 100 body is forced down. This negative $F_v$ causes at least the front legs 104a to bend and compress. The legs generally compress along a line in space from the leg tip to the leg base. As a result, the body will lean so that the leg bends (e.g., the leg base 106b flexes (or deflects) about the leg tip 106a towards the surface 110) and causes the body to move forward (e.g., in a direction from the leg tip 106a towards the leg base 106b). $F_v$, when positive, provides an upward force on the device 100 allowing the energy stored in the compressed legs to release (lifting the device), and at the same time allowing the legs to drag or hop forward to their original position. The lifting force $F_v$ on the device resulting from the rotation of the eccentric load combined with the spring-like leg forces are both involved in allowing the device to hop vertically off the surface (or at least reducing the load on the front legs 104a) and allowing the legs 104 to return to their normal geometry (i.e., as a result of the resiliency of the legs). The release of the spring-like leg forces, along with the forward momentum created as the legs bend, propels the device forward and upward, based on the angle of the line connecting the leg tip to the leg base, lifting the front legs 104a off the surface 110 (or at least reducing the load on the front legs 104a) and allowing the legs 104 to return to their normal geometry (i.e., as a result of the resiliency of the legs).

Generally, two "driving" legs (e.g., the front legs 104a, one on each side) are used, although some implementations may include only one driving leg or more than two driving legs. Which legs constitute driving legs can, in some implementations, be relative. For example, even when only one driving leg is used, other legs may provide a small amount of forward driving forces. During the forward motion, some legs 104 may tend to drag rather than hop. Hop refers to the result of the motion of the legs as they bend and compress and then return to their normal configuration—depending on the magnitude of $F_v$, the legs can either stay in contact with the surface or lift off the surface for a short period of time as the nose is elevated. For example, if the eccentric load is located toward the front of the device 100, then the front of the device 100 can hop slightly, while the rear of the device 100 tends to drag. In some cases, however, even with the eccentric load located toward the front of the device 100, even the back legs 104c may sometimes hop off the surface, albeit to a lesser extent than the front legs 104a. Depending on the stiffness or resiliency of the legs, the speed of rotation of the rotational motor, and the degree to which a particular hop is in phase or out of phase with the rotation of the motor, a hop can range in duration from less than the time required for a full rotation of the motor to the time required for multiple rotations of the motor. During a hop, rotation of the eccentric load can cause the device to move laterally in one direction or the other (or both at different times during the rotation) depending on the lateral direction of rotation at any particular time and to move up or down (or both at different times during the rotation) depending on the vertical direction of rotation at any particular time.

Increasing hop time can be a factor in increasing speed. The more time that the device spends with some of the leg off the surface 110 (or lightly touching the surface), the less time some of the legs are dragging (i.e., creating a force opposite the direction of forward motion) as the device translates forward. Minimizing the time that the legs drag forward (as opposed to hop forward) can reduce drag caused by friction of the legs sliding along the surface 110. In addition, adjusting the CG of the device fore and aft can effect whether the device hops with the front legs only, or whether the device hops with most, if not all, of the legs off the ground. This balancing of the hop can take into account the CG, the mass of the offset weight and its rotational frequency, $F_v$ and its location, and hop forces and their location(s).

Turning of Device

The motor rotation also causes a lateral force 208, $F_h$, which generally shifts back and forth as the eccentric load rotates. In general, as the eccentric load rotates (e.g., due to the motor 202), the left and right horizontal forces 208 are equal. The turning that results from the lateral force 208 on average typically tends to be greater in one direction (right or left) while the device's nose 108 is elevated, and greater in the opposite direction when the device's nose 108 and the legs 104 are compressed down. During the time that the center of the eccentric load 210 is traveling upward (away from the surface 110), increased downward forces are applied to the legs 104, causing the legs 104 to grip the surface 110, minimizing lateral turning of the device 100, although the legs may slightly bend laterally depending on the stiffness of the legs 104. During the time when the eccentric load 210 is traveling downward, the downward force on the legs 104 decreases, and downward force of the legs 104 on the surface 110 can be reduced, which can allow the device to turn laterally during the time the downward force is reduced. The direction of turning generally depends on the direction of the average lateral forces caused by the rotation of the eccentric load 210 during the time when the vertical forces are positive relative to when the vertical forces are negative. Thus, the horizontal force 208, $F_h$, can cause the device 100 to turn slightly more when the nose 108 is elevated. When the nose 108 is elevated, the leg tips are either off the surface 110 or less downward force is on the front legs 104a which precludes or reduces the ability of the leg tips (e.g., leg tip 106a) to "grip" the surface 110 and to provide lateral resistance to turning. Features can be implemented to manipulate several motion characteristics to either counteract or enhance this tendency to turn.

The location of the CG can also influence a tendency to turn. While some amount of turning by the device 100 can be a desired feature (e.g., to make the device's movement appear random), excessive turning can be undesirable. Several design considerations can be made to compensate for (or in some cases to take advantage of) the device's tendency to turn. For example, the weight distribution of the device 100, or more specifically, the device's CG, can affect the tendency of the device 100 to turn. In some implementations, having CG relatively near the center of the device 100 and roughly centered about the legs 104 can increase a tendency for the device 100 to travel in a relatively straight direction (e.g., not spinning around).

Tuning the drag forces for different legs 104 is another way to compensate for the device's tendency to turn. For example, the drag forces for a particular leg 104 can depend on the leg's length, thickness, stiffness and the type of material from which the leg is made. In some implementations, the stiffness of different legs 104 can be tuned differently, such as having different stiffness characteristics for the front legs 104a, rear legs 104c and middle legs 104b. For example, the stiffness characteristics of the legs can be altered or tuned based on the thickness of the leg or the material used for the leg. Increasing the drag (e.g., by increasing a leg length, thickness, stiffness, and/or frictional characteristic) on one side of the device (e.g., the right side) can help compensate for a tendency of the device to turn (e.g., to the left) based on the force $F_h$ induced by the rotational motor and eccentric load.

Altering the position of the rear legs 104c is another way to compensate for the device's tendency to turn. For example, placing the legs 104 further toward the rear of the device 100 can help the device 100 travel in a more straight direction. Generally, a longer device 100 that has a relatively longer distance between the front and rear legs 104c may tend to travel in more of a straight direction than a device 100 that is shorter in length (i.e., the front legs 104a and rear legs 104c are closer together), at least when the rotating eccentric load is located in a relatively forward position on the device 100. The relative position of the rearmost legs 104 (e.g., by placing the rearmost leg on one side of the device farther forward or backward on the device than the rearmost leg on the other side of the device) can also help compensate for (or alter) the tendency to turn.

Various techniques can also be used to control the direction of travel of the device 100, including altering the load on specific legs, adjusting the number of legs, leg lengths, leg positions, leg stiffness, and drag coefficients. As illustrated in FIG. 2B, the lateral horizontal force 208, $F_h$, causes the device 100 to have a tendency to turn as the lateral horizontal force 208 generally tends to be greater in one direction than the other during hops. The horizontal force 208, $F_h$ can be countered to make the device 100 move in an approximately straight direction. This result can be accomplished with adjustments to leg geometry and leg material selection, among other things.

FIG. 3A is a diagram that shows a rear view of the device 100 and further illustrates the relationship of the vertical force 206 $F_v$ and the horizontal force 208 $F_h$ in relation to each other. This rear view also shows the eccentric load 210 that is rotated by the rotational motor 202 to generate vibration, as indicated by the rotational moment 205.

Drag Forces

FIG. 3B is a diagram that shows a bottom view of the device 100 and further illustrates example leg forces 211-214 that are involved with direction of travel of the device 100. In combination, the leg forces 211-214 can induce velocity vectors that impact the predominant direction of travel of the device 100. The velocity vector 215, represented by $T_{load}$, represents the velocity vector that is induced by the motor/eccentricity rotational velocity (e.g., induced by the offset load attached to the motor) as it forces the driving legs 104 to bend, causing the device to lunge forward, and as it generates greater lateral forces in one direction than the other during hopping. The leg forces 211-214, represented by $F_1$-$F_4$ represent the reactionary forces of the legs 104a1-104c2, respectively, that can be oriented so the legs 104a1-104c2, in combination, induce an opposite velocity vector relative to Thad. As depicted in FIG. 3B, $T_{load}$ is a velocity vector that tends to steer the device 100 to the left (as shown) due to the tendency for there to be greater lateral forces in one direction than the other when the device is hopping off the surface 110. At the same time, the forces $F_1$-$F_2$ for the front legs 104a1 and 104a2 (e.g., as a result of the legs tending to drive the device forward and slightly laterally in the direction of the eccentric load 210 when the driving legs are compressed) and the forces $F_3$-$F_4$ for the rear legs 104c1 and 104c2 (as a result of drag) each contribute to steering the device 100 to the right (as shown). (As a matter of clarification, because FIG. 3B shows the bottom view of the device 100, the left-right directions when the device 100 is placed upright are reversed.) In general, if the combined forces $F_1$-$F_4$ approximately offset the side component of $T_{load}$, then the device 100 will tend to travel in a relatively straight direction.

Controlling the forces $F_1$-$F_4$ can be accomplished in a number of ways. For example, the "push vector" created by the front legs 104a1 and 104a2 can be used to counter the lateral component of the motor-induced velocity. In some implementations, this can be accomplished by placing more weight on the front leg 104a2 to increase the leg force 212, represented by $F_2$, as shown in FIG. 3B. Furthermore, a "drag vector" can also be used to counter the motor-induced velocity. In some implementations, this can be accomplished by increasing the length of the rear leg 104c2 or increasing the drag coefficient on the rear leg 104c2 for the force vector 804, represented by $F_4$, in FIG. 3B. As shown, the legs 104a1 and 104a2 are the device's front right and left legs, respectively, and the legs 104c1 and 104c2 are the device's rear right and left legs, respectively.

Another technique for compensating for the device's tendency to turn is increasing the stiffness of the legs 104 in various combinations (e.g., by making one leg thicker than another or constructing one leg using a material having a naturally greater stiffness). For example, a stiffer leg will have a tendency to bounce more than a more flexible leg. Left and right legs 104 in any leg pair can have different stiffnesses to compensate for the turning of the device 100 induced by the vibration of the motor 202. Stiffer front legs 104a can also produce more bounce.

Another technique for compensating for the device's tendency to turn is to change the relative position of the rear legs 104c1 and 104c2 so that the drag vectors tend to compensate for turning induced by the motor velocity. For example, the rear leg 104c2 can be placed farther forward (e.g., closer to the nose 108) than the rear leg 104c1.

Leg Shape

Leg geometry contributes significantly to the way in which the device 100 moves. Aspects of leg geometry include: locating the leg base in front of the leg tip, curvature of the legs, deflection properties of the legs, configurations that result in different drag forces for different legs, including legs that do not necessarily touch the surface, and having only three legs that touch the surface, to name a few examples.

Generally, depending on the position of the leg tip 106a relative to the leg base 106b, the device 100 can experience different behaviors, including the speed and stability of the device 100. For example, if the leg tip 106a is nearly directly below the leg base 106b when the device 100 is positioned on a surface, movement of the device 100 that is caused by the motor 202 can be limited or precluded. This is because there is little or no slope to the line in space that connects the leg tip 106a and the leg base 106b. In other words, there is no "lean" in the leg 104 between the leg tip 106a and the leg base 106b. However, if the leg tip 106a is positioned behind the leg base 106b (e.g., farther from the nose 108), then the device 100 can move faster, as the slope or lean of the legs 104 is increased, providing the motor 202 with a leg geometry that is more conducive to movement. In some implementations, different legs 104 (e.g., including different pairs, or left legs versus right legs) can have different distances between leg tips 106a and leg bases 106b.

In some implementations, the legs 104 are curved (e.g., leg 104a shown in FIG. 2A, and legs 104 shown in FIG. 1). For example, because the legs 104 are typically made from a flexible material, the curvature of the legs 104 can contribute to the forward motion of the device 100. Curving the leg can accentuate the forward motion of the device 100 by increasing the amount that the leg compresses relative to a straight leg. This increased compression can also increase device hopping, which can also increase the tendency for random motion, giving the device an appearance of intelligence and/or a more life-like operation. The legs can also have at least some degree of taper from the leg base 106b to the leg tip 106a, which can facilitate easier removal from a mold during the manufacturing process.

The number of legs can vary in different implementations. In general, increasing the number of legs 104 can have the effect of making the device more stable and can help reduce fatigue on the legs that are in contact with the surface 110. Increasing the number of legs can also affect the location of drag on the device 100 if additional leg tips 106a are in contact with the surface 110. In some implementations, however, some of the legs (e.g., middle legs 104b) can be at least slightly shorter than others so that they tend not to touch the surface 110 or contribute less to overall friction that results from the leg tips 106a touching the surface 110. For example, in some implementations, the two front legs 104a (e.g., the "driving" legs) and at least one of the rear legs 104c are at least slightly longer than the other legs. This configuration helps increase speed by increasing the forward driving force of the driving legs. In general, the remaining legs 104 can help prevent the device 100 from tipping over by providing additional resiliency should the device 100 start to lean toward one side or the other.

In some implementations, one or more of the "legs" can include any portion of the device that touches the ground. For example, the device 100 can include a single rear leg (or multiple rear legs) constructed from a relatively inflexible material (e.g., rigid plastic), which can resemble the front legs or can form a skid plate designed to simply drag as the front legs 104a provide a forward driving force. The oscillating eccentric load can repeat tens to several hundred times per second, which causes the device 100 to move in a generally forward motion as a result of the forward momentum generated when $F_v$ is negative.

Leg geometry can be defined and implemented based on ratios of various leg measurements, including leg length, diameter, and radius of curvature. One ratio that can be used is the ratio of the radius of curvature of the leg 104 to the leg's length. As just one example, if the leg's radius of curvature is 49.14 mm and the leg's length is 10.276 mm, then the ratio is 4.78. In another example, if the leg's radius of curvature is 2.0 inches and the leg's length is 0.4 inches, then the ratio is 5.0. Other leg 104 lengths and radii of curvature can be used, such as to produce a ratio of the radius of curvature to the leg's length that leads to suitable movement of the device 100. In general, the ratio of the radius of curvature to the leg's length can be in the range of 2.5 to 20.0. The radius of curvature can be approximately consistent from the leg base to the leg tip. This approximate consistent curvature can include some variation, however. For example, some taper angle in the legs may be required during manufacturing of the device (e.g., to allow removal from a mold). Such a taper angle may introduce slight variations in the overall curvature that generally do not prevent the radius of curvature from being approximately consistent from the leg base to the leg tip.

Another ratio that can be used to characterize the device 100 is a ratio that relates leg 104 length to leg diameter or thickness (e.g., as measured in the center of the leg or as measured based on an average leg diameter throughout the length of the leg and/or about the circumference of the leg). For example, the length of the legs 104 can be in the range of 0.2 inches to 0.8 inches (e.g., 0.405 inches) and can be proportional to (e.g., 5.25 times) the leg's thickness in the range of 0.03 to 0.15 inch (e.g., 0.077 inch). Stated another way, legs 104 can be about 15% to 25% as thick as they are long, although greater or lesser thicknesses (e.g., in the range of 5% to 60% of leg length) can be used. Leg 104 lengths and thicknesses can further depend on the overall size of the device 100. In general, at least one driving leg can have a ratio of the leg length to the leg diameter in the range of 2.0 to 20.0 (i.e., in the range of 5% to 50% of leg length). In some implementations, a diameter of at least 10% of the leg length may be desirable to provide sufficient stiffness to support the weight of the device and/or to provide desired movement characteristics.

Leg Material

The legs are generally constructed of rubber or other flexible but resilient material (e.g., polystyrene-butadiene-styrene with a durometer near 65, based on the Shore A scale, or in the range of 55-75, based on the Shore A scale). Thus, the legs tend to deflect when a force is applied. Generally, the legs include a sufficient stiffness and resiliency to facilitate consistent forward movement as the device vibrates (e.g., as the eccentric load 210 rotates). The legs 104 are also sufficiently stiff to maintain a relatively wide stance when the device 100 is upright yet allow sufficient lateral deflection when the device 100 is on its side to facilitate self-righting, as further discussed below.

The selection of leg materials can have an effect on how the device 100 moves. For example, the type of material used and its degree of resiliency can affect the amount of bounce in the legs 104 that is caused by the vibration of the motor 202 and the counterweight 210. As a result, depending on the material's stiffness (among other factors, including positions of leg tips 106b relative to leg bases 106a), the speed of the device 100 can change. In general, the use of stiffer materials in the legs 104 can result in more bounce, while more flexible materials can absorb some of the energy caused by the vibration of the motor 202, which can tend to decrease the speed of the device 100.

Frictional Characteristics

Friction (or drag) force equals the coefficient of friction multiplied by normal force. Different coefficients of friction and the resulting friction forces can be used for different legs. As an example, to control the speed and direction (e.g., tendency to turn, etc.), the leg tips 106a can have varying coefficients of friction (e.g., by using different materials) or drag forces (e.g., by varying the coefficients of friction and/or the average normal force for a particular leg). These differences can be accomplished, for example, by the shape (e.g., pointedness or flatness, etc.) of the leg tips 106a as well as the material of which they are made. Front legs 104a, for example, can have a higher friction than the rear legs 104c. Middle legs 104b can have yet different friction or can be configured such that they are shorter and do not touch the surface 110, and thus do not tend to contribute to overall drag. Generally, because the rear legs 104c (and the middle legs 104b to the extent they touch the ground) tend to drag more than they tend to create a forward driving force, lower coefficients of friction and lower drag forces for these legs can help increase the speed of the device 100. Moreover, to offset the motor force 215, which can tend to pull the device in a left or right direction, left and right legs 104 can have different friction forces. Overall, coefficients of friction and the resulting friction force of all of the legs 104 can influence the overall speed of the device 100. The number of legs 104 in the device 100 can also be used to determine coefficients of friction to have in (or design into) each of the individual legs 104. As discussed above, the middle legs 104b do not necessarily need to touch the surface 110. For example, middle (or front or back) legs 104 can be built into the device 100 for aesthetic reasons, e.g., to make the device 100 appear more life-like, and/or to increase device stability. In some implementations, devices 100 can be made in which only three (or a small number of) legs 104 touch the ground, such as two front legs 104a and one or two rear legs 104c.

The motor 202 is coupled to and rotates a counterweight 210, or eccentric load, that has a CG that is off axis relative to the rotational axis of the motor 202. The rotational motor 202 and counterweight 210, in addition to being adapted to propel the device 100, can also cause the device 100 to tend to roll, e.g., about the axis of rotation of the rotational motor 200. The rotational axis of the motor 202 can have an axis that is approximately aligned with a longitudinal CG of the device 100, which is also generally aligned with a direction of movement of the device 100.

FIG. 2A also shows a battery 220 and a switch 222. The battery 220 can provide power to the motor 202, for example, when the switch 222 is in the "ON" position, thus connecting an electrical circuit that delivers electric current to the motor 202. In the "OFF" position of the switch 222, the circuit is broken, and no power reaches the motor 202. The battery 220 can be located within or above a battery compartment cover 224, accessible, for example, by removing a screw 226, as shown in FIGS. 2A and 3B. The placement of the battery 220 and the switch 222 partially between the legs of the device 100 can lower the device's CG and help to prevent tipping. Locating the motor 202 lower within the device 100 also reduces tipping. Having legs 104 on the sides of a device 100 provides a space (e.g., between the legs 104) to house the battery 220, the motor 204 and the switch 222. Positioning these components 204, 220 and 222 along the underside of the device 100 (e.g., rather than on top of the device housing) effectively lowers the CG of the device 100 and reduces its likelihood of tipping.

The device 100 can be configured such that the CG is selectively positioned to influence the behavior of the device 100. For example, a lower CG can help to prevent tipping of the device 100 during its operation. As an example, tipping can occur as a result of the device 100 moving at a high rate of speed and crashing into an obstacle. In another example, tipping can occur if the device 100 encounters a sufficiently irregular area of the surface on which it is operating. The CG of the device 100 can be selectively manipulated by positioning the motor, switch, and battery in locations that provide a desired CG, e.g., one that reduces the likelihood of inadvertent tipping. In some implementations, the legs can be configured so that they extend from the leg tip 106a below the CG to a leg base 106b that is above the CG, allowing the device 100 to be more stable during its operation. The components of the device 100 (e.g., motor, switch, battery, and housing) can be located at least partially between the legs to maintain a lower CG. In some implementations, the components of the device (e.g., motor, switch and battery) can be arranged or aligned close to the CG to maximize forces caused by the motor 202 and the counterweight 210.

Self-Righting

Self-righting, or the ability to return to an upright position (e.g., standing on legs 104), is another feature of the device 100. For example, the device 100 can occasionally tip over or fall (e.g., falling off a table or a step). As a result, the device 100 can end up on its top or its side. In some implementations, self-righting can be accomplished using the forces caused by the motor 202 and the counterweight 210 to cause the device 100 to roll over back onto its legs 104. Achieving this result can be helped by locating the device's CG proximal to the motor's rotational axis to increase the tendency for the entire device 100 to roll. This self-righting generally provides for rolling in the direction that is opposite to the rotation of the motor 202 and the counterweight 210.

Provided that a sufficient level of roll tendency is produced based on the rotational forces resulting from the rotation of the motor 202 and the counterweight 210, the outer shape of the device 100 can be designed such that rolling tends to occur only when the device 100 is on its right side, top side, or left side. For example, the lateral spacing between the legs 104 can be made wide enough to discourage rolling when the device 100 is already in the upright position. Thus, the shape and position of the legs 104 can be designed such that, when self-righting occurs and the device 100 again reaches its upright position after tipping or falling, the device 100 tends to remain upright. In particular, by maintaining a flat and relatively wide stance in the upright position, upright stability can be increased, and, by introducing features that reduce flatness when not in an upright position, the self-righting capability can be increased.

To assist rolling from the top of the device 100, a high point 120 or a protrusion (e.g., appendage 105) can be included on the top of the device 100. The high point 120 or other protrusion can prevent the device from resting flat on its top. In addition, the high point 120 or other protrusion can prevent $F_h$ from becoming parallel to the force of gravity, and as a result, $F_h$ can provide enough moment to cause the device to roll, enabling the device 100 to roll to an upright position or at least to the side of the device 100. In some implementations, the high point 120 or other protrusion can be relatively stiff (e.g., a relatively hard plastic), while the top surface of the head 118 can be constructed of a more resilient material that encourages bouncing. Bouncing of the head 118 of the device when the device is on its back can facilitate self-righting by allowing the device 100 to roll due to the forces caused by the motor 202 and the counterweight 210 as the head 118 bounces off the surface 110.

Rolling from the side of the device 100 to an upright position can be facilitated by using legs 104 that are sufficiently flexible in combination with the space 124 (e.g., underneath the device 100) for lateral leg deflection to allow the device 100 to roll to an upright position. This space can allow the legs 104 to bend during the roll, facilitating a smooth transition from side to bottom. The shoulders 112 on the device 100 can also decrease the tendency for the device 100 to roll from its side onto its back, at least when the forces caused by the motor 202 and the counterweight 210 are in a direction that opposes rolling from the side to the back. At the same time, the shoulder on the other side of the device 100 (even with the same configuration) can be designed to avoid preventing the device 100 from rolling onto its back when the forces caused by the motor 202 and the counterweight 210 are in a direction that encourages rolling in that direction. Furthermore, use of a resilient material for the shoulder can increase bounce, which can also increase the tendency for self-righting (e.g., by allowing the device 100 to bounce off the surface 110 and allowing the counterweight forces to roll the device while airborne). Self-righting from the side can further be facilitated by adding appendages along the side(s) of the device 100 that further separate the rotational axis from the surface and increase the forces caused by the motor 202 and the counterweight 210.

The position of the battery on the device 100 can affect the device's ability to roll and right itself. For example, the battery can be oriented on its side, positioned in a plane that is both parallel to the device's direction of movement and perpendicular to the surface 110 when the device 100 is upright. This positioning of the battery in this manner can facilitate reducing the overall width of the device 100, including the lateral distance between the legs 104, making the device 100 more likely to be able to roll.

FIG. 4 shows an example front view indicating a center of gravity (CG) 402, as indicated by a large plus sign, for the device 100. This view illustrates a longitudinal CG 402 (i.e., a location of a longitudinal axis of the device 100 that runs through the device CG). In some implementations, the device's components are aligned to place the longitudinal CG close to (e.g., within 5-10% as a percentage of the height of the device) the physical longitudinal centerline of the device, which can reduce the rotational moment of inertia of the device, thereby increasing or maximizing the forces on the device as the rotational motor rotates the eccentric load. As discussed above, this effect increases the tendency of the device 100 to roll, which can enhance the self-righting capability of the device. FIG. 4 also shows a space 404 between the legs 104 and the underside 122 of the device 100 (including the battery compartment cover 224), which can allow the legs 104 to bend inward when the device is on its side, thereby facilitating self-righting of the device 100. FIG. 4 also illustrates a distance 406 between the pairs or rows of legs 104. Increasing the distance 406 can help prevent the device 100 from tipping. However, keeping the distance 406 sufficiently low, combined with flexibility of the legs 104, can improve the device's ability to self-right after tipping. In general, to prevent tipping, the distance 406 between pairs of legs needs to be increased proportionally as the CG 402 is raised.

The device high point 120 is shown in FIG. 4, although the high point 120 generally has limited effect in the presence of the top climber appendage 105. The size or height of the high point 120 (in the absence of the top climber appendage 105) or the top climber appendage 105 can be sufficiently large enough to prevent the device 100 from simply lying flat on its back after tipping, yet sufficiently small enough to help facilitate the device's roll and to force the device 100 off its back after tipping. A larger or higher high point 120 can sometimes be combined with "pectoral fins" or other side protrusions to increase the "roundness" of the device.

The tendency to roll of the device 100 can depend on the general shape of the device 100. For example, a device 100 that is generally cylindrical, particularly along the top of the device 100, can roll relatively easily. However, rolling can also occur when the device 100 includes the top climber-appendage 105, at least if the device 100 is adapted to bounce or otherwise hop high enough off of a surface to roll from one side of the top climber appendage 105 to the other side. Thus, even if the top of the device is not round, as is the case for the device shown in FIG. 4 that includes straight top sides 407a and 407b, the geometry of the top of the device 100 can still facilitate rolling. This rolling capability is especially true if distances 408 and 410 are relatively equal and each approximately defines the radius of the generally cylindrical shape of the device 100. Distance 408, for example, is the distance from the device's longitudinal CG 402 to the top of the shoulder 112. Distance 410 is the distance from the device's longitudinal CG 402 to the high point 120. Further, having a length of surface 407b (i.e., between the top of the shoulder 112 and the high point 120) that is less than the distances 408 and 410 can also increase the tendency of the device 100 to roll. Moreover, if the device's longitudinal CG 402 is positioned relatively close to the center of the cylinder that approximates the general shape of the device 100, then roll of the device 100 is further enhanced, as the forces caused by the motor 202 and the counterweight 210 are generally more centered. The device 100 can stop rolling once the rolling action places the device 100 on its legs 104, which provide a wide stance and serve to interrupt the generally cylindrical shape of the device 100.

Figure 5:
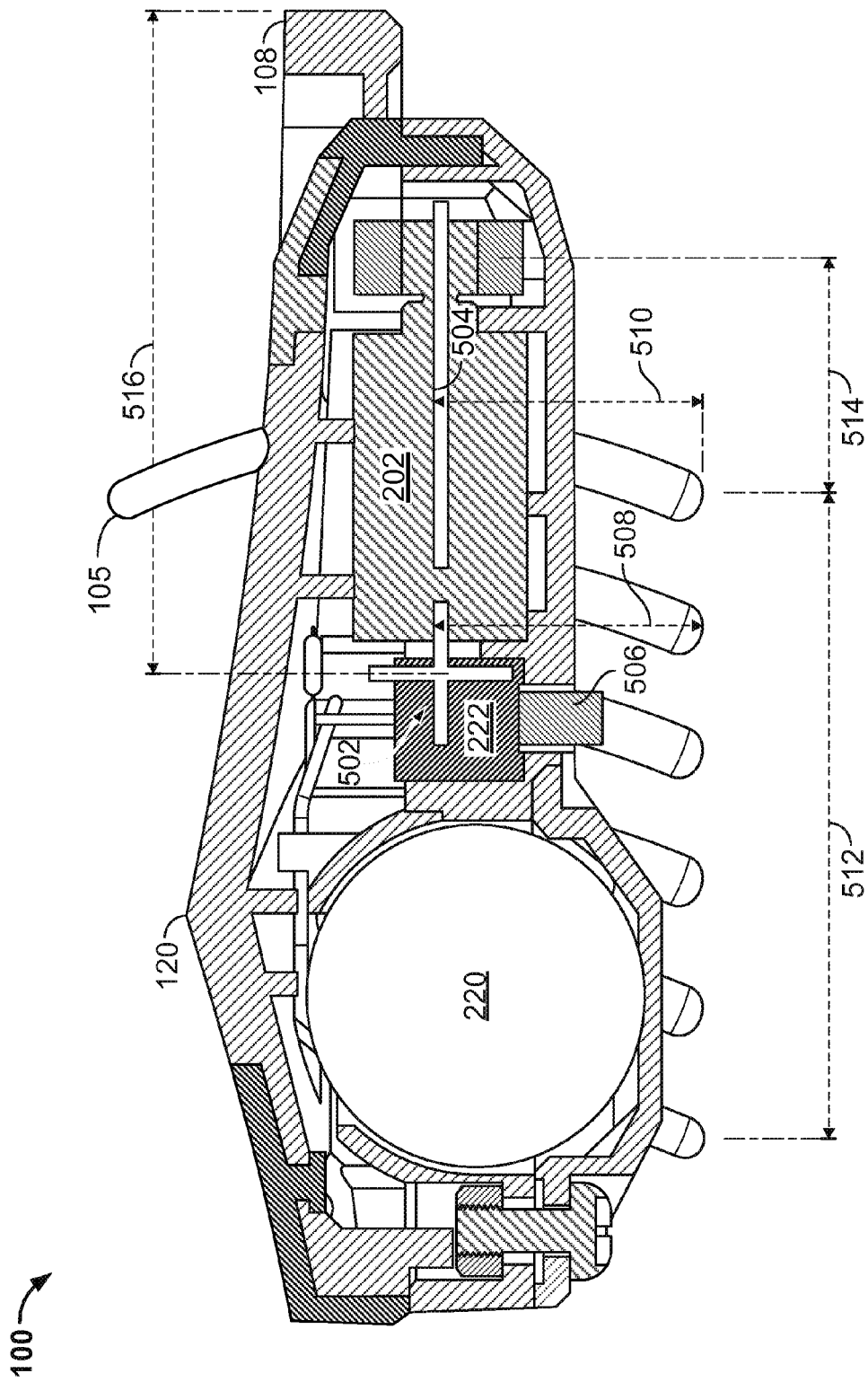
FIG. 5 shows an example side view indicating a center of gravity for the device.

FIG. 5 shows an example side view indicating a center of gravity (CG) 502, as indicated by a large plus sign, for the device 100. This view also shows a motor axis 504 which, in this example, closely aligns with the longitudinal component of the CG 502. The location of the CG 502 depends on, e.g., the mass, thickness, and distribution of the materials and components included in the device 100. In some implementations, the CG 502 can be farther forward or farther back from the location shown in FIG. 5. For example, the CG 502 can be located toward the rear end of the switch 222 rather than toward the front end of the switch 222 as illustrated in FIG. 5. In general, the CG 502 of the device 100 can be sufficiently far behind the front driving legs 104a and the rotating eccentric load (and sufficiently far in front of the rear legs 104c) to facilitate front hopping and rear drag, which can increase forward drive and provide a controlled tendency to go straight (or turn if desired) during hops. For example, the CG 502 can be positioned roughly halfway (e.g., in the range of roughly 40-60% of the distance) between the front driving legs 104a and the rear dragging legs 104c. Also, aligning the motor axis with the longitudinal CG can enhance forces caused by the motor 202 and the counterweight. In some implementations, the longitudinal component of the CG 502 can be near to the center of the height of the device (e.g., within about 3% of the CG as a proportion of the height of the device). Generally, configuring the device 100 such that the CG 502 is closer to the center of the height of the device will enhance the rolling tendency, although greater distances (e.g., within about 5% or within about 20% of the CG as a proportion of the height of the device) are acceptable in some implementations. Similarly, configuring the device 100 such that the CG 502 is within about 3-6% of the motor axis 504 as a percentage of the height of the device can also enhance the rolling tendency.

FIG. 5 also shows an approximate alignment of the battery 220, the switch 222 and the motor 202 with the longitudinal component of the CG 502. Although a sliding switch mechanism 506 that operates the on/off switch 222 hangs below the underside of the device 100, the overall approximate alignment of the CG of the individual components 220, 222 and 202 (with each other and with the CG 502 of the overall device 100) contributes to the ability of the device 100 to roll, and thus right itself. In particular, the motor 202 is centered primarily along the longitudinal component of the CG 502.

In some implementations, the high point 120 can be located behind the CG 502, which can facilitate self-righting in combination with the eccentric load attached to the motor 202 being positioned near the nose 108. As a result, if the device 100 is on its side or back, the nose end of the device 100 tends to vibrate and bounce (more so than the tail end of the device 100), which facilitates self-righting as the forces of the motor and eccentric load tend to cause the device to roll.

FIG. 5 also shows some of the sample dimensions of the device 100. For example, a distance 508 between the CG 502 and a plane that passes through the leg tips 106a on which the device 100 rests when upright on a flat surface 110 can be approximately 0.36 inches. In some implementations, this distance 508 is approximately 50% of the total height of the device (see FIGS. 7A & 7B), although other distances 508 may be used in various implementations (e.g., from about 40-60%). A distance 510 between the rotational axis 504 of the motor 202 and the same plane that passes through the leg tips 106a is approximately the same as the distance 508, although variations (e.g., 0.34 inches for distance 510 vs. 0.36 inches for distance 508) may be used without materially impacting desired functionality. Greater variations (e.g., 0.05 inches or even 0.1 inches) may be used in some implementations.

A distance 512 between the leg tip 106a of the front driving legs 104a and the leg tip 106a of the rearmost leg 104c can be approximately 0.85 inches, although various implementations can include other values of the distance 512 (e.g., between about 40% and about 75% of the length of the device 100). In some implementations, locating the front driving legs 104a behind the eccentric load 210 can facilitate forward driving motion and randomness of motion. For example, a distance 514 between a longitudinal centerline of the eccentric load 210 and the tip 106a of the front leg 104a can be approximately 0.36 inches. Again, other distances 514 can be used (e.g., between about 5% and about 30% of the length of the device 100 or between about 10% and about 60% of the distance 512). A distance 516 between the front of the device 100 and the CG 502 can be about 0.95 inches. In various implementations, the distance 516 may range from about 40-60% of the length of the device 100, although some implementations may include front or rear protrusions with a low mass that add to the length of the device but do not significantly impact the location of the CG 502 (i.e., therefore causing the CG 502 to be outside of the 40-60% range).

Figure 9A:
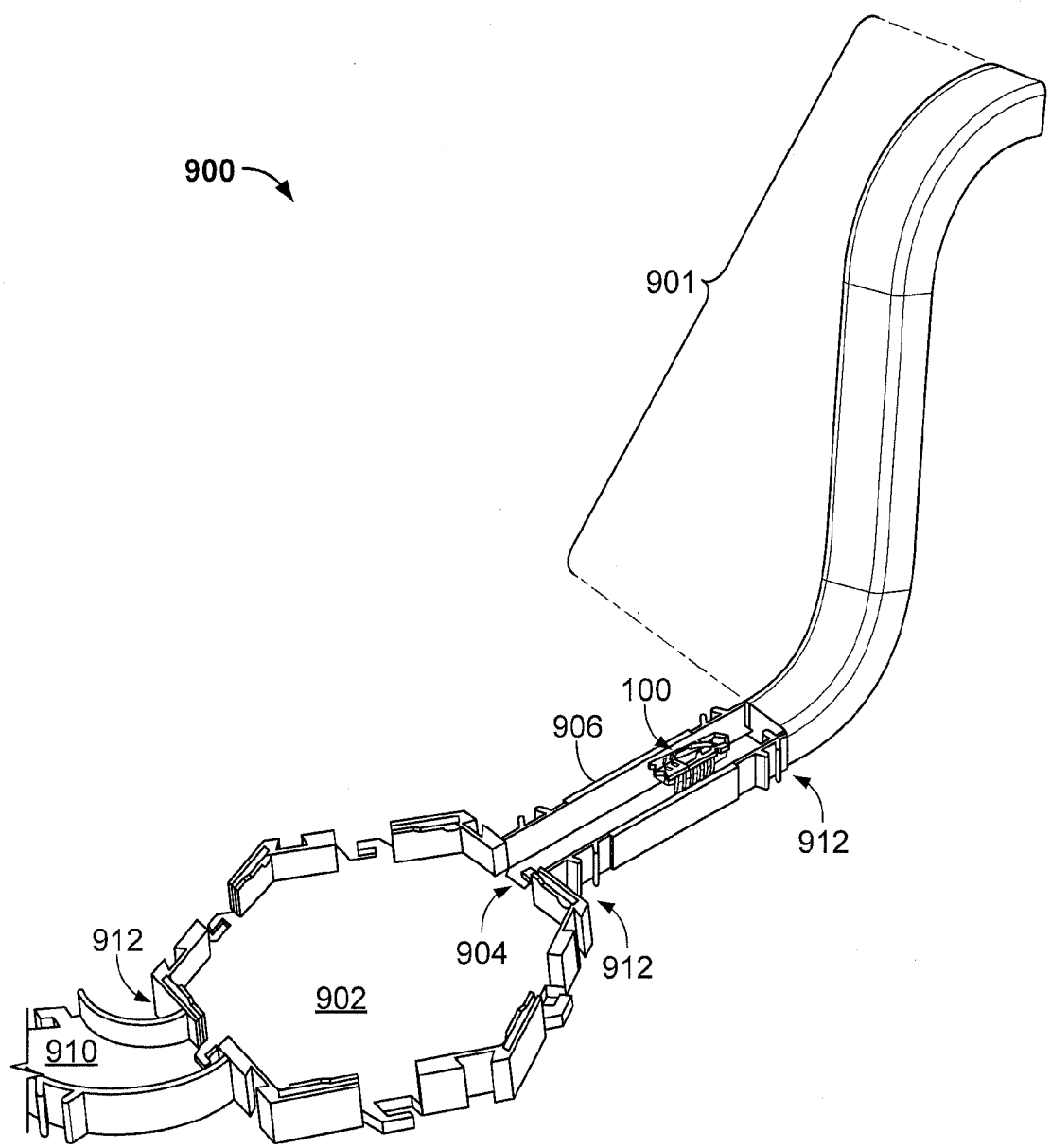
FIG. 9A shows an example environment in which the device can operate and climb inside a conduit.

FIG. 9A shows an example environment 900 in which the device 100 can operate and climb inside a conduit 901. Conduits can be substantially level or sloped, or may include combinations of sloped and level areas. Conduits can allow the device 100 to travel at any angle, including an inverted position. In the example shown in FIG. 9A, the environment 900 includes an arena 902 in which one or more devices 100 can operate. The arena 902 includes an opening 904 that leads to a connecting pathway 906 in which the device 100 is shown. The connecting pathway 906 is connected to the conduit 901 toward which the device 100 is pointed in this illustration (e.g., based on the position of the head and tail of the device 100). Sections of the environment 900, including a curved pathway 910 and other sections not shown in FIG. 9A, can be connected at connection points 912. For example, the connection points 912 can comprise snap-together parts (e.g., tongue-and-groove) of various sections and/or components of the environment 900 (e.g., the connecting pathway 906 and the conduit 901), although other ways of connecting sections of the environment 900 can be used.

The conduit 901 can be entirely or substantially enclosed. For example, in addition to the conduit 901 having a floor surface that can serve as a surface for the legs 104, a ceiling surface can exist that is opposite and substantially parallel to the floor surface. The floor surface and ceiling surface are interchangeable since the device 100 can travel right-side-up or up-side-down in any conduit or tube. The ceiling surface, for example, can be a surface that is contacted by the top climber-appendage 105 as the device 100 travels through the conduit 901. The conduit 901 can also include opposing wall surfaces (or partial wall surfaces) which can, in combination with the floor surface and the ceiling surface, serve to contain the device 100 as it travels through the conduit 901. Other configurations of surfaces can be used. Climbing by the device 100 occurs as vibration induced by the vibrating mechanism causes the legs 104 and the one or more top climber-appendages 105 to repeatedly flex, pushing the device 100 forward (e.g., inside a tube). While the device 100 moves forward, the legs 104 and the one or more top climber-appendages 105 maintain substantially constant contact with the substantially parallel surfaces (e.g., the floor surface and the ceiling surface). The device 100 may lose contact with either surface for a small percentage of the time, but movement by the device 100 is generally maintained in the forward direction. As a result, the device 100 can climb through any suitable tube that is sized such that the legs 104 and the one or more climber-appendages 105 contact the floor and ceiling surfaces to cause the device to move forward. Climbing by the device 100 can occur at any angle and orientation of the device 100. For example, the device 100 can climb straight up or at any angle upward. The device 100 can also descend downward at any angle, or can climb substantially horizontally. The device 100 can be right-side-up or up-side-down and still climb and descend. When the device 100 is descending, sufficient drag is provided by the legs 104 and the one or more climber-appendages 105 so as to provide a controlled decent.

During operation of the device 100, e.g., as the device 100 travels through the conduit 901, the legs 104 and the top climber-appendage 105 (or side climber-appendages 105a and 105b) are subjected to or produce forces that cause the device 100 to climb. For example, the forces include a net force in a direction generally defined by an offset between the appendage bases and the appendage tips of the two or more appendages. As a result, the device 100 climbs when the net force exceeds an opposing gravitational force on the device 100. Specifically, the forces exerted by the legs 104 and the top climber-appendages 105 (or side climber-appendages 105a and 105b) (e.g., as the device 100 vibrates up and down and/or side to side) provide a ratcheting effect, enabling the device 100 to climb between substantially vertical opposing surfaces (e.g., the floor surface and the ceiling surface). The ratcheting effect can result from the legs 104 bending and the top climber-appendages 105 (or side climber-appendages 105a and 105b) sliding forward as the center of gravity of the device 100 moves toward the floor surface (i.e., the surface that the legs 104 are contacting) and from the top climber-appendages 105 (or side climber-appendages 105a and 105b) bending and the legs 104 sliding forward as the center of gravity of the device 100 moves toward the ceiling surface (i.e., the surface that the top climber-appendages 105 (or side climber-appendages 105a and 105b) are contacting).

Figure 9B:
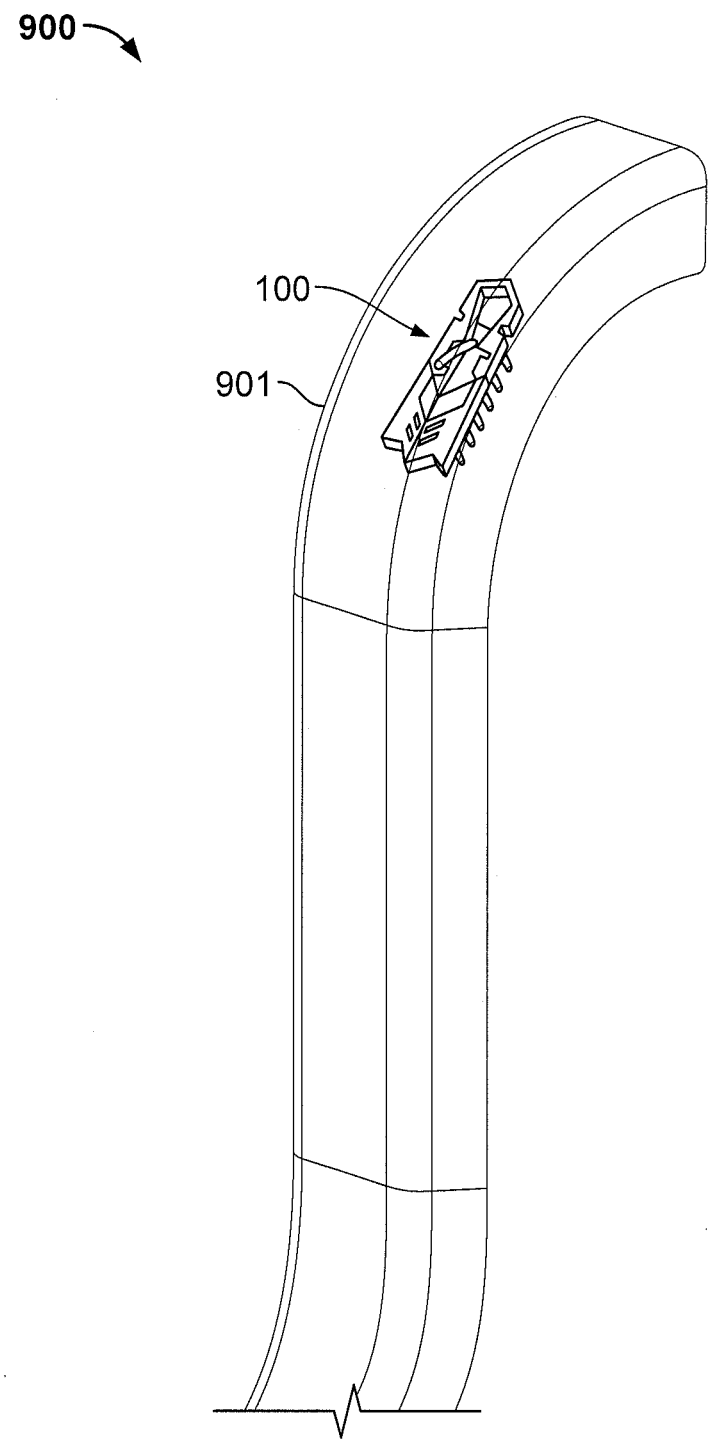
FIG. 9B shows the example environment in which the device has climbed inside of and nearly to the top of the conduit.

FIG. 9B shows the example environment 900 in which the device 100 has climbed inside of and nearly to the top of the conduit 901. Because no other section is attached to the end of the conduit 901 in this illustration, when the device 100 reaches the open end of the conduit 901, the device 100 can fall to the table or floor upon which the environment 900 is situated. In some implementations, other sections of the environment 900 can be included, e.g., to provide continuity for the device 100 after it has completed its climb through the conduit 901.

In some implementations, the speed of the device 100 can be controlled or at least influenced by the slope of the conduit 901 or the materials of which it is made. In some implementations, the gap between each surface (e.g., the ceiling surface) and the corresponding appendage(s) (e.g., the top climber-appendage 105) can also affect the speed of the device 100. For example, the fastest speed of the device 100 can be achieved when the gap provides an amount of wiggle room for the device 100 that generally minimizes any rearward forces caused by drag relative to the forward forces induced by vibration, e.g., enabling an efficient ratcheting effect (and thus a faster climb rate). In some implementations, different gaps can be used for different sections of the conduit 901 having different slopes or different radii of curvature. For example, gaps can be graduated to correspond to the slope.

Figure 9C:
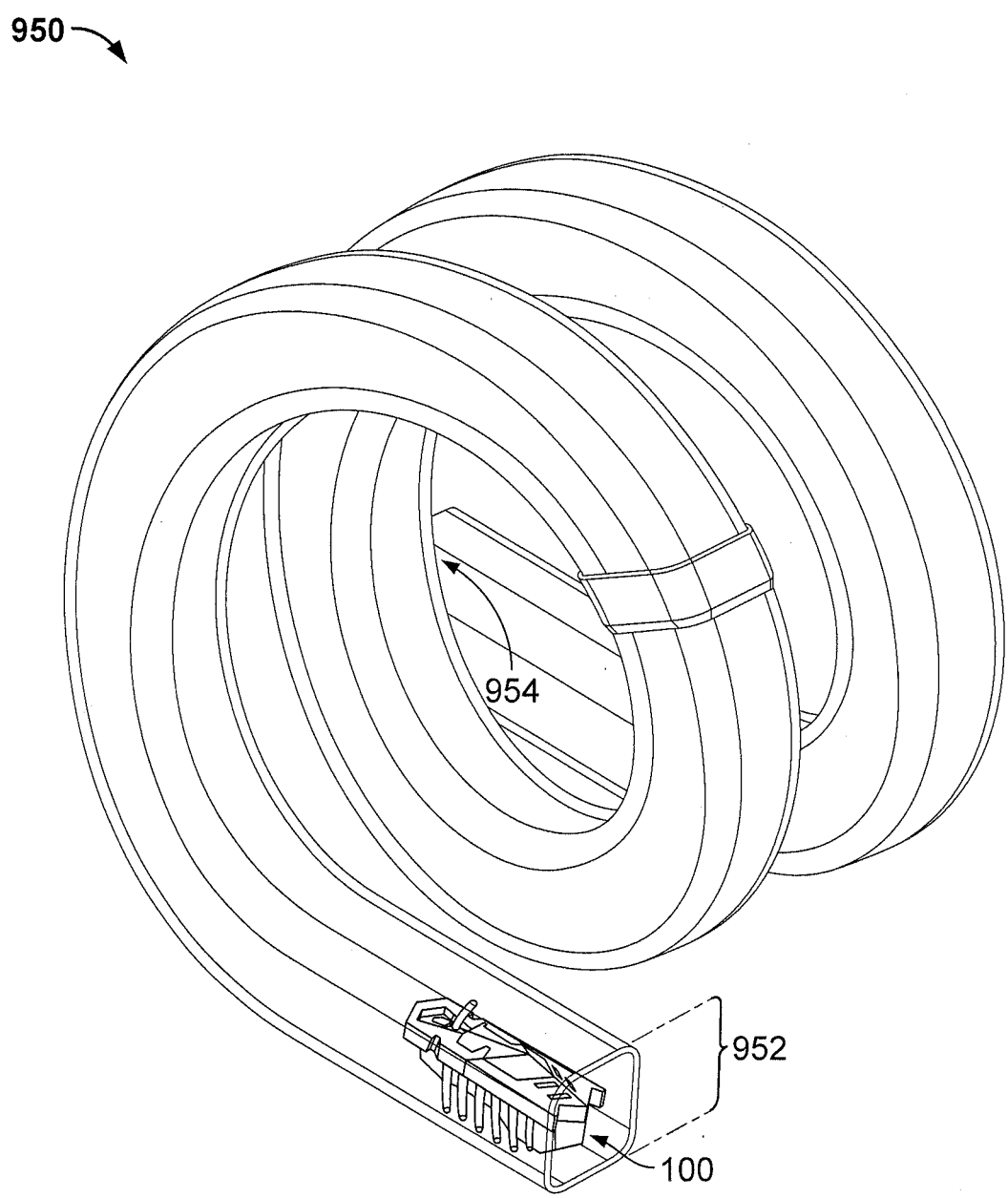
FIG. 9C shows an example loop conduit in the shape of a double loop.

FIG. 9C shows an example loop conduit 950 in the shape of a double loop. For example, the device 100 can enter the loop conduit 950 at an entrance 952. While traveling through the loop conduit 950, the device 100 can make two 360-degree loops before exiting a terminal end 954 of the loop conduit 950. In some implementations, the device 100 can undergo a twist, or travel in a cork-screw fashion through the loop conduit 950. For example, substantially parallel ceiling and floor surfaces can twist to cause the device 100 to twist as it travels along the parallel surfaces. As an alternative, grooves (or some other changes in shape) that are built into the interior of the loop conduit 950 can affect the cork-screw motion (e.g., by guiding the top climber-appendages 105 or side climber-appendages 105a and 105b through a twist).

Figure 9D:
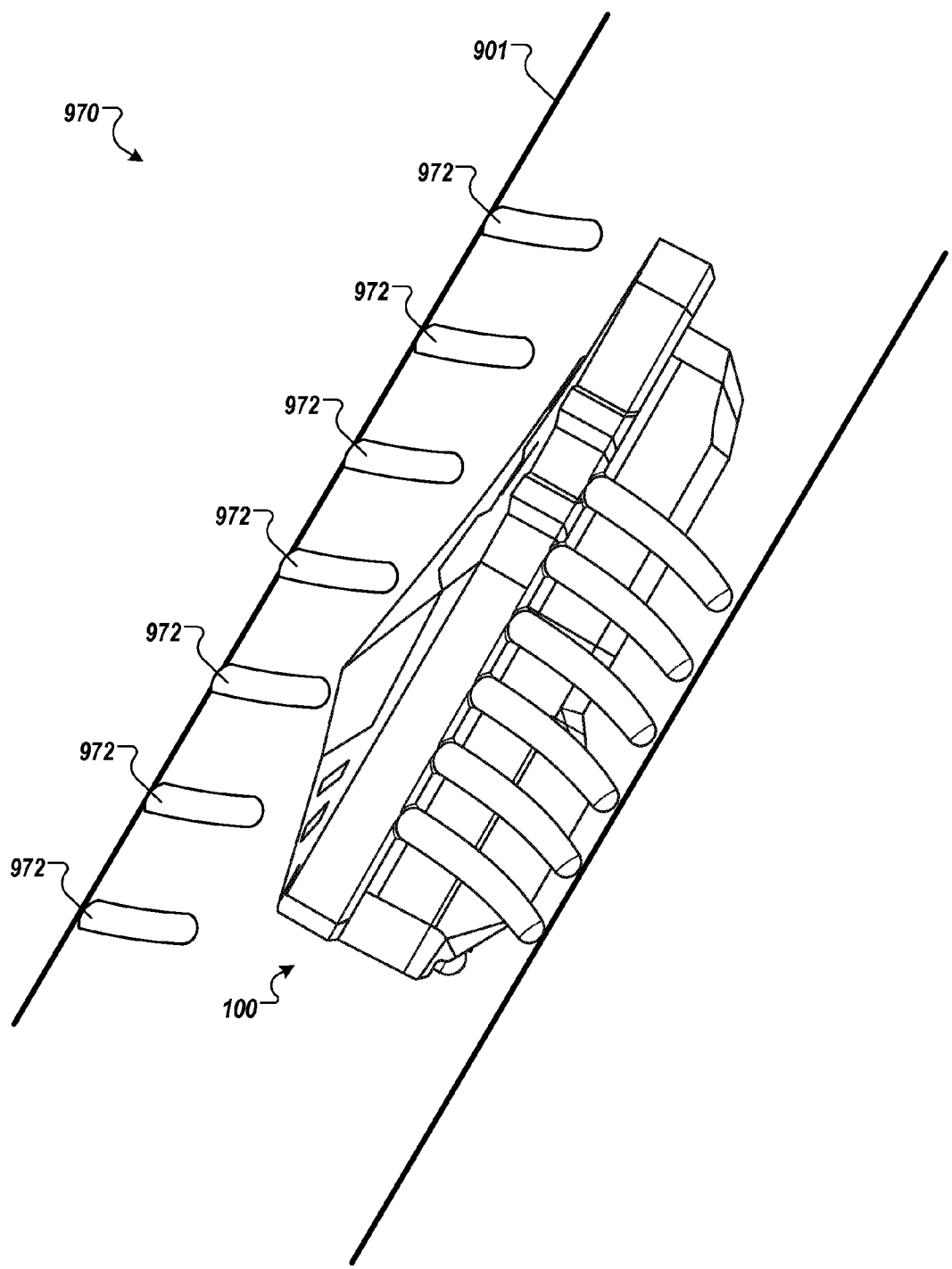
FIG. 9D is a diagram of a conduit adapted to facilitate climbing by a vibration-powered device.

In some implementations, two or more appendages can be attached to the interior of the conduit (e.g., as "conduit appendages"), and can contact the body of the device 100. For example, the conduit 901 can include, within its interior surfaces (e.g., on the ceiling surface), multiple conduit appendages as shown in FIG. 9D. In some implementations, the tips of the conduit appendages can contact the top edge of the device 100 as it moves through the conduit 901. For example, the conduit appendages can be disposed such that the tips are in the forward direction relative to the appendage bases. In some implementations, the conduit appendages can be spaced, e.g., at substantially even intervals, so that at least one conduit appendage is adjacent to the top edge of the device 100 at all times, and thus able to contact the device 100 during vibrations of the device. In this way, the conduit appendages are adapted to allow the device 100 to climb a vertical conduit (e.g., the conduit 901). In some implementations, rows of conduit appendages can be used, e.g., to contact the top of the device 100 at different positions laterally. Conduit appendages can have different elasticities than the appendages that are on the device 100 itself.

In some implementations, two or more climber-appendages can be attached to the device 100. For example, the conduit (e.g., the conduit 901), the device's body, and the two or more climber-appendages can be configured such that each of the two or more climber-appendages repeatedly contact an internal surface of the conduit, where the contact is for sufficient periods of time to produce generally forward motion. In some implementations, at least one of the climber-appendages is substantially continuously in contact with an internal surface of the conduit. For example, when the climber-appendages include one or more top climber-appendages 105, the in-contact internal surface of the conduit 901 is the ceiling surface. In another example, when the climber-appendages include one or more side climber-appendages 105a-105b, the in-contact internal surfaces of the conduit 901 can include the side wall surfaces.

When two or more appendages (e.g., climber-appendages) are attached to the device 100, vibration of the device 100 causes at least one of the two or more climber-appendages to deflect in a direction opposite the forward direction (i.e., as the vibration causes the device 100 to move toward a surface that the particular climber-appendage contacts). For example, the deflection occurs without substantial slipping of the at least one appendage on a corresponding internal surface (e.g., the ceiling surface) when net forces on the at least one appendage are toward the corresponding internal surface (e.g., toward the ceiling surface). At the same time, resiliency of the at least one climber-appendage causes the at least one climber-appendage to deflect in the forward direction when net forces on the at least one climber-appendage are away from the corresponding internal surface (e.g., the ceiling surface). The device 100 can be configured such that the forward deflection generally produces insufficient backward forces to overcome the forward forces produced by one or more appendages on the opposite side of the device 100.

Figure 15B:
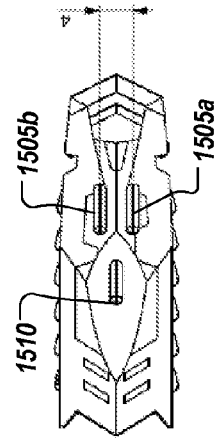
FIG. 15B is a top view of the alternative vibration powered device.
Figure 15D:
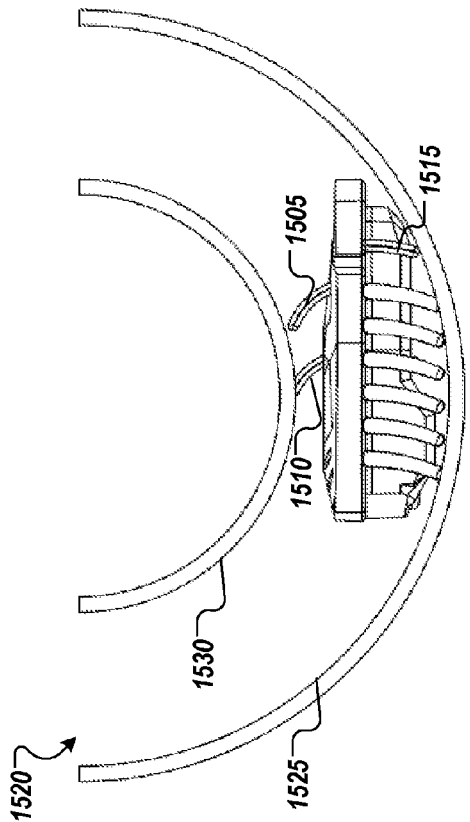
FIG. 15D is a side view of the alternative vibration powered device as it moves through an example upwardly curved conduit.
Figure 15A:
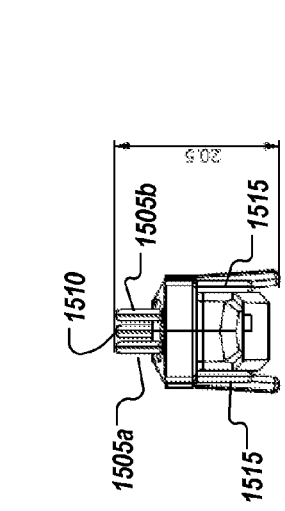
FIG. 15A is a side view of the alternative vibration powered device.
Figure 15C:
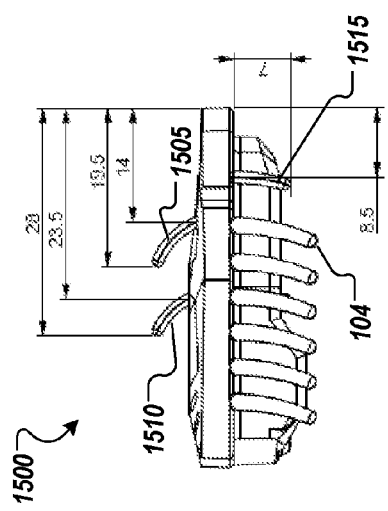
FIG. 15C is a front view of the alternative vibration powered device.

In some implementations, additional or alternative appendages can be used. FIGS. 15A-15D illustrate an alternative embodiment of a vibration powered device 1500. FIG. 15A is a side view of the alternative vibration powered device 1500. FIG. 15B is a top view of the alternative vibration powered device 1500. FIG. 15C is a front view of the alternative vibration powered device 1500. FIG. 15D is a side view of the alternative vibration powered device 1500 as it moves through an example upwardly curved conduit 1520. FIGS. 15A-15C include example dimensions (e.g., in millimeters) to show an example of relative dimensions of the components. The device 1500 includes appendages 1505, 1510, and 1515. In the embodiment illustrated in FIGS. 15A-15D, the device 1500 includes dual primary top climber-appendages 1505a and 1505b, although only one primary top climber-appendage 1505 can be used (e.g., similar to the top climber-appendage 105 located toward the front of device 100 as shown in FIG. 7B). The device 1500 also includes a secondary top climber-appendage 1510 located behind the primary climber appendages 1505a and 1505b. The secondary top climber-appendage 1510 can assist in maintaining forward motion. In some embodiments, the secondary top climber-appendage 1510 may come into contact with an upper internal surface 1530 of a curved conduit 1520 only (or may only contribute to forward motion) when rounding tight turns. The primary top climber-appendages 1505a and 1505b are located toward the front of device 1500 at a location that is significantly toward the front of the device 1500 from a middle point between the first and last legs 104. When navigating a tight upward turn, the midpoint between the front and rear legs 104 tends to align with the center of the upward turn. The primary top climber-appendages 1505a and 1505b therefore may lose contact with the upper internal surface 1530 when the radius of the turn is sufficiently tight. The tip of the secondary top climber-appendage 1510 can be located close to the centerline between the front and rear legs 104, and can therefore keep continuous or substantially continuous contact with the upper inner surface 1530 and help maintain forward motion. Additional secondary front legs 1515, which may only come into contact with a lower internal surface 1525 of the conduit 1520 in relatively tight upward curves, can also contribute to forward motion.

Random Motion

By introducing features that increase randomness of motion of the device 100, the device 100 can appear to behave in an animate way, such as like a crawling bug or other organic life-form. The random motion can include inconsistent movements, for example, rather than movements that tend to be in straight lines or continuous circles. As a result, the device 100 can appear to roam about its surroundings (e.g. in an erratic or serpentine pattern) instead of moving in predictable patterns. Random motion can occur, for example, even while the device 100 is moving in one general direction.

In some implementations, randomness can be achieved by changing the stiffness of the legs 104, the material used to make the legs 104, and/or by adjusting the inertial load on various legs 104. For example, as leg stiffness is reduced, the amount of device hopping can be reduced, thus reducing the appearance of random motion. When the legs 104 are relatively stiff, the legs 104 tend to induce hopping, and the device 100 can move in a more inconsistent and random motion.

While the material that is selected for the legs 104 can influence leg stiffness, it can also have other effects. For example, the leg material can be manipulated to attract dust and debris at or near the leg tips 106*a*, where the legs 104 contact the surface 110. This dust and debris can cause the device 100 to turn randomly and change its pattern of motion. This can occur because the dust and debris can alter the typical frictional characteristics of the legs 104.

The inertial load on each leg 104 can also influence randomness of motion of the device 100. As an example, as the inertial load on a particular leg 104 is increased, that portion of the device 100 can hop at higher amplitude, causing the device 100 to land in different locations.

In some implementations, during a hop and while at least some legs 104 of the device 100 are airborne (or at least applying less force to the surface 110), the motor 202 and the counterweight 210 can cause some level of mid-air turning and/or rotating of the device 100. This can provide the effect of the device landing or bouncing in unpredictable ways, which can further lead to random movement.

In some implementations, additional random movement can result from locating front driving legs 104*a* (i.e., the legs that primarily propel the device 100 forward) behind the motor's counterweight. This can cause the front of the device 100 to tend to move in a less straight direction because the counterweight is farther from legs 104 that would otherwise tend to absorb and control its energy. An example lateral distance from the center of the counterweight to the tip of the first leg of 0.36 inches compared to an example leg length of 0.40 inches. Generally, the distance 514 from the longitudinal centerline of the counterweight to the tip 106*a* of the front leg 104*a* may be approximately the same as the length of the leg but the distance 514 can vary in the range of 50-150% of the leg length.

In some implementations, additional appendages can be added to the legs 104 (and to the housing 102) to provide resonance. For example, flexible protrusions that are constantly in motion in this way can contribute to the overall randomness of motion of the device 100 and/or to the lifelike appearance of the device 100. Using appendages of different sizes and flexibilities can magnify the effect.

In some implementations, the battery 220 can be positioned near the rear of the device 100 to increase hop. Doing so positions the weight of the battery 220 over the rearmost legs 104, reducing load on the front legs 104*a*, which can allow for more hop at the front legs 104*a*. In general, the battery 220 can tend to be heavier than the switch 222 and motor 202, thus placement of the battery 220 nearer the rear of the device 100 can elevate the nose 108, allowing the device 100 to move faster.

In some implementations, the on/off switch 222 can be oriented along the bottom side of the device 100 between the battery 220 and the motor 204 such that the switch 222 can be moved back and forth laterally. Such a configuration, for example, helps to facilitate reducing the overall length of the device 100. Having a shorter device can enhance the tendency for random motion.

Speed of Movement

In addition to random motion, the speed of the device 100 can contribute to the life-like appearance of the device 100. Factors that affect speed include the vibration frequency and amplitude that are produced by the motor 202 and counterweight 210, the materials used to make the legs 104, leg length and deflection properties, differences in leg geometry, and the number of legs.

Vibration frequency (e.g., based on motor rotation speed) and device speed are generally directly proportional. That is, when the oscillating frequency of the motor 202 is increased and all other factors are held constant, the device 100 will tend to move faster. An example oscillating frequency of the motor is in the range of 7000 to 9000 rpm.

Leg material has several properties that contribute to speed. Leg material friction properties influence the magnitude of drag force on the device. As the coefficient of friction of the legs increases, the device's overall drag will increase, causing the device 100 to slow down. As such, the use of leg material having properties promoting low friction can increase the speed of the device 100. In some implementations, polystyrene-butadiene-styrene with a durometer near 65 (e.g., based on the Shore A scale) can be used for the legs 104. Leg material properties also contribute to leg stiffness which, when combined with leg thickness and leg length, determines how much hop a device 100 will develop. As the overall leg stiffness increases, the device speed will increase. Longer and thinner legs will reduce leg stiffness, thus slowing the device's speed.

Appearance of Intelligence

"Intelligent" response to obstacles is another feature of the device 100. For example, "intelligence" can prevent a device 100 that comes in contact with an immovable object (e.g., a wall) from futilely pushing against the object. The "intelligence" can be implemented using mechanical design considerations alone, which can obviate the need to add electronic sensors, for example. For example, turns (e.g., left or right) can be induced using a nose 108 that introduces a deflection or bounce in which a device 100 that encounters an obstacle immediately turns to a near incident angle.

In some implementations, adding a "bounce" to the device 100 can be accomplished through design considerations of the nose and the legs 104, and the speed of the device 100. For example, the nose 108 can include a spring-like feature. In some implementations, the nose 108 can be manufactured using rubber, plastic, or other materials (e.g., polystyrene-butadiene-styrene with a durometer near 65, or in the range of 55-75, based on the Shore A scale). The nose 108 can have a pointed, flexible shape that deflects inward under pressure. Design and configuration of the legs 104 can allow for a low resistance to turning during a nose bounce. Bounce achieved by the nose can be increased, for example, when the device 100 has a higher speed and momentum.

In some implementations, the resiliency of the nose 108 can be such that it has an added benefit of dampening a fall should the device 100 fall off a surface 110 (e.g., a table) and land on its nose 108.

Alternative Leg and Appendage Configurations

Figure 6:
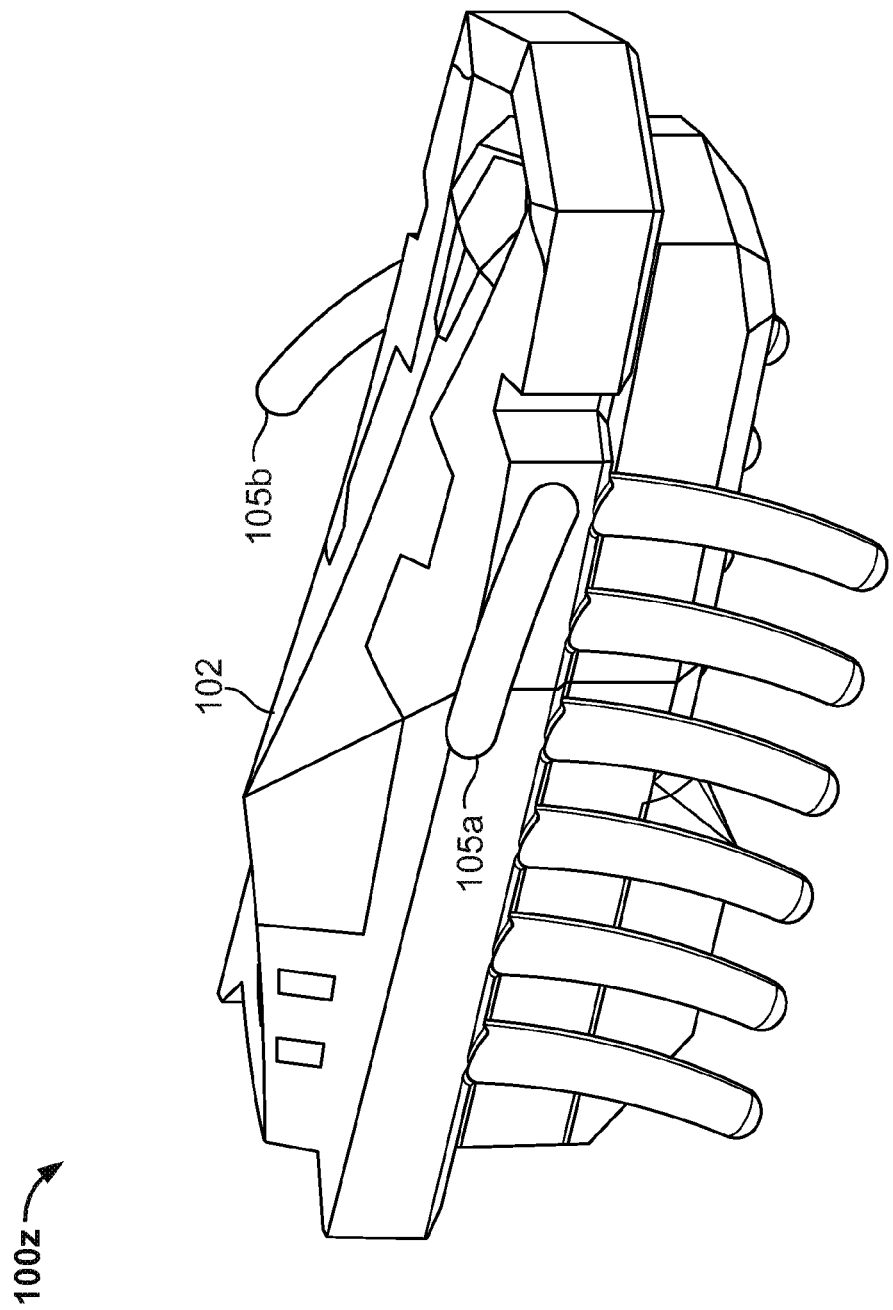
FIG. 6 shows an example device that includes a pair of side climber-appendages.

FIG. 6 shows an example device 100 that includes a pair of side climber-appendages 105*a* and 105*b*. For example, the side climber-appendages 105*a*-105*b* can be similar to the top climber-appendage 105 shown in FIG. 1 and can serve a similar function, that of providing the device 100 with the ability to climb. Specifically, two or more side climber-appendages (e.g., side climber-appendages 105*a*-105*b*) can work with each other and/or with the legs 104 to enable the device 100 to climb between substantially inclined or vertical surfaces (e.g., a slope of 45 degrees or greater), such as surfaces inside a conduit or a tube. For example, the vertical surfaces can be spaced such that the appendage tips of the side climber-appendages 105*a*-105*b* and/or the appendage tips of the legs 104 apply alternating forces on substantially opposing surfaces on which the side climber-appendages 105*a*-105*b* and/or the legs 104 contact.

In some implementations, the side climber-appendages 105*a*-105*b* can have an upward slope (i.e., up and away from the housing 102), as shown in FIG. 6. As an example, the upward slope can allow the device 100 and its appendages to fit certain conduit geometries, e.g., including the cross-sectional tube shape of the conduit or if the conduit cross-sectional shape (e.g., a U-shape or other mostly non-rectangular shape) is not completely vertical. For example, the upward slope (as opposed to side climber-appendages 105*a* and 105*b* that protrude straight out, parallel to the surface) can help to keep the device 100 from flopping toward or onto its back. Moreover, the upward slope can provide at least some force opposing the force generated by the legs 104 contacting a surface.

In other words, if the conduit has a substantially round or oval cross section, then the legs 104 of the device can contact the inside of the conduit, centered between the 7 O'clock and 5 O'clock positions, and the side climber-appendages 105*a*-105*b* somewhere above the 9 O'clock and 3 O'clock positions. By comparison, when a single top climber-appendage 105 is used, it can be substantially at the 12 O'clock position. In some implementations, however, side climber-appendages 105*a* and 105*b* can be substantially opposed, e.g., in the 9 O'clock and 3 O'clock positions.

During the vibration of the device 100, the tips of the legs 104 can apply forces to a (not necessarily level) surface (e.g., relative to the appendage tips of the legs 104). Specifically, the appendage tips, constructed from a material having a coefficient of friction to provide sufficient grip during compression and sufficient hopping to enable a return to a neutral position, can work to propel the device 100 in a forward direction (e.g., to climb up a slope inside the conduit). At the same time, the appendage tips of the side climber-appendages 105*a*-105*b* can contact surfaces that are substantially perpendicular to the appendage tips. Similarly, propulsion facilitated by an appropriate coefficient of friction of the appendage tips of the side climber-appendages 105*a*-105*b* can further propel the device 100 in the forward direction (e.g., to climb up a slope inside the conduit). The various surfaces upon which opposing appendage tips contact can be substantially parallel to each other, e.g., the inside walls of the conduit through which the device 100 can climb.

In some implementations, grooves and/or ridges built into the inside of the conduit can be in alignment with the appendage tips of the side climber-appendages 105*a*-105*b*, e.g., helping to keep the device 100 in position relative to the conduit. In some implementations, spiral patterns can be used in the conduits so that a device 100 that enters the conduit at one level can twist for a total of 180 degrees to flip the device 100 onto its legs when the device 100 reaches a different level. For example, the surface inside the conduit on which the appendage tips of the legs 104 contact can have a slight twist (e.g., a 90 degree twist for every 90 degree arc of the conduit), and substantially parallel slight twists can be included for the grooves and/or ridges (or the surfaces) on which the appendage tips of the side climber-appendages 105*a*-105*b* contact.

In some implementations, the device 100 can have alternative leg configurations. For example, legs 104 can be connected using webs that can serve to increase the stiffness of the legs 104 while maintaining legs 104 that appear long. In some implementations, middle legs 104*b* may not touch the ground, which can make production tuning of the legs easier by eliminating unneeded legs from consideration. In some implementations, devices 104 can include additional appendages that can provide an additional life-like appearance. In some implementations, the additional life-like appendages can resonate as the devices 100 move, and adjusting the appendages to create a desired resonance can serve to increase randomness in motion. Additional leg configurations can provide a reduced stiffness that can reduce hopping, among other characteristics.

In some implementations, devices 100 can include adjustment features, such as adjustable legs 104. For example, if a consumer purchases a set of devices 100 that all have the same style (e.g., an ant), the consumer may want to make some or all of the devices 100 move in varying ways. In some implementations, the consumer can lengthen or shorten individual leg 104 by first loosening a screw (or clip) that holds the leg 104 in place. The consumer can then slide the leg 104 up or down and retighten the screw (or clip). For example, screws can be loosened for repositioning legs 104, and then tightened again when the legs are in the desired place.

In some implementations, screw-like threaded ends on leg bases 106*b* along with corresponding threaded holes in the device housing 102 can provide an adjustment mechanism for making the legs 104 longer or shorter. For example, by turning the front legs 104*a* to change the vertical position of the legs bases 106*b* (i.e., in the same way that turning a screw in a threaded hole changes the position of the screw), the consumer can change the length of the front legs 104*a*, thus altering the behavior of the device 100.

In some implementations, the leg base 106*b* ends of adjustable legs 104 can be mounted within holes in housing 102 of the device 100. The material (e.g., rubber) from which the legs are constructed along with the size and material of the holes in the housing 102 can provide sufficient friction to hold the legs 104 in position, while still allowing the legs to be pushed or pulled through the holes to new adjusted positions.

In some implementations, in addition to using adjustable legs 104, variations in movement can be achieved by slightly changing the CG, which can serve to alter the effect of the vibration of the motor 202. This can have the effect of making the device move slower or faster, as well as changing the device's tendency to turn. Providing the consumer with adjustment options can allow different devices 100 to move differently.

Device Dimensions

Figure 7A:
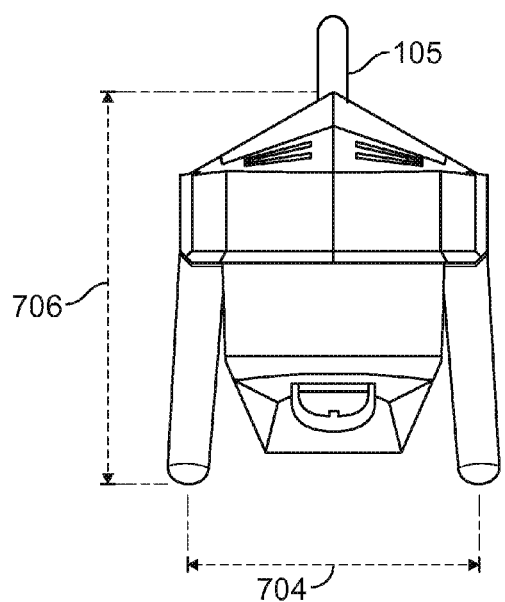
FIGS. 7A and 7B show example dimensions of the device.
Figure 7B:
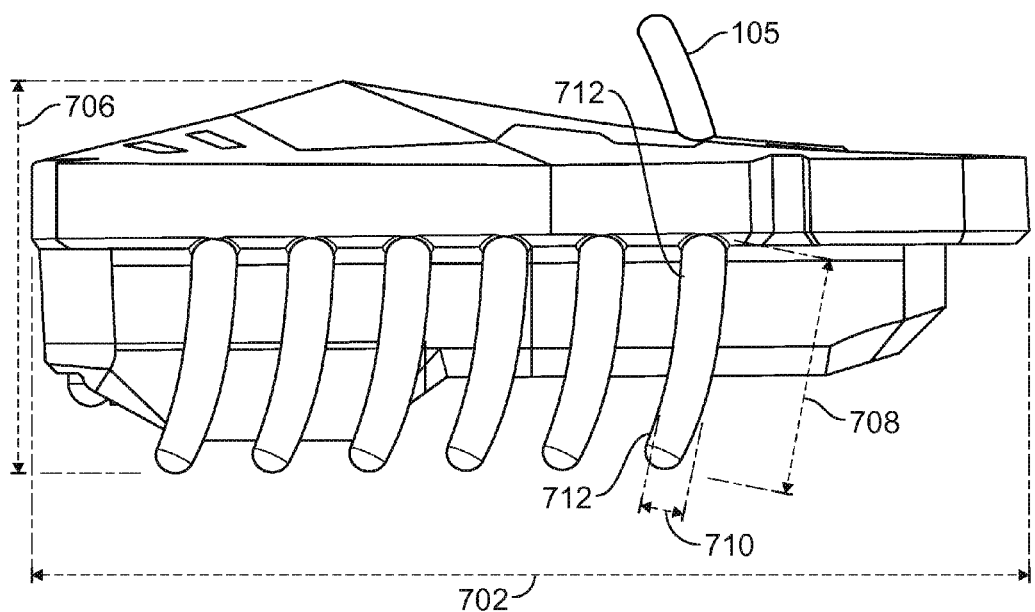

FIGS. 7A and 7B show example dimensions of the device 100. For example, a length 702 is approximately 1.73 inches, a width 704 from leg tip to leg tip is approximately 0.5 inches, and a height 706 is approximately 0.681 inches. A leg length 708 can be approximately 0.4 inches, and a leg diameter 710 can be approximately 0.077 inches. A radius of curvature (shown generally at 712) can be approximately 1.94 inches. Other dimensions can also be used. In general, the device length 702 can be in the range from two to five times the width 704 and the height 706 can be in the approximate range from one to two times the width 704. The leg length 708 can be in the range of three to ten times the leg diameter 710. There is no physical limit to the overall size that the device 100 can be scaled to, as long as motor and counterweight forces are scaled appropriately. In general, it may be beneficial to use dimensions substantially proportional to the illustrated dimensions. Such proportions may provide various benefits, including enhancing the ability of the device 100 to right itself after tipping and facilitating desirable movement characteristics (e.g., tendency to travel in a straight line, etc.).

Construction Materials

Material selection for the legs is based on several factors that affect performance. The materials main parameters are coefficient of friction (COF), flexibility and resilience. These parameters in combination with the shape and length of the leg affect speed and the ability to control the direction of the device.

COF can be significant in controlling the direction and movement of the device. The COF is generally high enough to provide resistance to sideways movement (e.g., drifting or floating) while the apparatus is moving forward. In particular, the COF of the leg tips (i.e., the portion of the legs that contact a support surface) can be sufficient to substantially eliminate drifting in a lateral direction (i.e., substantially perpendicular to the direction of movement) that might otherwise result from the vibration induced by the rotating eccentric load. The COF can also be high enough to avoid significant slipping to provide forward movement when $F_v$ is down and the legs provide a forward push. For example, as the legs bend toward the back of the device 100 (e.g., away from the direction of movement) due to the net downward force on the one or more driving legs (or other legs) induced by the rotation of the eccentric load, the COF is sufficient to prevent substantial slipping between the leg tip and the support surface. In another situation, the COF can be low enough to allow the legs to slide (if contacting the ground) back to their normal position when $F_v$ is positive. For example, the COF is sufficient low that, as the net forces on the device 100 tend to cause the device to hop, the resiliency of the legs 104 cause the legs to tend to return to a neutral position without inducing a sufficient force opposite the direction of movement to overcome either or both of a frictional force between one or more of the other legs (e.g., back legs 104c) in contact with the support surface or momentum of the device 100 resulting from the forward movement of the device 100. In some instances, the one or more driving legs 104a can leave (i.e., hop completely off) the support surface, which allows the driving legs to return to a neutral position without generating a backward frictional force. Nonetheless, the driving legs 104a may not leave the support surface every time the device 100 hops and/or the legs 104 may begin to slide forward before the legs leave the surface. In such cases, the legs 104 may move forward without causing a significant backward force that overcomes the forward momentum of the device 100.

Flexibility and resilience are generally selected to provide desired leg movement and hop. Flexibility of the leg can allow the legs to bend and compress when $F_v$ is down and the nose moves down. Resilience of the material can provide an ability to release the energy absorbed by bending and compression, increasing the forward movement speed. The material can also avoid plastic deformation while flexing.

Rubber is an example of one type of material that can meet these criteria, however, other materials (e.g., other elastomers) may a have similar properties.

Figure 7C:
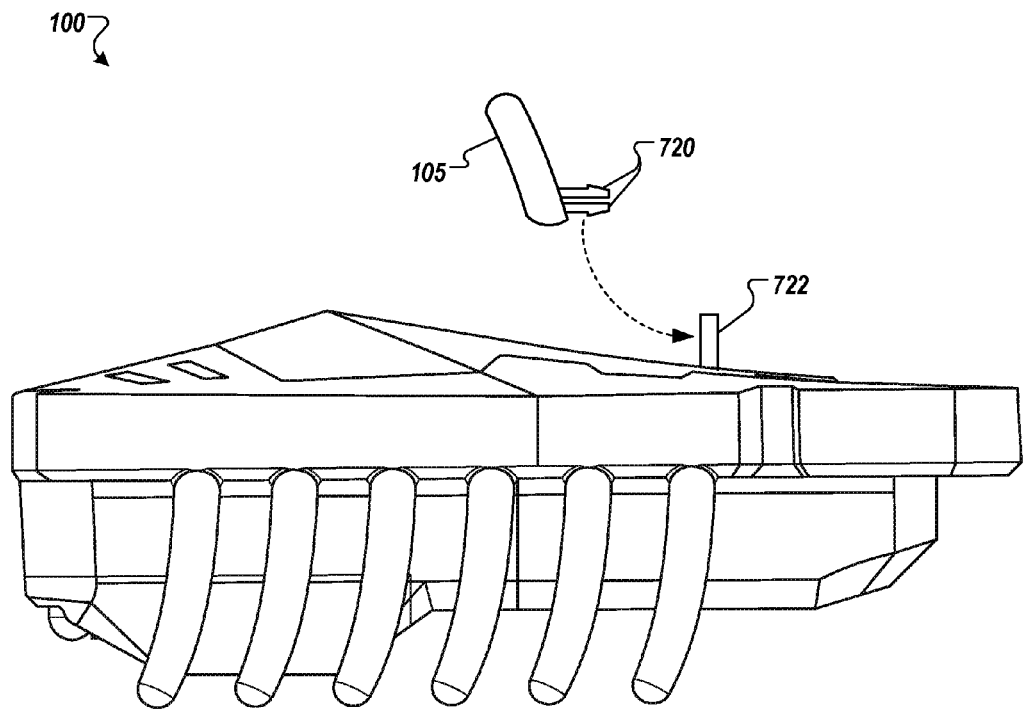
FIGS. 7C and 7D collectively show an example of a removably attachable appendage for the device.
Figure 7D:
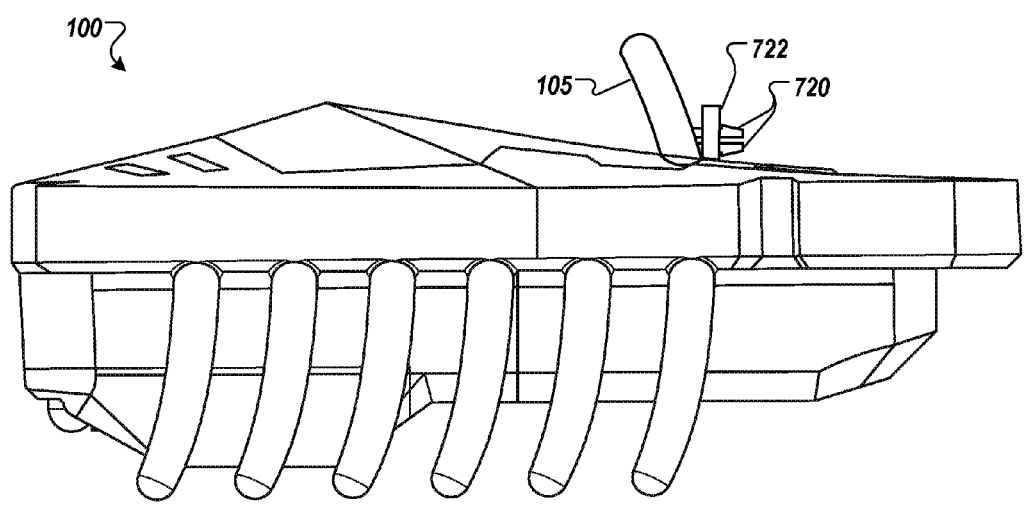

FIGS. 7C and 7D collectively show an example of a removably attachable appendage for the device 100. Some implementations of the device 100, for example, can include the top climber-appendage 105 (or some other removably attachable appendages). The appendages can be attached (or re-attached) as needed, such as when the device 100 is to be used in environments in which the device 100 can climb with the help of climber-appendages. Some implementations of removably attachable appendages can include a compression fitting 720 which can be fixedly attached to the top climber-appendage 105. In some implementations, the compression fitting 720 can include two prongs that can slide into a holed tab 722 and can snap into place using notched ends or some other mechanism(s). Referring to FIG. 7D, the top climber-appendage 105 is shown snapped into place in the holed tab 722, and the device 100 is configured for climbing.

Figure 7E:
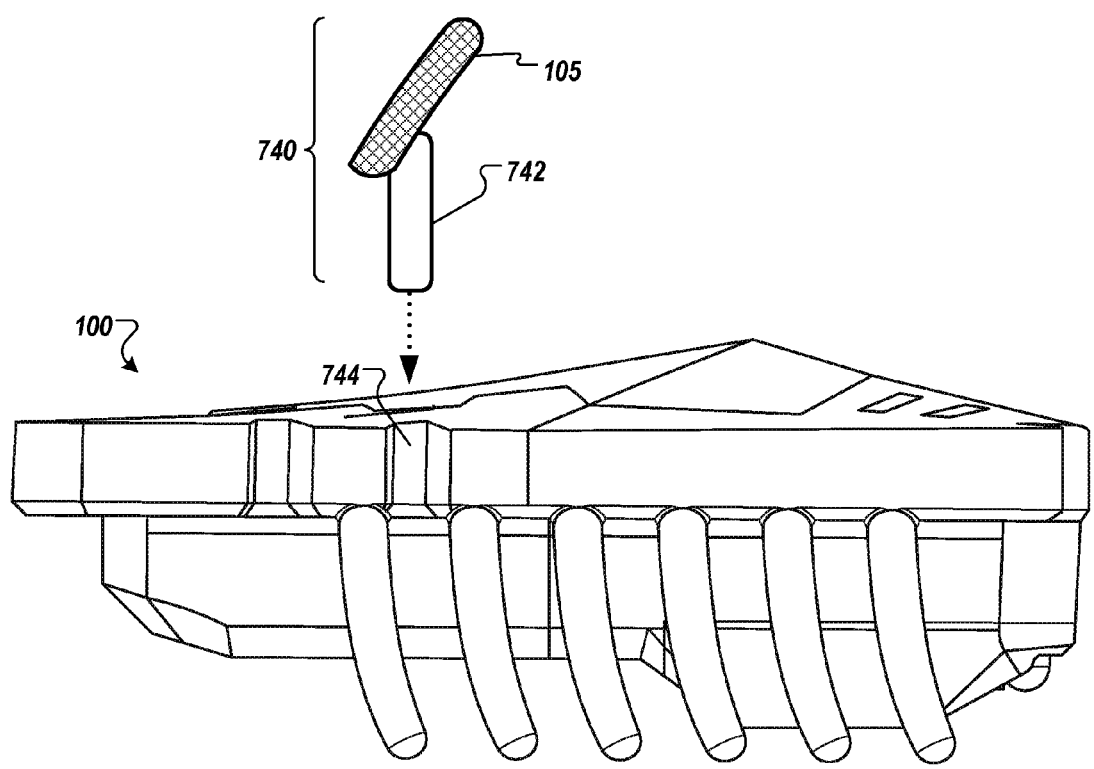
FIGS. 7E and 7F show another example of a removably attachable appendage for the device.
Figure 7F:
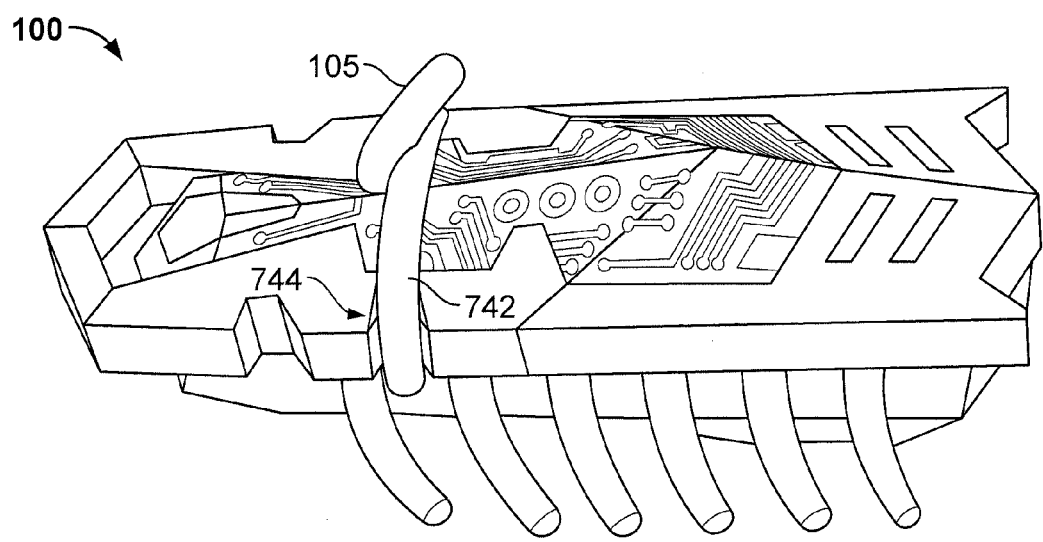

FIGS. 7E and 7F show another example of a removably attachable appendage for the device 100. For example, a removable top climber-appendage attachment 740 can include the top climber-appendage 105 that is fixedly attached to a mounting clip 742. In some implementations, the mounting clip 742 can include two downward-projecting ends, each of which can fit into a body notch 744 (e.g., one on each side of the device 100). Referring to FIG. 7F, the top climber-appendage attachment 740 is shown attached in place on the device 100. For example, the ends of the mounting clip 742 are shown occupying the body notches 744, and the center portion of the mounting clip 742 straddles the width of the device 100. Other implementations of appendage attachments are also possible. For example, a snap-on shell that includes top and/or side appendages and that engages a greater portion of the body shoulder 112 of the device 100 than the mounting clip 742 can be used.

Figure 8:
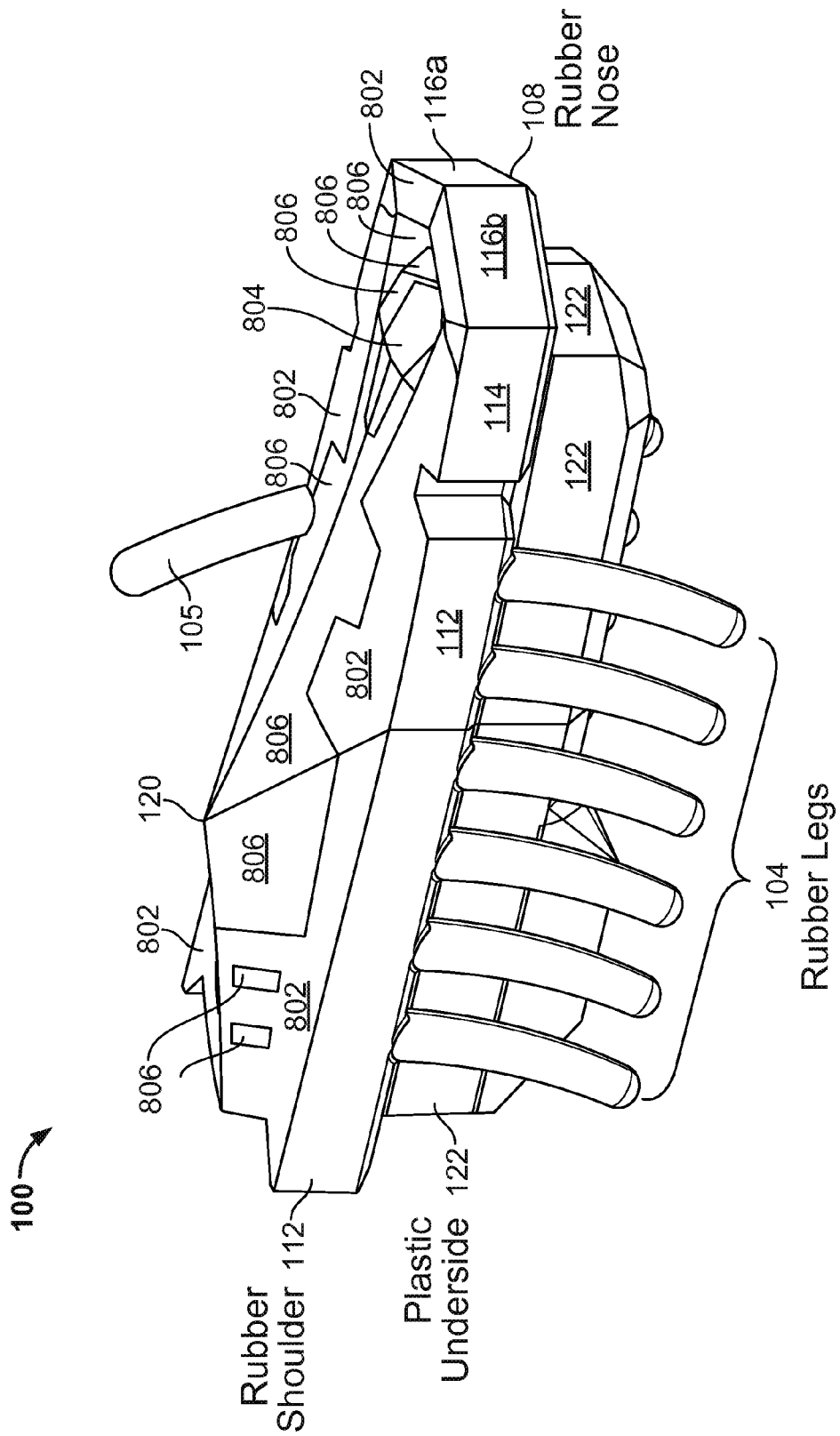
FIG. 8 shows one example configuration of example materials from which the device can be constructed.

FIG. 8 shows example materials that can be used for the device 100. In the example implementation of the device 100 shown in FIG. 8, the legs 104 are molded from rubber or another elastomer. The legs 104 can be injection molded such that multiple legs are integrally molded substantially simultaneously (e.g., as part of the same mold). The legs 104 can be part of a continuous or integral piece of rubber that also forms the nose 108 (including nose sides 116a and 116b), the body shoulder 112, and the head side surface 114. As shown, the integral piece of rubber extends above the body shoulder 112 and the head side surface 114 to regions 802, partially covering the top surface of the device 100. For example, the integral rubber portion of the device 100 can be formed and attached (i.e., co-molded during the manufacturing process) over a plastic top of the device 100, exposing areas of the top that are indicated by plastic regions 806, such that the body forms an integrally co-molded piece. The high point 120 is formed by the uppermost plastic regions 806. One or more rubber regions 804, separate from the continuous rubber piece that includes the legs 104, can cover portions of the plastic regions 806. In general, the rubber regions 802 and 804 can be a different color than plastic regions 806, which can provide a visually distinct look to the device 100. In some implementations, the patterns formed by the various regions 802-806 can form patterns that make the device look like a bug or other animate object. In some implementations, different patterns of materials and colors can be used to make the device 100 resemble different types of bugs or other objects. In some implementations, a tail (e.g., made of string) can be attached to the back end of the device 100 to make the device appear to be a small rodent.

The selection of materials used (e.g., elastomer, rubber, plastic, etc.) can have a significant effect on the device's ability to self-right. For example, rubber legs 104 can bend inward when the device 100 is rolling during the time it is self-righting. Moreover, rubber legs 104 can have sufficient resiliency to bend during operation of the device 100, including flexing in response to the motion of (and forces created by) the eccentric load rotated by the motor 202. Furthermore, the tips of the legs 104, also being made of rubber, can have a coefficient of friction that allows the driving legs (e.g., the front legs 104) to push against the surface 110 without significantly slipping.

Using rubber for the nose 108 and shoulder 112 can also help the device 100 to self-right. For example, a material such as rubber, having higher elasticity and resiliency than hard plastic, for example, can help the nose 108 and shoulder 112 bounce, which facilitates self-righting, by reducing resistance to rolling while the device 100 is airborne. In one example, if the device 100 is placed on its side while the motor 202 is running, and if the motor 202 and eccentric load are positioned near the nose 108, the rubber surfaces of the nose 108 and shoulder 112 can cause at least the nose of the device 100 to bounce and lead to self-righting of the device 100.

In some implementations, the one or more rear legs 104c can have a different coefficient of friction than that of the front legs 104a. For example, the legs 104 in general can be made of different materials and can be attached to the device 100 as different pieces. In some implementations, the rear legs 104c can be part of a single molded rubber piece that includes all of the legs 104, and the rear legs 104c can be altered (e.g., dipped in a coating) to change their coefficient of friction.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Other alternative embodiments can also be implemented. For example, some implementations of the device 100 can omit the use of rubber. Some implementations of the device 100 can include components (e.g., made of plastic) that include glow-in-the-dark qualities so that the device 100 can be seen in a darkened room as it moves across the surface 110 (e.g., a kitchen floor). Some implementations of the device 100 can include a light (e.g., an LED bulb) that blinks intermittently as the device 100 travels across the surface 110.

Figure 10A:
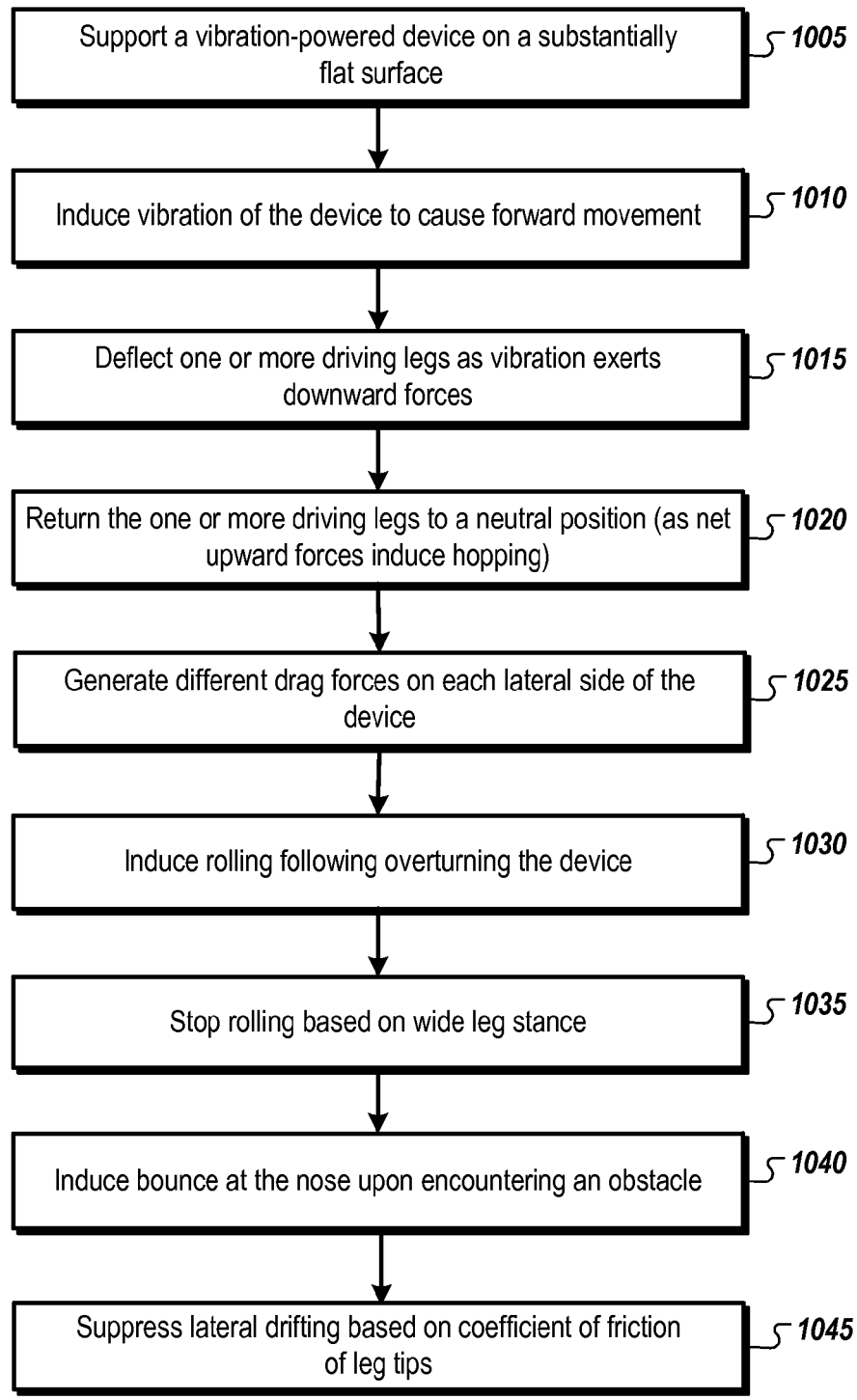
FIG. 10A is a flow diagram of a process for operating a vibration-powered device.

FIG. 10A is a flow diagram of a process 1000 for operating a vibration-powered device 100 (e.g., a device that includes any appropriate combination of the features described above). In various embodiments, different subsets of the features described above can be included.

Initially, a vibration-powered device is placed on a substantially flat surface or other surface (e.g., shaped such that multiple legs of the device contact the surface) at 1005. Vibration of the device is induced at 1010 to cause forward movement. For example, vibration may be induced using a rotational motor (e.g., battery powered or wind up) that rotates a counterweight. The vibration can induce movement in a direction corresponding to an offset between the leg bases and the leg tips of one or more driving legs (i.e., the forward direction). In particular, this vibration can cause resilient legs to bend in one direction, at 1015, as the net downward forces cause the device to move downward. This bending, along with using a material with a sufficiently high coefficient of friction to avoid substantial slipping, can cause the device to move generally forward.

As the vibration causes net upward forces (e.g., due to the vector sum of the forces induced by the rotating counterweight and the spring effect of the resilient legs) that cause the driving legs to leave the surface or to come close to leaving the surface, the tips of the one or more driving legs move in the forward direction (i.e., the leg deflects in the forward direction to return to a neutral position) at 1020. In some implementations, the one or more driving legs can leave the surface at varying intervals. For example, the driving legs may not leave the surface every time the net forces are upward because the forces may not overcome a downward momentum from a previous hop. In addition, the amount of time the driving legs leave the surface may vary for different hops (e.g., depending on the height of the hop, which in turn may depend on the degree to which the rotation of the counterweight is in phase with the spring of the legs).

During the forward motion of the device, different drag forces on each lateral side of the device can be generated at 1025. Generally, these different drag forces can be generated by rear legs that tend to drag (or at least that drag more than front driving legs) and alter the turning characteristics of the device (e.g., to counteract or enhance turning tendencies). Typically, the legs can be arranged in (e.g., two) rows along each lateral side of the device, such that one or more of the legs in one row drag more than corresponding legs in another row. Different techniques for causing the device to generate these different drag forces are described above.

If the device overturns, rolling of the device is induced at 1030. In general, this rolling tendency can be induced by the rotation of the counterweight and causes the device to tend to independently right itself. As discussed above, the outer shape of the device along the longitudinal dimension (e.g., substantially parallel to the axis of rotation and/or the general forward direction of movement of the device) can be shaped to promote rolling (e.g., by emulating longitudinal "roundness"). Rolling of the device can also be stopped by a relatively wide spread between the rows of legs at 1035. In particular, if the legs are wide enough relative to the COG of the device, the rotational forces generated by the rotating counterweight are generally insufficient (absent additional forces) to cause the device to roll over from the upright position.

At 1040, resiliency of the nose of the device can induce a bounce when the device encounters an obstacle (e.g., a wall). This tendency to bounce can facilitate changing directions to turn away from an obstacle or toward a higher angle of incidence, particularly when combined with a pointed shaped nose as discussed above. The resilient nose can be constructed from a elastomeric material and can be integrally molded along with lateral shoulders and/or legs using the same elastomeric material. Finally, lateral drifting can be suppressed at 1045 based on a sufficiently high coefficient of friction at the leg tips, which can prevent the legs from tending to slide laterally as the rotating counterweight generates lateral forces.

Figure 10B:
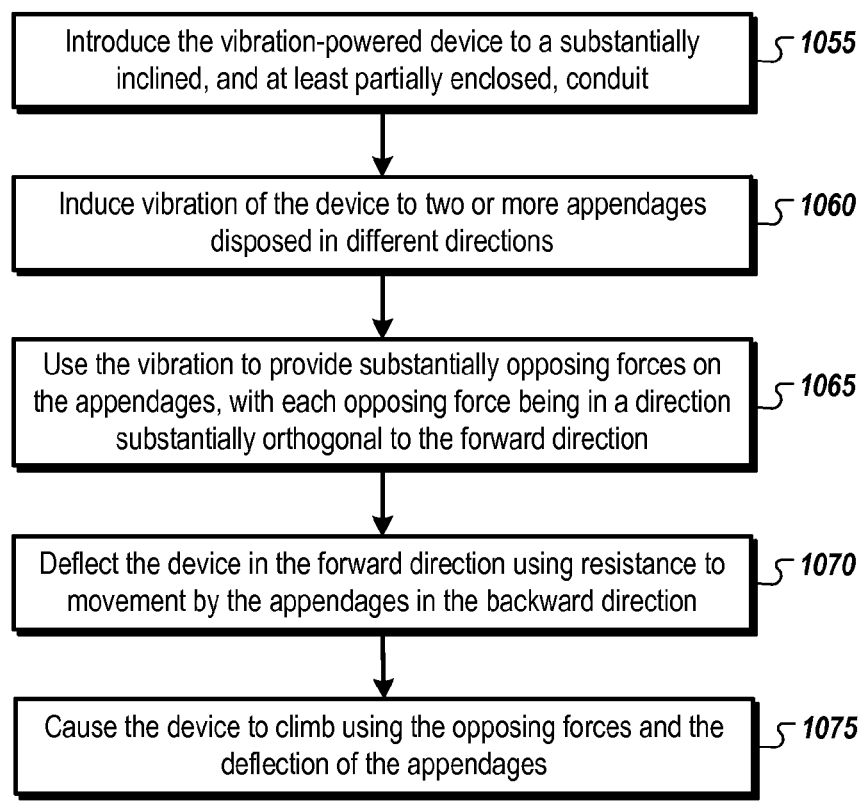
FIG. 10B is a flow diagram of a process for the vibration-powered device to climb.

FIG. 10B is a flow diagram of a process 1050 for the vibration-powered device 100 to climb. For example, the device 100 can include any appropriate combination of the features described above (e.g., appendages that contact substantially opposing surfaces). In various embodiments, different subsets of the features described above can be included. The process 1050 can be used in combination with the process 1000 (See FIG. 10A), for example, when the device 100 operates and transitions between substantially flat areas that can facilitate random motion to other areas that include conduits or other apparatus in which the device 100 can climb.

Initially, a vibration-powered device is introduced to a substantially inclined (and at least partially enclosed) conduit at 1055. As an example, the conduit can be the conduit 901 shown in FIG. 9A. The device 100 can enter the conduit 901, for example, after the device completes its travel through the connecting pathway 906. In another example, the conduit can be the conduit loop 950 shown in FIG. 9C, and the device 100 can enter the loop conduit 950 at the entrance 952. Other implementations can use conduits that have other shapes.

Vibration of the device is induced to alternately cause movement toward each of two or more appendages disposed in different directions at 1060. For example, as the device 100 enters the conduit (e.g., the conduit 901 or the loop conduit 950), vibration induced by the rotating eccentric load alternately causes movement in the direction of the legs 104 and the top climber-appendage 105 (or the side climber-appendages 105a-105b). The appendages of the device 100 are disposed in different directions because the legs 104 project generally downward from the device 100, and the top climber-appendage 105 (or side climber-appendages 105a-105b) projects upward (or substantially sideways) relative to the device 100.

The vibration provides substantially opposing forces on the appendages at 1065. Each opposing force is in a direction that is substantially orthogonal to the forward direction. For example, the vibration results in an orthogonal leg force that causes the legs 104 to contact and compress against the surface of the conduit, such as the floor surface of the conduit 901. As the vibration (and resilient forces of the legs 104) subsequently cause the device 100 to move in the opposite direction, the vibration results in an orthogonal climber-appendage force that causes the top climber-appendage 105 to contact and compress against the ceiling surface with an opposing force. The alternating and opposing forces can occur in rapid succession and are generally orthogonal to the direction of movement of the device (e.g., the direction of movement through the conduit 901 or the loop conduit 950).

The device is deflected in the forward direction using resistance to movement by the appendages in the backward direction at 1070. For example, in addition to the orthogonal forces induced by the rotating eccentric load, additional force components provide forward movement of the device. In particular, the tips of the legs 104 and the top climber-appendage 105 (or side climber-appendages 105a-105b) have coefficients of friction that allow the tips to "grip" the surfaces of the conduit to prevent the device 100 from sliding backward.

The device is caused to climb using the opposing forces and the deflection of the appendages at 1075. For example, the alternating grip by the legs 104 and the climber-appendage(s) allows the device 100 to have a ratcheting motion between the parallel surfaces of the conduit, resulting in the device 100 climbing the conduit.

Figure 11:
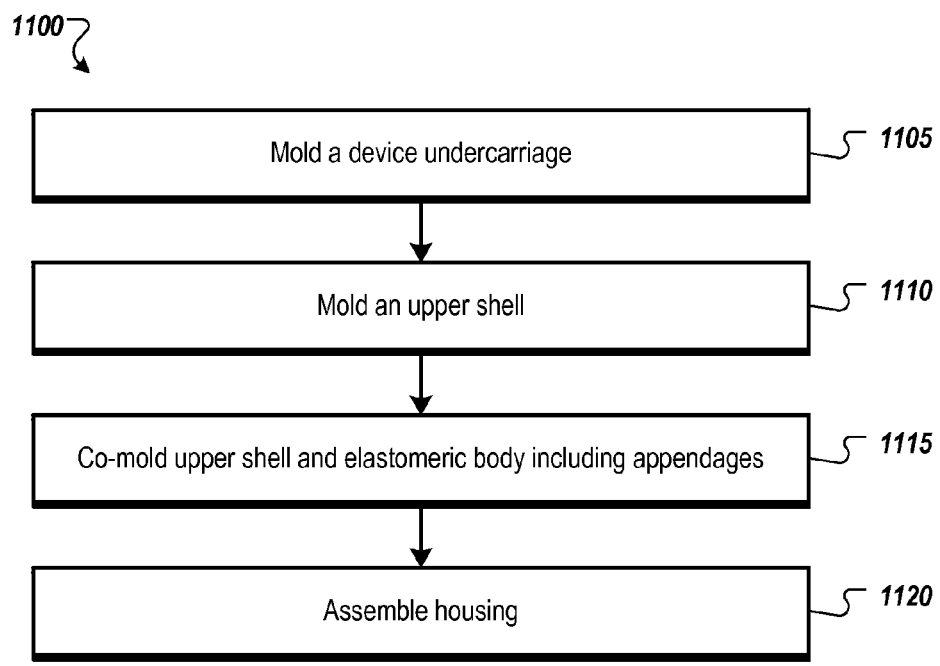
FIG. 11 is a flow diagram of a process for constructing a vibration-powered device.

FIG. 11 is a flow diagram of a process 1100 for constructing a vibration-powered device 100 (e.g., a device that includes any appropriate combination of the features described above). Initially, the device undercarriage is molded at 1105. The device undercarriage can be the underside 122 shown in FIG. 1 and can be constructed from a hard plastic or other relatively hard or stiff material, although the type of material used for the underside is generally not particularly critical to the operation of the device. An upper shell is also molded at 1110. The upper shell can include a relatively hard portion of the upper body portion of the housing 102 shown in FIG. 1, including the high point 120.

The upper shell is co-molded with an elastomeric body at 1115 to form the device upper body. The elastomeric body can include a single integrally formed piece that includes appendages (e.g., legs 104), shoulders 112, and nose 108. Co-molding a hard upper shell and a more resilient elastomeric body can provide better constructability (e.g., the hard portion can make it easier to attach to the device undercarriage using screws or posts), provide more longitudinal stiffness, can facilitate self-righting (as explained above), and can provide legs that facilitate hopping, forward movement, and turning adjustments. In some implementations, the appendages that are integrally molded with the resilient elastomeric body can include one or more top climber-appendages 105 and/or two or more side climber-appendages (e.g., the side climber-appendages 105a and 105b), or combinations thereof. In implementations in which appendages such as the climber-appendages 105, 105a and 105b can be removably attached, the body can be molded to include the holed tab 722, the body notches 744, or other features useful for attaching appendages.

The housing is assembled at 1120. The housing generally includes a battery, a switch, a rotational motor, and an eccentric load, which may all be enclosed between the device undercarriage and the upper body.

Habitats

FIG. 12A shows an example tube habitat 1200 in which multiple devices 100 can operate and interact. In this example, the tube habitat 1200 includes three arenas 1202a-1202c, each of which can be hexagonally shaped as shown. As shown in FIG. 12A, the arenas 1202a-1202c are at three different elevations and are substantially level and parallel to each other, but other configurations are possible. The arena 1202a is the topmost of the three arenas, with the arena 1202c at the bottom and the arena 1202b substantially in the middle.

The arenas 1202a-1202c are connected with tube assemblies 1204a-1204e of various lengths, shapes, and configurations. For example, the tube assemblies 1204a and 1204c each connect the arena 1202a to the arena 1202c. Similarly, the tube assemblies 1204b and 1204d each connect the arena 1202a to the arena 1202b. Finally, the tube assembly 1204e connects the arena 1202c to itself by way of a loop in the tube assembly 1204e that passes over the top of the arena 1202b. Connections between arenas 1202a-1202c and tube assemblies 1204a-1204e are made at gate openings along the sides of the arenas 1202a-1202c. Closed gates, where the tube assemblies 1204a-e are not connected to the arenas 1202a-1202c, can prevent the devices 100 from exiting the tube habitat 1200 during operation. In some implementations, the tube assemblies 1204a-e can be assembled using tube components and connectors described below with reference to FIGS. 13A-13W and 14A-14H. Other configurations of tube assemblies are possible, including tube assemblies of a solid piece and/or tube assemblies that use components not described in FIGS. 13A-13W and 14A-14H.

FIG. 12B shows a top view of the tube habitat 1200. This view more clearly shows both lateral sides of the tube assembly 1204*e*. Gates 1208 are shown in an open state.

Various connectors can be used to connect the components of the tube habitat 1200. For example, one type of connector 1206*a* (e.g., refer to FIGS. 14E-H) can connect any one of various types of tubes to any of the arenas 1202*a*-1202*c*. A second type of connector 1206*b* (e.g., refer to FIGS. 14A-D) can connect a pair of tubes.

Figure 13B:
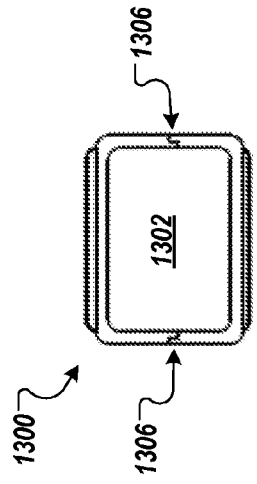
FIGS. 13A through 13D show various views of an example straight tube assembly.
Figure 13D:
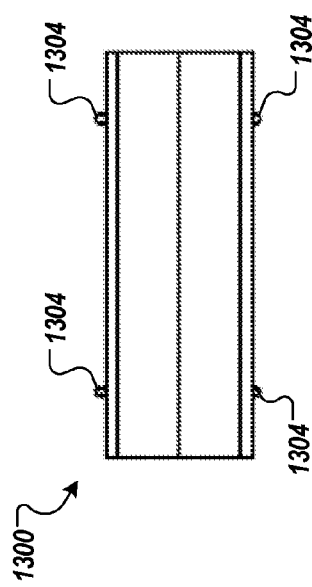
Figure 13A:
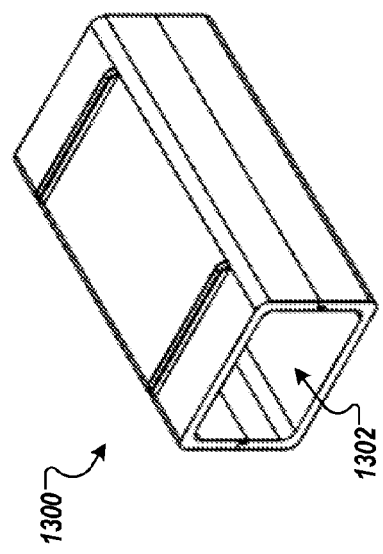
Figure 13C:
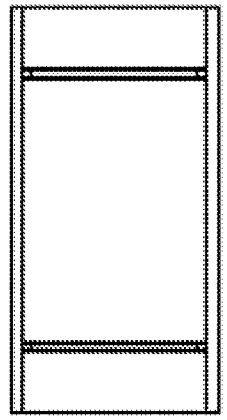

FIGS. 13A through 13D show various views of an example straight tube assembly 1300. Specifically, FIG. 13A is a top view, FIG. 13B is a perspective view, FIG. 13C is a side view, and FIG. 13D is a front view. The FIGS. 13B and 13D show an opening 1302 through which the device 100 can travel, e.g., through the length of the straight tube assembly 1300. In some implementations, the straight tube assembly 1300 can be wide enough such that two lanes exist, allowing two devices 100 to pass. The lanes are not formal lanes or defined lanes as such, but the opening 1302 has a width that is equal to or more than double the width of the device 100 (at its widest point). In fact, two devices 100 can meet essentially head-on inside the straight tube assembly 1300 (and other tube assemblies described in this document), and the two devices 100 can resolve their meeting, deflect off each other, and continue on.

In some implementations, the straight tube assembly 1300 can include ridges 1304 (or other features) which can facilitate proper positioning of connectors. For example, the connectors, as described in detail below, can connect the straight tube assembly 1300 to another tube assembly or to another component used in a habitat for the device 100 (e.g., the tube habitat 1200). In some implementations, connectors can engage with the ridges 1304, such as by fitting over the top of the assembly 1300 and abutting the ridge 1304. Thus, the ridges 1304 are stopping points, e.g., providing a stop for a connector that slides onto the end of the straight tube assembly 1300.

In some implementations, the straight tube assembly 1300 is manufactured from two pieces (e.g., substantially two halves) that are joined at seams 1306. In some implementations, the straight tube assembly 1300 is manufactured as a single piece.

FIGS. 13E through 13G show example dimensions of the straight tube assembly 1300. Dimensions of the device 100 are also shown, as those dimensions are related to the dimensions of the straight tube assembly 1300. FIGS. 13E through 13G show top, side and front views, respectively, of the device 100 with its back end inside the straight tube assembly 1300.

Referring to FIG. 13E, a nose-to-climber-appendage distance 1310 (e.g., 15 mm) defines the distance from the nose 108 to the front of the climber-appendage 105. Referring to FIG. 13F, a climber-appendage elevation 1312 (e.g., 22 mm) defines the elevation of the top of the climber-appendage 105 relative to the bottoms of the legs 104. Referring to FIG. 13G, a tube width 1314 (e.g., 30 mm) and a tube height 1316 (e.g., 20 mm) define the inside width and height, respectively, of the straight tube assembly 1300. In some implementations, the tube width 1314 and the tube height 1316 can be used in other components, e.g., other straight tube assemblies (e.g., of different lengths), curved assemblies, and/or assemblies of other shapes or configurations. A leg offset dimension 1318 (e.g., 14 mm) is included here to show the relative width of the device 100 at its widest point, e.g., the outer edges of its legs 104. For example, because the example leg offset dimension 1318 of 14 mm is less than half of the example tube width 1314 of 30 mm, ample horizontal space exists in the straight tube assembly 1300 for two devices 100 to pass.

Figure 13I:
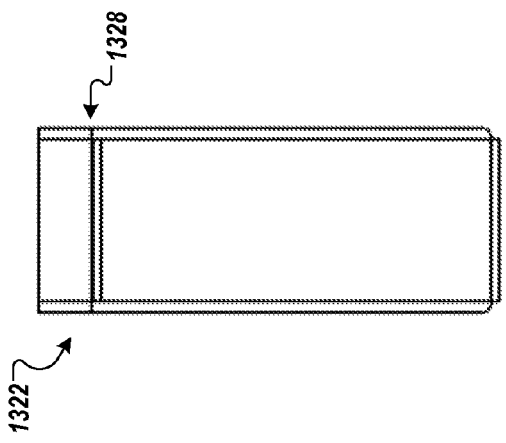
FIGS. 13H through 13K show various views of an example curved tube assembly.
Figure 13K:
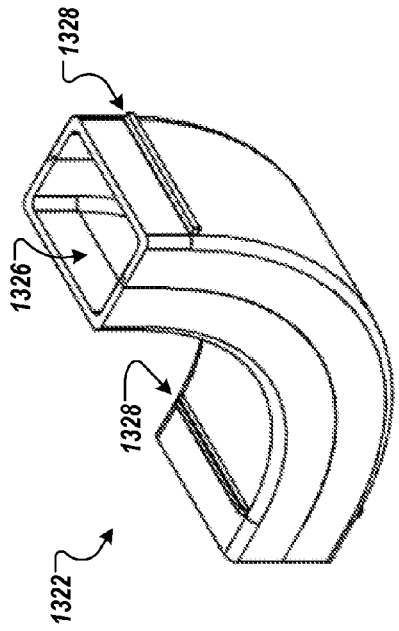
Figure 13H:
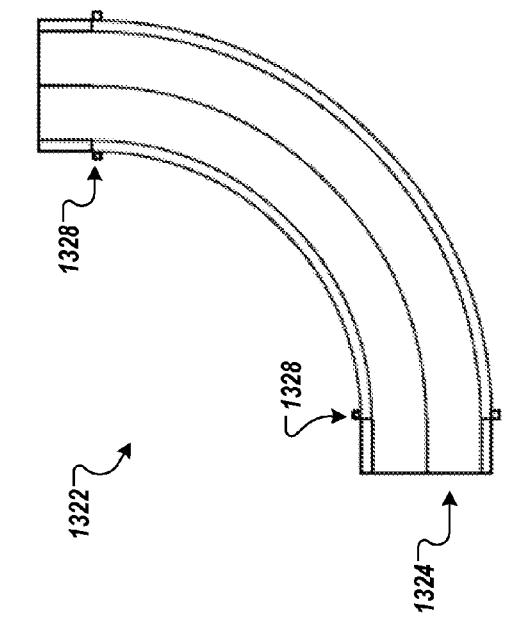
Figure 13J:
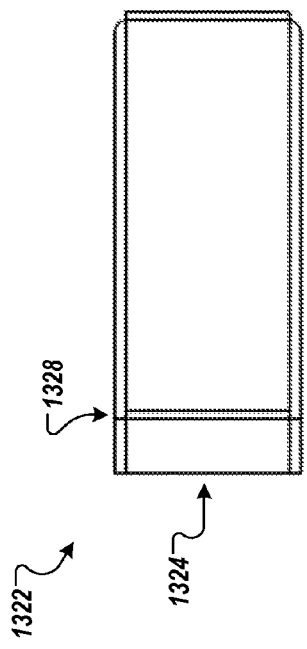

FIGS. 13H through 13K show various views of an example curved tube assembly 1322. Specifically, FIG. 13H is a side view, FIG. 13I is a back view, FIG. 13J is a bottom view, and FIG. 13K is a perspective view. Referring to FIG. 13H, the device 100 can enter the curved tube assembly 1322 through a front opening 1324 at the front of the curved tube assembly 1322. FIG. 13K shows an opening 1326 from which the device 100 can exit the curved tube assembly 1322 after entering at the front opening 1324 and climbing through the tube. Devices 100 can travel in either direction through the curved tube assembly 1322.

The curved tube assembly 1322 can have the same or similar inside dimensions as the straight tube assembly 1300 (e.g., a width of 30 mm and a height of 20 mm). As a result, when the curved tube assembly 1322 is connected to other components such as the straight tube assembly 1300, the device 100 can expect a substantially smooth transition at the connection points. Further, the curved tube assembly 1322 is wide enough for two devices 100 to pass.

In some implementations, the curved tube assembly 1322 can include ridges 1328 (or other features), which can facilitate a snap-together fitting with connectors. For example, the connectors, as described in detail below, can connect the curved tube assembly 1322 to another tube assembly or to another component used in a habitat for the device 100 (e.g., the tube habitat 1200).

Figure 13L:
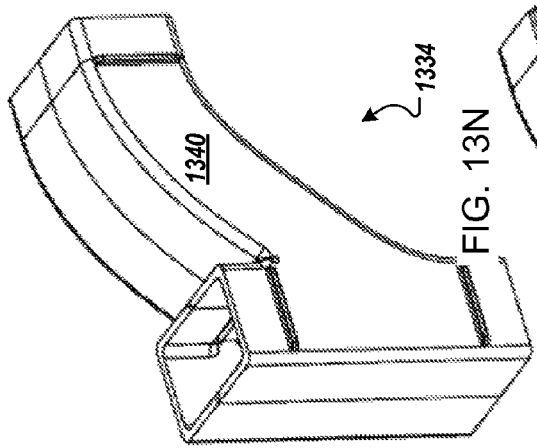
FIGS. 13L through 13Q show various views of an example Y-shaped tube assembly.
Figure 13M:
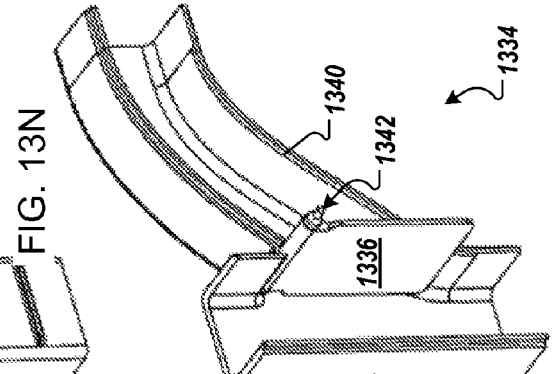
Figure 13N:
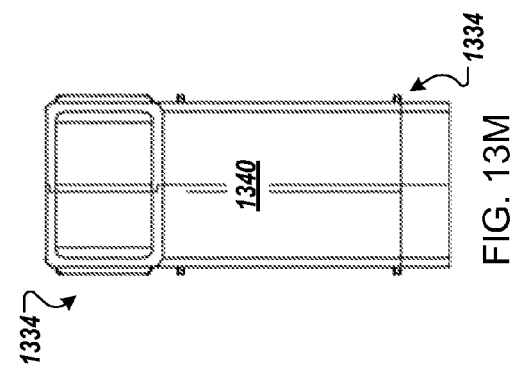
Figure 13O:
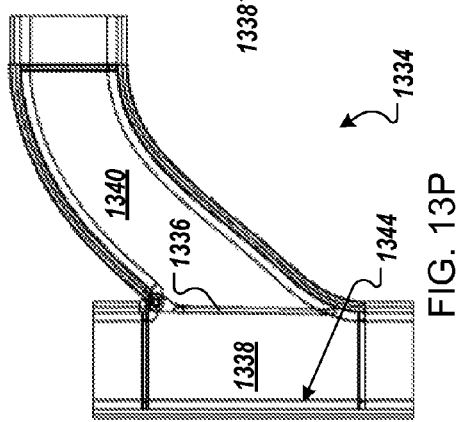
Figure 13P:
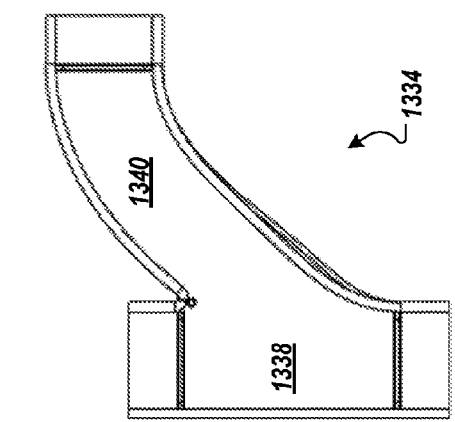
Figure 13Q:
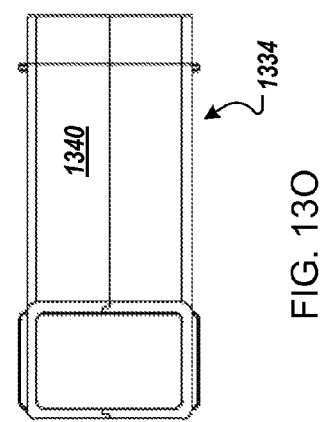

FIGS. 13L through 13Q show various views of an example Y-shaped tube assembly 1334. Specifically, FIG. 13L is a side view, FIG. 13M is a front view, FIG. 13N is a perspective view, FIG. 13O is a bottom view, FIG. 13P is a cut-away side view, and FIG. 13Q is a cut-away perspective view.

The Y-shaped tube assembly 1334 includes a flap 1336 at the intersection of a straight section 1338 and a curved section 1340. The flap 1336 can control the direction of movement by devices 100 inside the Y-shaped tube assembly 1334. Referring to FIGS. 13P and 13Q, the flap 1336 is shown closed, e.g., hanging in a downward position, substantially parallel to the straight section 1338. When the flap 1336 is closed, devices 100 can travel straight downward or upward through the straight section 1338, and a device 100 traveling upward cannot enter the curved section 1340. The flap 1336 hangs downward from its connection point on a pivot pin 1342, upon which the flap 1336 can pivot.

When flap 1336 is closed, a device 100 traveling downward through the curved section 1340 can open the flap 1336. The nose 108 or other parts of the device 100 can push the flap 1336 open. At that time, the bottom of the flap 1336 can contact the straight section 1338 substantially near a position 1344 on the straight section 1338. The bottom of the curved section 1340 is shaped in such a way that, when the flap 1336 is open and extends to the position 1344, the distance between the flap 1336 and a substantially parallel portion of the curved section 1340 is substantially uniform (e.g., about 20 mm). This distance is consistent with the interior height (e.g., 20 mm) of the remainder of the Y-shaped tube assembly 1334, which allows the device 100 to stay in contact substantially continuously with the surfaces of the Y-shaped tube assembly 1334. In this way, forward progress of the device 100 is essentially continuous, though not necessarily at a constant speed.

In some implementations, after one or more devices 100 engage and then pass through the flap 1336, gravity can cause the flap 1336 to return to its closed or downward position. In some implementations, during the short period of time that the flap 1336 is open, a device 100 traveling upward through the straight section 1338 can enter the curved section 1340.

Figure 13T:
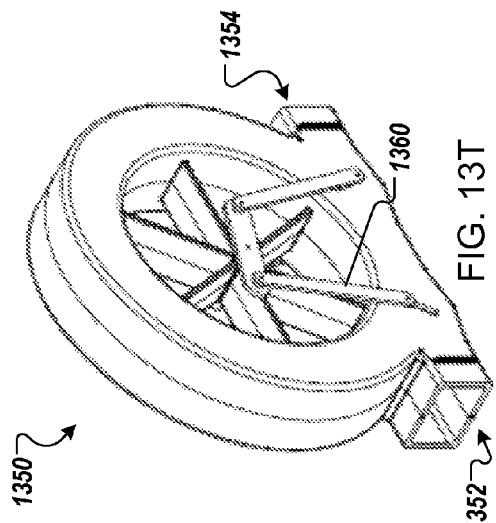
FIGS. 13R through 13W show various views of an example loop tube assembly.
Figure 13W:
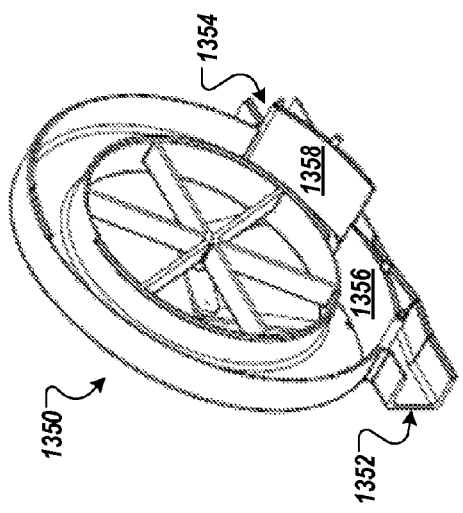
Figure 13S:
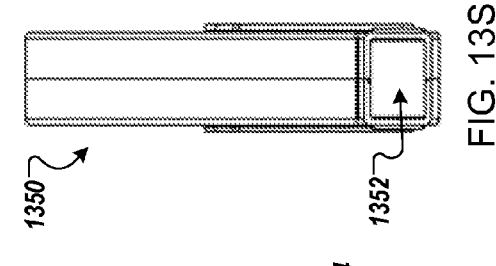
Figure 13V:
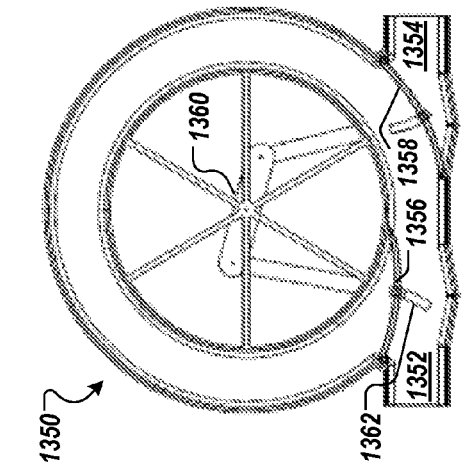
Figure 13R:
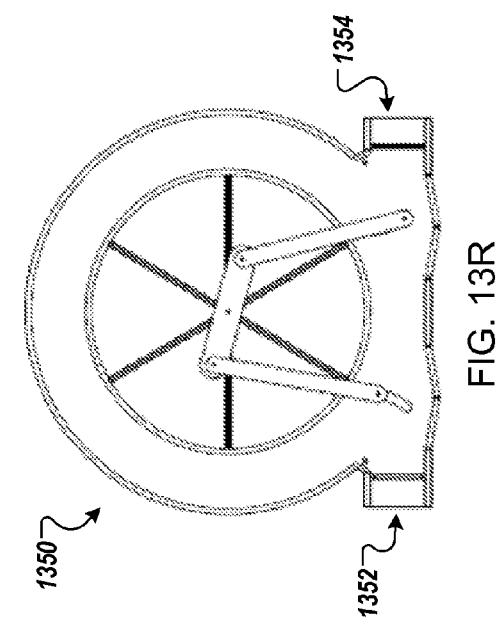
Figure 13U:
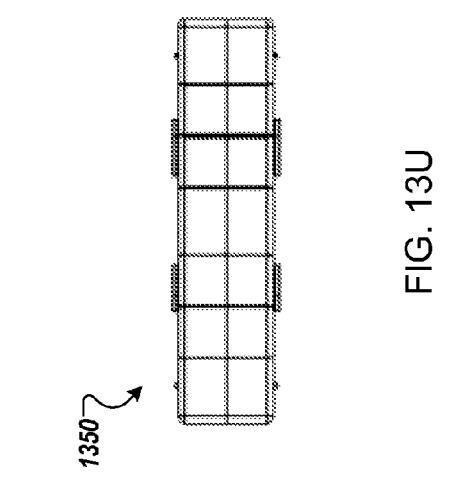

FIGS. 13R through 13W show various views of an example loop tube assembly 1350. Specifically, FIG. 13R is a side view, FIG. 13S is a front view, FIG. 13T is a perspective view, FIG. 13U is a bottom view, FIG. 13V is a cut-away side view, and FIG. 13W is a cut-away perspective view. In this example, the loop tube assembly 1350 provides a loop-the-loop feature. For example, a device 100 entering either end (e.g., opening 1352) will complete the loop and exit the opposite end (e.g., opening 1354).

The loop tube assembly 1350 includes flaps 1356 and 1358 that allow the loop tube assembly 1350 to be bi-directional. A linkage section 1360 attached to the flaps 1356 and 1358 causes the flaps 1356 and 1358 to move substantially in unison, e.g., movement of one in reaction to the movement of the other. In some implementations, the linkage section 1360 can include multiple (e.g., three) inter-connected, hinged levers. For example, when a device 100 enters the loop tube assembly 1350 at the opening 1352 and pushes the flap 1356 upward (if not already up), the linkage section 1360 causes the flap 1358 to drop. The flap 1358 thus diverts the device 100 into the circular part of the loop tube assembly 1350. Then when the device 100 has nearly completely navigated the circular part, the device 100 contacts and pushes down the flap 1356. Simultaneously, the attached linkage section 1360 causes the flap 1358 to rise, allowing the device 100 to pass beneath the flap 1358 and to exit the loop tube assembly 1350 at the opening 1354. A similar sequence of events occurs if the device 100 enters the loop tube assembly 1350 through the opening 1354.

In some implementations, a user can use the linkage section 1360 and/or other controls to control the operation of the flaps 1356 and 1358. In this way, the user can control the direction of movement of devices 100 inside the loop tube assembly 1350. For example, user-controllable knobs or other controls can be attached to the linkage section 1360.

In some implementations, the linkage section 1360 can include attached arms that are substantially perpendicular to the levers of the linkage section 1360. The arms can fit through slots 1362 to engage the flaps 1356 and 1358, e.g., along the undersides of the flaps 1356 and 1358.

In some implementations, two devices 100, traveling in opposite directions, can be inside the loop tube assembly 1350 at the same time. If the two devices 100 are in the circular part, for example, whichever device 100 reaches its respective flap 1356 or 1358 first will be the first to exit the loop tube assembly 1350. In some situations, a device 100 may be temporarily delayed at either of the flaps 1356 or 1358 while the other device 100 passes underneath in the opposite direction.

Figure 14B:
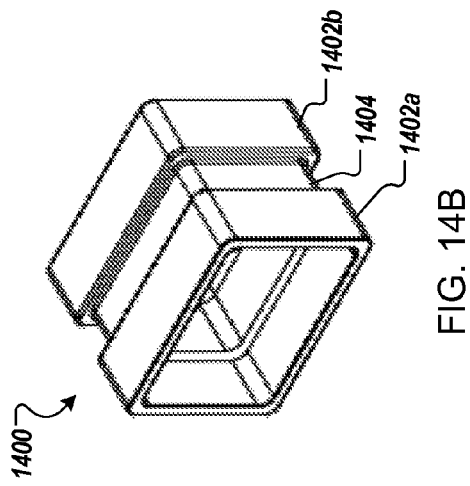
FIGS. 14A through 14D show various views of an example connector.
Figure 14D:
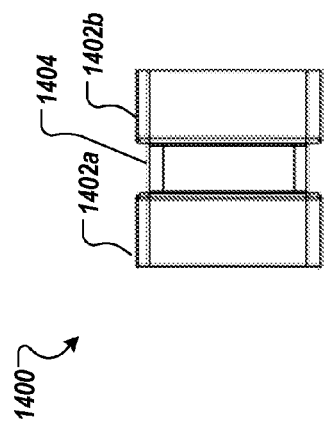
Figure 14A:
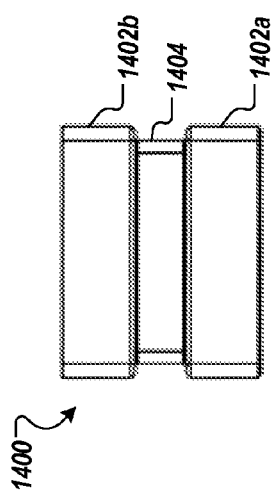
Figure 14C:
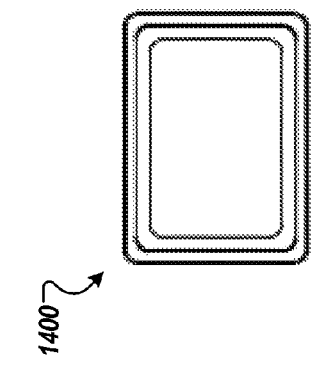

FIGS. 14A through 14D show various views of an example connector 1400. Specifically, FIG. 14A is a top view, FIG. 14B is a perspective view, FIG. 14C is a front view, and FIG. 14D is a side view. The connector 1400 can be used to connect a pair of tubes such as any two combinations of the tubes 1300, 1322, 1334 and 1350 described above with reference to FIGS. 13A-13W. The connector 1400 includes sections 1402a, 1402b and 1404. Sections 1402a and 1042b are identical, making the connector 1400 symmetrical and interchangeable, allowing either section 1402a or 1402b to be attached to any of the tubes 1300, 1322, 1334 and 1350. The section 1404 has the same height and width dimensions as the tubes 1300, 1322, 1334 and 1350. In some implementations, the connector 1400 can be used as the connector 1206b described above with reference to FIGS. 12A and 12B. Other types of connectors can be used in other implementations.

Figure 14F:
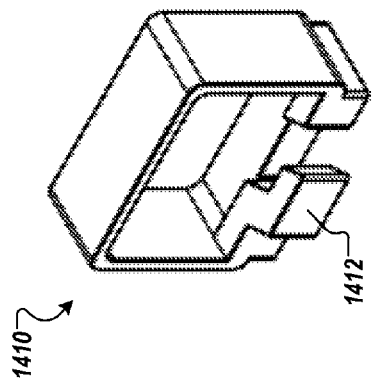
FIGS. 14E through 14H show various views of another example connector.
Figure 14H:
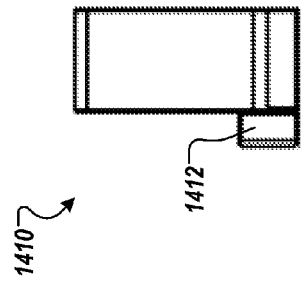
Figure 14E:
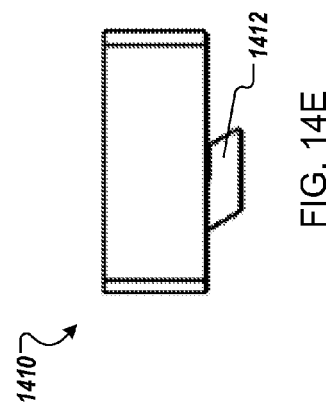
Figure 14G:
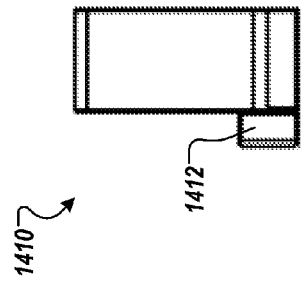

FIGS. 14E through 14H show various views of another example connector 1410. Specifically, FIG. 14E is a top view, FIG. 14F is a perspective view, FIG. 14G is a front view, and FIG. 14H is a side view. The connector 1410 can be used to connect an arena (e.g., one of the arenas 1202a-c) to any of the tubes 1300, 1322, 1334 and 1350 described above with reference to FIGS. 13A-13W. The connector 1410 can also be used to connect a tube to other types of components having a locking tab connection 1412.

Thus, particular embodiments of the subject matter have been described. Other embodiments are within the scope of the following claims.

We claim:

1. An apparatus comprising:
a body having an upper portion and a lower portion;
a vibrating mechanism coupled to the body, and wherein the vibrating mechanism has a rotational axis substantially parallel to a longitudinal axis defined by the body;
a plurality of appendages each having an appendage base proximally secured to the body and an appendage tip distal to the body, and wherein each appendage has an average axial cross-section of at least five percent of a length of the appendage between the appendage base and the appendage tip, and the plurality of appendages are constructed from a resilient material and have resilient characteristics configured to cause the apparatus to propel across a surface in a forward direction as the apparatus translates in the forward direction generally defined by a longitudinal offset between the appendage base and the appendage tip as the vibrating mechanism causes the apparatus to vibrate, and wherein at least a subset of the plurality of appendages are curved; and
a first appendage, from the plurality of appendages, extends from the body such that a first appendage tip defined on the first appendage is positioned above the upper portion, and wherein the first appendage is a vibrating appendage that further non-rotates in at least the longitudinal axis, and a second appendage, from the plurality of appendages, extends from the body such that a second appendage tip defined on the second appendage is positioned below the lower portion such that the first and second appendages are configured to contact different surfaces laying in two different planes,
whereby the first appendage and second appendage are configured to apply forces against two differently laying surface planes to produce a net force in a direction generally defined by the longitudinal offset such that the net force propels the apparatus in the forward direction between the two differently laying surface planes.

2. The apparatus of claim 1, wherein the first and second appendages are configured to extend away from the body such that the first and second appendage tips are adapted to contact opposing surfaces that are substantially parallel to one another.

3. The apparatus of claim 1, wherein the first and second appendages are configured to extend away from the body such that the first and second appendage tips are adapted to contact at least two opposing surfaces disposed on an at least substantially enclosed conduit.

4. The apparatus of claim 1, wherein the net force in a direction generally defined by an offset between the appendage base and the appendage tip exceeds an opposing gravitational force on the apparatus.

5. The apparatus of claim 1, wherein the first and second appendages, as a result of contact with a corresponding surface, produce a net force that includes a positive component force in a direction substantially perpendicular to the corresponding surface and a positive component force in a direction generally defined by a longitudinal offset between the appendage base and the appendage tip.

6. The apparatus of claim 5, wherein the positive component force in the direction substantially perpendicular to the corresponding surface for the first and second appendages is substantially opposed to the positive component force in the direction substantially perpendicular to the corresponding surface for at least one other appendage of the first and second appendages.

7. The apparatus of claim 1, wherein the different surfaces are disposed in substantially opposite directions.

8. The apparatus of claim 1, wherein the first and second appendages are two legs, and the at least two legs are adapted to enable the apparatus to climb between substantially vertical surfaces that are spaced such that the appendage Ups of the at least two legs apply contact when the apparatus is positioned between the vertical surfaces.

9. The apparatus of claim 1, wherein at least one of the two or more appendages, including one or more of the first and second appendages, is removably attached to the body.

10. The apparatus of claim 1, wherein the vibrating mechanism includes a rotational motor that rotates an eccentric load.

11. The apparatus of claim 1 wherein a ratio of a radius of curvature of the curved appendages to appendage length of the appendages is in a range of 2.5 to 20.

12. An apparatus comprising:
a body having an upper portion and a lower portion;
a vibrating mechanism coupled to the body, and wherein the vibrating mechanism has a rotational axis substantially parallel to a longitudinal axis defined by the body;
a plurality of appendages operable to vibrate upon an activation of the vibrating mechanism, each appendage is non-rotating along the longitudinal axis, and each appendage has an appendage base proximally secured to the body and an appendage tip distal to the body,
wherein a first appendage, from the plurality of appendages, extends from the body such that a first tip is positioned above the upper portion, and wherein a second appendage, from the plurality of appendages, extends from the body such that a second tip is positioned below the lower portion, and wherein the first and second Ups of the first and second appendages are configured to contact different surfaces laying in two different planes, and wherein the first and second appendages each has an average axial cross-section of at least five percent of a length of its appendage between its appendage base and its appendage tip, and wherein at least the first and second appendages are curved towards a rear portion of the body; and
the first and second appendages being constructed from a resilient material having a resilient characteristic configured to apply forces against the two differently laying surface planes to produce a net force in a generally forward direction whereby when the vibrating mechanism is activated, the net force propels the apparatus between the two differently laying surface planes in the forward direction.

13. The apparatus of claim 12, wherein the first and second non-rotating appendages are configured to extend away from the body such that the first and second tips are adapted to contact opposing surfaces that are substantially parallel to one another.

14. The apparatus of claim 12, wherein the first and second non-rotating appendages are configured to extend away from the body such that the first and second tips are adapted to contact at least two opposing surfaces disposed on an at least substantially enclosed conduit.

15. The apparatus of claim 12, wherein the net force in a direction generally defined by an offset between the appendage base and the appendage tip defined in the second appendage and the net force exceeds an opposing gravitational force on the apparatus.

16. An apparatus comprising:
a body having an upper portion and a lower portion;
a vibrating mechanism coupled to the body, and wherein the vibrating mechanism has a rotational axis substantially parallel to a longitudinal axis defined by the body;
a plurality of appendages operable to vibrate upon an activation of the vibrating mechanism, each vibrating appendage has an appendage base proximally secured to the body and an appendage tip distal to the body;
at least two vibrating appendages, from the plurality of appendages, separately extend from the body such that a first tip is positioned along a plane different from a second tip, whereby the first and second tips are configured to contact different surfaces laying in two different planes; and
the at least two vibrating appendages have an average cross-section of at least five percent of a length of its appendage between its appendage base and its appendage tip and further being constructed from a resilient material with a resilient characteristic so configured to apply forces against the two differently laying surface planes to produce a net force in a generally forward direction whereby when the vibrating mechanism is activated, the net force propels the apparatus between the two differently laying surface planes in the forward direction.

17. The apparatus of claim 16, wherein the at least two vibrating appendages are further configured to extend away from the body such that the first and second tips are adapted to contact opposing surfaces that are substantially parallel to one another.

18. The apparatus of claim 16, wherein the at least two vibrating appendages are configured to extend away from the body such that the first and second tips are adapted to contact at least two opposing surfaces disposed on an at least substantially enclosed conduit.

19. The apparatus of claim 16, wherein the at least two vibrating appendages are configured to create the net force in a direction that exceeds an opposing gravitational force on the apparatus.

20. A combination apparatus and playset component, comprising:
a playset component having at least two surface planes laying in two different planes and positioned a predetermined distance away from each other; and
an apparatus having:
a body having a first portion and a second portion, the second portion positioned in a different plane than the first portion;
a vibrating mechanism coupled to the body, and wherein the vibrating mechanism has a rotational axis substantially parallel to a longitudinal axis defined by the body; and
a plurality of vibrating appendages each having an appendage base proximally secured to the body and an appendage tip distal to the body, and wherein the plurality of appendages include a first appendage extending away from the first portion and include a second appendage extending away from the second portion, wherein the appendage tips from the first and second appendages lay in different planes; and wherein the first and second appendages are constructed from a resilient material and extend away from the body such that the first and second appendages are configured to contact the at least two surface planes of the playset component and further configured to apply forces against the at least two surface planes to produce a net force in a direction generally defined by a longitudinal offset between the appendage base and the appendage tip, and wherein the resilient material is further configured to repeatedly cause at least one or more of the first and second appendages to deflect and momentarily brake contact with one or more surface planes of the playset component such that the apparatus propels in a forward direction between the two different laying surface planes.

21. The combination of claim 20, wherein the playset component includes a portion positioned at an angle from a horizontal plan, such that the apparatus vibrates through the portion of the playset component at said angle.

22. The combination of claim 21, wherein the angle is between zero and ninety degrees from the horizontal plan.

23. The combination of claim 20, wherein the playset component is a curved tube.

24. The combination of claim 20, wherein the playset component is a tube having parallel internal surfaces.

25. The combination of claim 20, wherein the playset component is positioned in a vertical position.

26. The combination of claim 20, wherein the resilient material of the first and second appendages of the apparatus is further configured to cause the first and second appendage tips to repeatedly contact the surfaces for sufficient periods to produce a generally forward motion upwardly through the vertically positioned playset component.

27. A combination apparatus and playset component, comprising:
a playset component having at least two differently laying surface planes, referred to as a first surface plane and a second surface plane, and wherein the first surface plane is positioned above the second surface plane; and
an apparatus having:
a body configured to include an upper portion and a lower portion;
a vibrating mechanism coupled to the body, and wherein the vibrating mechanism has a rotational axis substantially parallel to a longitudinal axis defined by the body;
a plurality of appendages, each appendage configured to be at least non-rotating along the longitudinal axis and each having an appendage base proximally secured to the body and an appendage tip distal to the body, and wherein the plurality of appendages further include a first appendage extending from the body such that a first appendage tip is above the upper portion and the plurality of appendages further include a second appendage extending from the body such that a second appendage tip is below the lower portion, the first and second appendages extend from the body such that the first and second appendage tips are positioned in different planes; and
wherein the first and second appendages are constructed from a resilient material such that as the vibrating mechanism causes the apparatus to vibrate and when the first and second appendage tips come into contact with first and second surface planes, the resilient material has material characteristics configured to cause the first and second appendages to contact the first and second surface planes and apply forces against the first and second surface planes to produce a net force in a forward direction and thus cause the vibrating mechanism to move upwardly or downwardly through the playset component.

28. The combination of claim 27, wherein the material characteristics of the resilient material of the first and second appendages is further configured to deflect and repeatedly cause at least one or more of the first and second appendages to momentarily brake contact with the first and/or second surface planes on the playset component as the vibrating mechanism causes the apparatus to vibrate upwardly and downwardly through the playset component.

* * * * *